(12) United States Patent
Guo et al.

(10) Patent No.: US 12,315,905 B2
(45) Date of Patent: May 27, 2025

(54) BATTERY PACK AND VEHICLE

(71) Applicant: HONDA MOTOR CO., LTD., Tokyo (JP)

(72) Inventors: Chuyun Guo, Guangzhou (CN); Caixia Yang, Guangzhou (CN); Yaozhong Huo, Guangzhou (CN)

(73) Assignee: HONDA MOTOR CO., LTD., Tokyo (JP)

( * ) Notice: Subject to any disclaimer, the term of this patent is extended or adjusted under 35 U.S.C. 154(b) by 145 days.

(21) Appl. No.: 18/227,418

(22) Filed: Jul. 28, 2023

(65) Prior Publication Data
US 2024/0047780 A1   Feb. 8, 2024

(30) Foreign Application Priority Data

Aug. 4, 2022 (CN) .......................... 202210932023.0

(51) Int. Cl.
| | |
|---|---|
| *H01M 10/6556* | (2014.01) |
| *B60L 50/64* | (2019.01) |
| *B60R 16/02* | (2006.01) |
| *H01M 10/613* | (2014.01) |
| *H01M 10/625* | (2014.01) |
| *H01M 10/6567* | (2014.01) |
| *H01M 50/209* | (2021.01) |
| *H01M 50/298* | (2021.01) |

(52) U.S. Cl.
CPC ......... *H01M 10/6556* (2015.04); *B60L 50/64* (2019.02); *B60R 16/0215* (2013.01); *H01M 10/613* (2015.04); *H01M 10/625* (2015.04); *H01M 10/6567* (2015.04); *H01M 50/209* (2021.01); *H01M 50/298* (2021.01); *H01M 2220/20* (2013.01)

(58) Field of Classification Search
CPC .......... H01M 10/6556; H01M 10/613; H01M 10/625; H01M 10/6567; H01M 50/209; H01M 50/298; H01M 2220/20; B60L 50/64; B60R 16/0215
See application file for complete search history.

(56) References Cited

U.S. PATENT DOCUMENTS 11,322,794 B2 *   5/2022   Liu ....................... H01M 50/51

* cited by examiner

*Primary Examiner* — Carlos Amaya
(74) *Attorney, Agent, or Firm* — Amin, Turocy & Watson, LLP

(57) ABSTRACT

The present disclosure provides a battery pack and a vehicle capable of improving safety. A battery pack includes: a housing including a bottom plate, the bottom plate being provided with an accommodating portion; battery modules arranged above the bottom plate and including first battery modules and second battery modules, with a gap between the first battery modules and the second battery modules that overlaps with the accommodating portion when viewed in the up-down direction; a control device configured in the gap; a low-voltage connection assembly electrically connecting the battery modules and the control device and configured in the gap; and a high-voltage connection assembly electrically connecting the battery modules and accommodated in the accommodating portion.

16 Claims, 28 Drawing Sheets

BATTERY PACK AND VEHICLE

CROSS-REFERENCE TO RELATED APPLICATION

Priority is claimed on Chinese Patent Application No. 202210932023.0, filed on Aug. 4, 2022, the contents of which are incorporated herein by reference.

BACKGROUND OF THE INVENTION

Field of the Invention

The present disclosure relates to a battery pack and a vehicle.

Description of Related Art

For example, in the battery pack of an electric vehicle, an electrical connection assembly electrically connected to the battery module is disposed. The electrical connection assembly is used to transmit electrical energy or signals. Currently, such a battery pack structure exists, in which the electrical connection assembly is configured in the gap between the battery modules, thereby reducing the size of the battery pack.

However, for example, when a crash involving an electric vehicle occurs, the battery pack may deform, causing the battery module to move, thereby hitting or crushing the electrical connection assembly located in the gap, which adversely affects the safety of the battery.

SUMMARY OF THE INVENTION

The present disclosure provides a battery pack and a vehicle capable of improving safety.

The present disclosure provides a battery pack, characterized by including: a housing including a bottom plate provided with an accommodating portion; battery modules arranged above the bottom plate and including first battery modules and second battery modules with a gap between the first battery modules and the second battery modules that overlaps with the accommodating portion when viewed in the up-down direction; a control device configured in the gap; a low-voltage connection assembly electrically connecting the battery modules and the control device and configured in the gap; and a high-voltage connection assembly electrically connecting the battery modules and accommodated in the accommodating portion.

With the above structure, the high-voltage connection assembly is disposed inside the bottom plate of the housing, which makes the structure of the battery pack more compact and improves the space utilization inside the battery pack, and also avoids the deformation or breakage of the high-voltage wiring harness caused by the battery modules pressing the high-voltage wiring harness when the vehicle is side-impacted, improving the safety and reliability of the battery pack; in addition, disposing the control device and the low-voltage connection assembly in the gap also makes the structure of the battery pack more compact, further improving the energy density of the battery pack.

In addition, the gap between the first battery modules and the second battery modules overlaps with the accommodating portion when viewed in the up-down direction, that is, the accommodating portion and the high-voltage connection assembly therein are configured in the middle, thus reducing the risk of the high-voltage connection assembly being struck by a foreign object or the like compared to the case where the high-voltage connection assembly is configured on the outer side portion.

As a possible implementation mode of the first aspect, the low-voltage connection assembly is located between the control device and the battery modules, and located below the control device.

With the above structure, the low-voltage connection assembly is disposed diagonally below the control device, which minimizes the overall occupied volume, makes reasonable use of the space of the housing, and improves the energy density of the battery pack.

In addition, in the gap, the low-voltage connection assembly is located between the control device and the battery modules, that is, the low-voltage connection assembly and the control device are configured staggered from each other when viewed in the up-down direction, and thus the operator can easily operate both the control device and the low-voltage connection assembly, avoiding mutual interference between the operations of both sides.

In addition, the low-voltage connection assembly is located below the control device, thus enabling stable position and reliable performance of the low-voltage connection assembly.

As a possible implementation mode of the first aspect, the control device is fixed to the bottom plate by means of a control device bracket including a main body portion and a base portion, the main body portion being disposed vertically with respect to the bottom plate and provided with the control device, and the base portion being bent from the lower end of the main body portion and mounted on the bottom plate.

With the above structure, the control device bracket is formed as an L-shaped bracket, and the upper portion of the L-shaped bracket occupies little space, which improves the space utilization inside the battery pack, and the connection at the bottom is solid and reliable.

As a possible implementation mode of the first aspect, the end of the control device close to the bottom plate is provided with a first connector electrically connected to the battery modules.

With the above structure, a first connector is disposed in the lower portion of the control device, thus easily satisfying a waterproofing requirement.

As a possible implementation mode of the first aspect, the low-voltage connection assembly is provided with a second connector, and the first connector is connected to the second connector by insertion.

With the above structure, the first connector is disposed at the end of the control device close to the bottom plate, so that the first connector can be conveniently mounted on and dismounted from the second connector, and it is also easy to satisfy a waterproofing requirement.

As a possible implementation mode of the first aspect, the bottom plate includes a first plate and a second plate, the first plate is located above the second plate, the battery modules are arranged above the first plate, and the accommodating portion is disposed within the height range between the first plate and the second plate.

With the above structure, the high-voltage connection assembly is accommodated in the accommodating portion between the first plate and the second plate located below the battery modules, so that, for example, when the battery modules are moved due to a collision of the battery pack, the battery modules do not easily hit the high-voltage connection assembly accommodated in the accommodating portion, and thereby it is possible to suppress problems such as damage to the high-voltage connection assembly or damage to the electrical connection (including poor contact or electrical connection failure), which improves the safety of the battery pack. Here, the movement generated by the battery modules includes, for example, translation along the first plate or rotation with the bending of the first plate.

As a possible implementation mode of the first aspect, cooling liquid channels are disposed in the bottom plate.

With such a structure, the bottom plate is provided with the cooling liquid channels, and therefore the bottom plate needs to have a certain thickness to dispose the cooling liquid channels, and using such a bottom plate to dispose the accommodating portion to accommodate an electrical connection assembly does not increase the thickness of the bottom plate, which facilitates the miniaturization of the battery pack.

As a possible implementation mode of the first aspect, a reinforcing component is disposed above the bottom plate.

With the above structure, the reinforcing component is disposed above the bottom plate, thus strengthening the housing as a whole without affecting disposing the cooling liquid channel.

As a possible implementation mode of the first aspect, the part of the cooling liquids channel farther away from a center line of the bottom plate is upstream along the liquid flow and the part of the cooling liquid channels closer to the center line of the bottom plate is downstream along the liquid flow, wherein the center line extends in the direction of extension of the bottom plate.

With the above structure, since the part of the battery modules close to the outer side portion is more susceptible to external influences, the battery modules can be cooled well by cooling the part on the outer side portion first in this embodiment.

As a possible implementation mode of the first aspect, the high-voltage connection assembly includes a high-voltage wiring harness and a high-voltage wiring harness bracket, the high-voltage wiring harness is configured in the accommodating portion, and the high-voltage wiring harness bracket covers the high-voltage wiring harness from above, forming the top of the accommodating portion.

With the above structure, the high-voltage wiring harness is accommodated by forming the accommodating portion through a groove and a bracket, which not only makes reasonable use of the space of the housing, but also ensures the strength of the housing.

As a possible implementation mode of the first aspect, the low-voltage connection assembly and the control device are located above the high-voltage wiring harness bracket.

With the above structure, the space of the housing is reasonably utilized so that the battery pack can have a greater energy density and wiring of the high-voltage wiring harness and the low-voltage wiring harness is more reasonable.

As a possible implementation mode of the first aspect, the low-voltage connection assembly includes a low-voltage wiring harness and a low-voltage wiring harness bracket fixed to the high-voltage wiring harness bracket by means of the low-voltage wiring harness bracket.

With the above structure, the low-voltage wiring harness can be supported and protected by the low-voltage wiring harness bracket.

As a possible implementation mode of the first aspect, the high-voltage wiring harness includes a cladding layer and conductive members disposed within the cladding layer, and the cladding layer is fixed to the high-voltage wiring harness bracket.

With the above structure, insulation of the conductive member can be easily guaranteed by the cladding layer, and the conductive members can also be fixed to the high-voltage wiring harness bracket.

As a possible implementation mode of the first aspect, the reinforcing component is provided with an arched portion disposed in the gap.

With the above structure, the reinforcing component can strengthen the housing of the battery pack, and the arched portion can effectively disperse the force and cushion deformation better when the battery pack is crushed. In addition, the arched portion allows the reinforcing component to avoid interference with other components in the gap, such as the low-voltage connection assembly. That is, the strength of the reinforcing component is guaranteed while avoiding interference.

As a possible implementation mode of the first aspect, the battery pack further includes a first connection component and a second connection component disposed on the bottom plate, the first connection component and the second connection component extending in the direction of extension of the bottom plate, and both ends of the reinforcing component being fixed to the first connection component and the second connection component. The first connection component, the reinforcing component and the second connection component form a reinforcing assembly.

With the above structure, the first connection component, the reinforcing component and the second connection component can be formed separately, so that a generally long reinforcing assembly can be easily manufactured. In addition, the reinforcing assembly can be easily mounted or dismounted.

With the above structure, the reinforcing component provided with the arched portion is disposed independently of the first connection component and the second connection component, and it is possible to easily form the reinforcing component with a more complicated shape.

A second aspect of the present disclosure provides a vehicle, including the battery pack according to any one of the structures in the first aspect.

With the vehicle according to the second aspect, the same technical effect as in the first aspect can be obtained, and will not be repeated here.

BRIEF DESCRIPTION OF THE DRAWINGS

The various features of the present disclosure and the relations between the various features are further illustrated below with reference to the accompanying drawings. The accompanying drawings are all exemplary, some features are not shown according to the actual scale, and some of the accompanying drawings may omit features that are customary in the art of the present application and are not essential to the present application, or additionally show features that are not essential to the present application, and the combination of various features shown in the accompanying drawings is not intended to limit the present application. In addition, the same reference numerals refer to the same content throughout this specification. Specific descriptions of the accompanying drawings are as below.

FIG. 15b is a partial cross-sectional view of a bottom plate in FIG. 15a;

FIG. 21b is a partially enlarged view of the structure shown in FIG. 21a;

FIG. 21c is another partially enlarged view of the structure shown in FIG. 21a;

FIG. 21d is a still another partially enlarged view of the structure shown in FIG. 21a;

FIG. 22b is a top view of the structure in FIG. 22a;

FIG. 23 is a structural schematic view showing a decomposition state of the structure in FIG. 22a;

Figure 1:
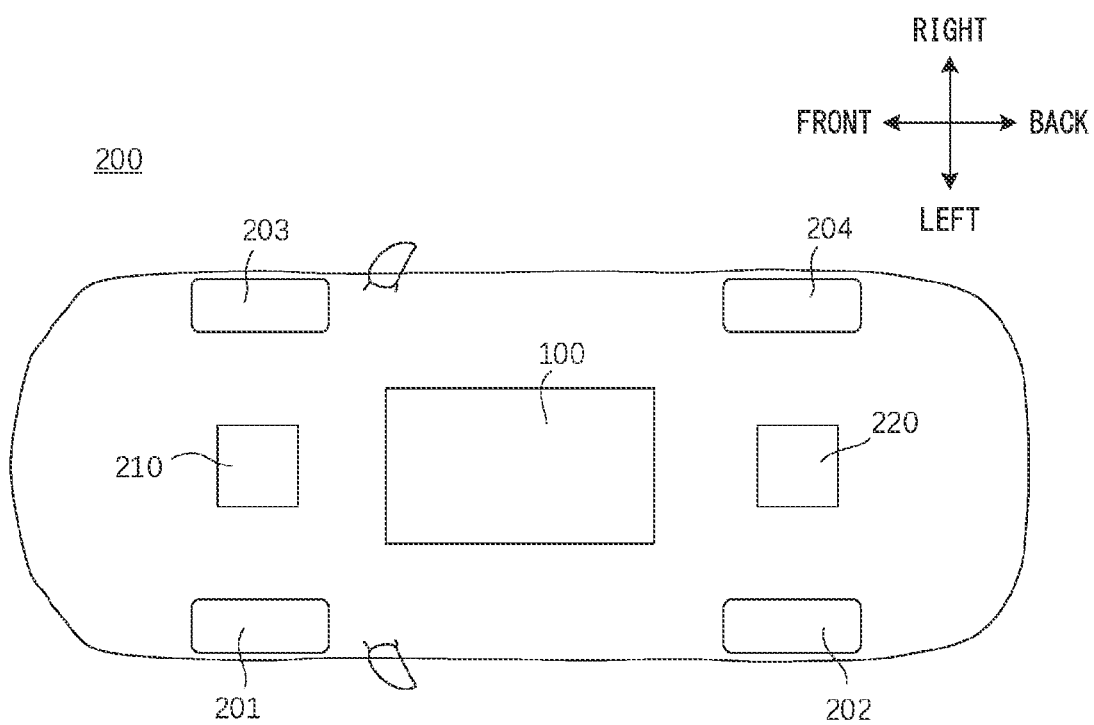
FIG. 1 is a schematic view of a vehicle according to an embodiment of the present disclosure.

LIST OF REFERENCE NUMERALS 10, housing; 11, bottom plate; 11a, protrusion; 12, side plate; 13, top cover; 14, lifting lug; 15, window plate; 16d, bolt; 16e, nut; 20, battery module; 20a, main body portion; 20b, mounting hole; 20c, wiring port; 20L, battery module; 20R, battery module; 21, bolt (first bolt); 22, nut; 31, power distribution unit; 31a, mounting hole; 31b, wiring terminal; 31c, wiring terminal; 31d, wiring terminal; 32, power distribution unit bracket; 32a, mounting hole; 33, bolt (second bolt); 34, nut; 41, control device; 42, control device bracket; 42a, main body portion; 42b, base portion; 42c, wiring harness fixing portion; 44, annular bracket; 50, high-voltage connection assembly (an example of a first high-voltage connection assembly and an electrical connection assembly); 51, high-voltage wiring harness (an example of a wiring harness); 51a, conductive member; 51b, cladding layer; 51c, protrusion; 52, connector; 53, connector; 55, high-voltage connection assembly (an example of a second high-voltage connection assembly); 58, terminal block; 60, low-voltage connection assembly; 61, low-voltage wiring harness (an example of a wiring harness); 62, low-voltage wiring harness bracket; 63, annular bracket; 64, annular bracket; 65, connector; 66, connector; 70, reinforcing assembly; 71, first connection component; 72, reinforcing component; 72a, arched portion; 72b, vertical portion; 72c, fixed portion; 72d, groove; 72e, opening; 73, second connection component; 100, battery pack; 101, connection port; 102, connection port; 111, plate; 112, high-voltage wiring harness bracket; 112a, main body portion; 112b, raised portion; 113, accommodating portion; 114, bayonet portion; 115, cooling liquid channel; 116, plate; 116a, opening; 118, plate; 200, vehicle; 201, wheel; 202, wheel; 203, wheel; 204, wheel; 210, motor (an example of a first motor); 220, motor (an example of a second motor); 321, top portion; 321a, reinforcing rib; 322, side portion; 611, main wire portion; 612, branch wire portion; 621, main body portion; 623, wiring harness fixing portion.

DETAILED DESCRIPTION OF THE INVENTION

Some embodiments of the present disclosure are described in detail below with reference to the accompanying drawings. In the following description, directions such as the front-rear direction, the left-right direction, and the up-down direction are defined with respect to the driver sitting in the vehicle; however, these directions are defined for ease of description and are not intended to limit the present disclosure. In addition, these directions are also indicated in some of the accompanying drawings.

Figure 2:
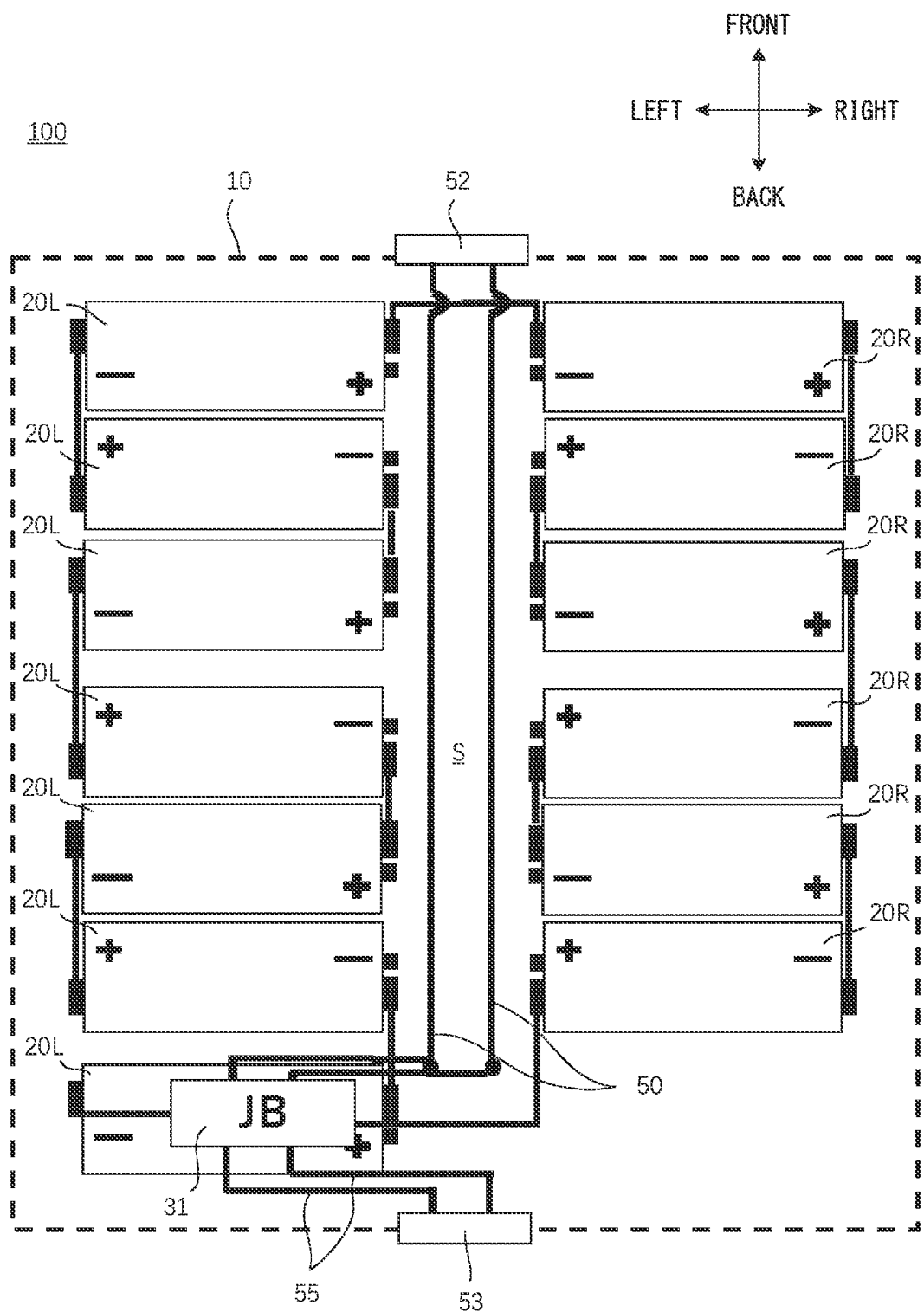
FIG. 2 is a schematic view of the principle of a battery pack according to an embodiment of the present disclosure.
Figure 3:
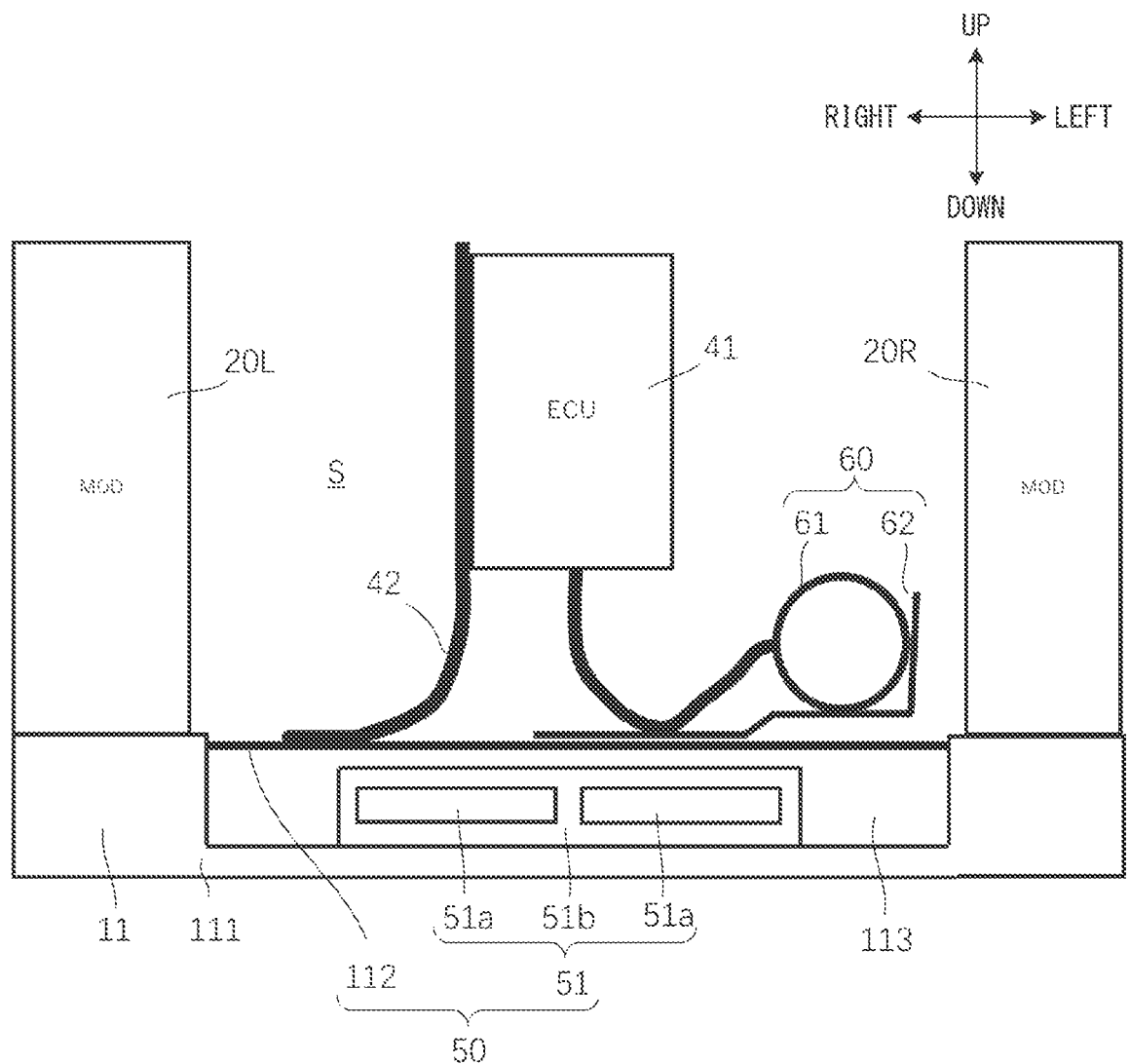
FIG. 3 is one structural schematic view of the battery pack according to the embodiment of the present disclosure.
Figure 4:
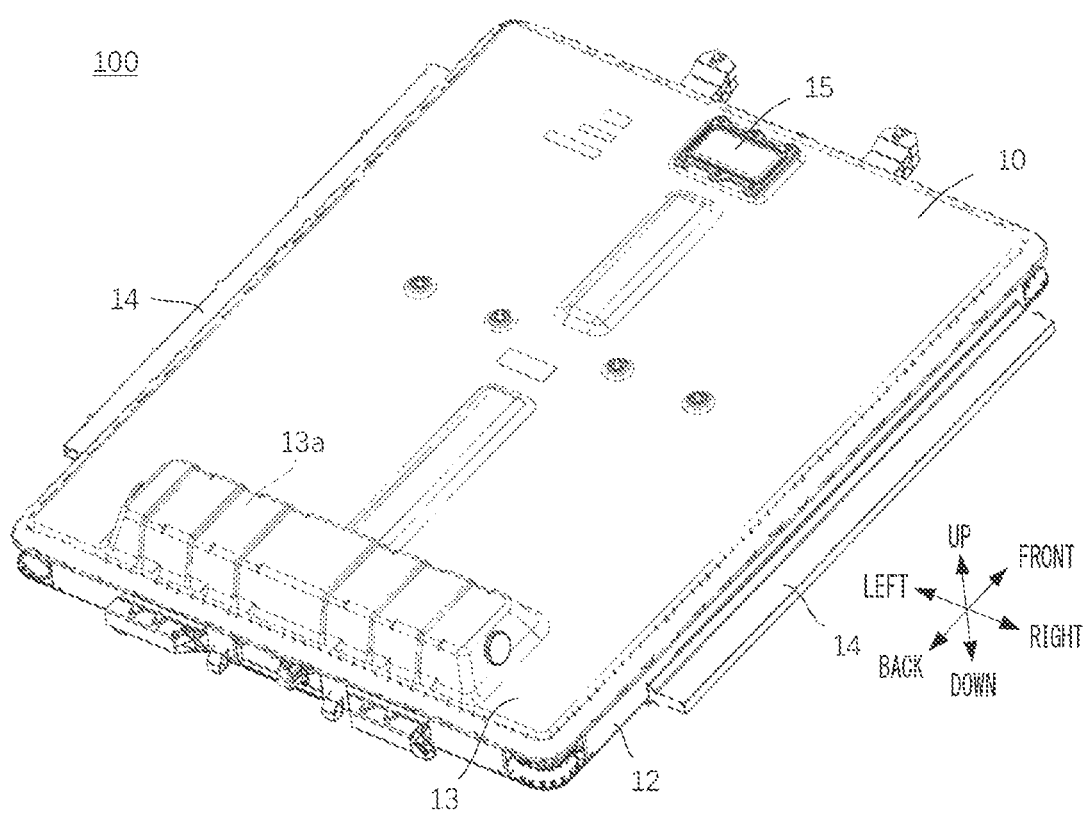
FIG. 4 is a structural schematic view of the battery pack according to the embodiment of the present disclosure.

As shown in FIG. 2 to FIG. 4, etc., the present disclosure provides a battery pack 100 including: a housing 10 including a bottom plate 11 provided with an accommodating portion 113; battery modules 20 arranged above the bottom plate 11 and including battery modules 20L and battery modules 20R, with a gap S between the battery modules 20L and the battery modules 20R that overlaps with the accommodating portion 113 when viewed in the up-down direction; a control device 41 configured in the gap S; a low-voltage connection assembly 60 electrically connecting the battery module and the control device 41 and configured in the gap S; and a high-voltage connection assembly 50 electrically connecting the battery modules and accommodated in the accommodating portion 113.

With the above structure, the high-voltage connection assembly is disposed inside the bottom plate 11 of the housing 10, which makes the structure of the battery pack 100 more compact and improves the space utilization inside the battery pack 100, and also avoids the deformation or breakage of the high-voltage wiring harness 51 caused by the battery module pressing the high-voltage wiring harness 51 when the vehicle is side-impacted, improving the safety and reliability of the battery pack 100; in addition, disposing the control device 41 and the low-voltage connection assembly 60 in the gap S also makes the structure of the battery pack 100 more compact, further improving the energy density of the battery pack 100.

It will be understood that, as shown in FIG. 4 to FIG. 8, etc., the housing 10 may include not only the bottom plate 11, but also side plates 12 extending from the peripheral edge portions of the bottom plate 11 and a top cover 13 covering the space formed by the bottom plate 11 and the side plates 12. The battery modules 20 are configured in the interior space of the housing 10 formed by the bottom plate 11, the side plates 12, and the top cover 13 together.

Figure 16:
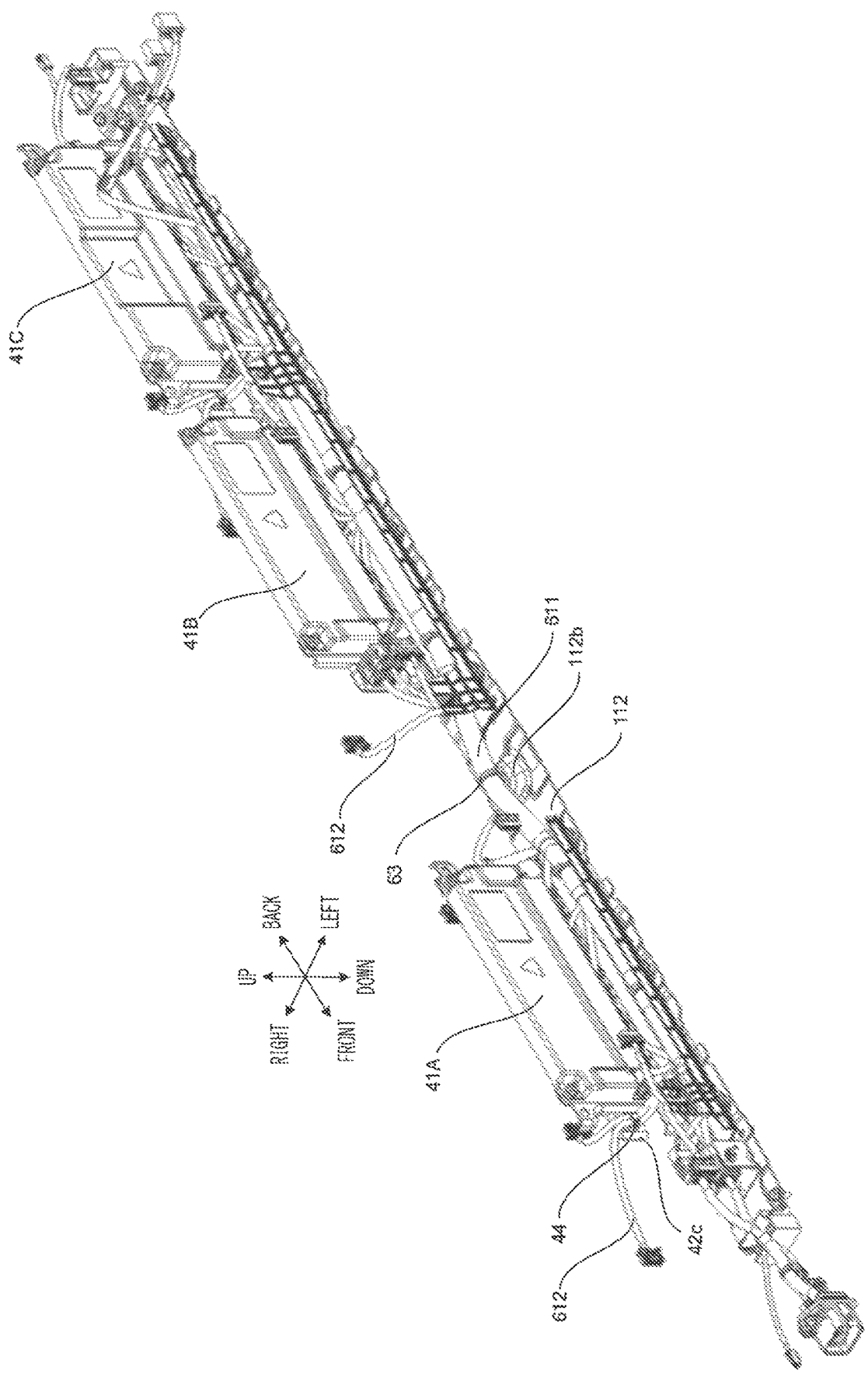
FIG. 16 is a schematic view showing a combination state of a low-voltage connection assembly and a control device and a peripheral structure thereof according to the embodiment of the present disclosure.

Optionally, in one embodiment, as shown in FIG. 3 and FIG. 16, the low-voltage connection assembly 60 is located between the control device 41 and the battery modules and located below the control device 41.

With the above structure, the low-voltage connection assembly 60 is disposed diagonally below the control device 41, which minimizes the overall occupied volume, makes reasonable use of the space of the housing 10, and improves the energy density of the battery pack 100.

In addition, in the gap S, the low-voltage connection assembly 60 is located between the control device 41 and the battery modules 20R, that is, the low-voltage connection assembly 60 and the control device 41 are configured staggered from each other when viewed in the up-down direction, and thus the operator can easily operate both the control device 41 and the low-voltage connection assembly 60, avoiding mutual interference between the operations of both. It will be understood that the low-voltage connection assembly 60 may also be disposed between the control device 41 and the battery modules 20L.

In addition, the low-voltage connection assembly 60 is located below the control device 41, thus enabling a stable position and reliable performance of the low-voltage connection assembly 60.

Figure 15A:
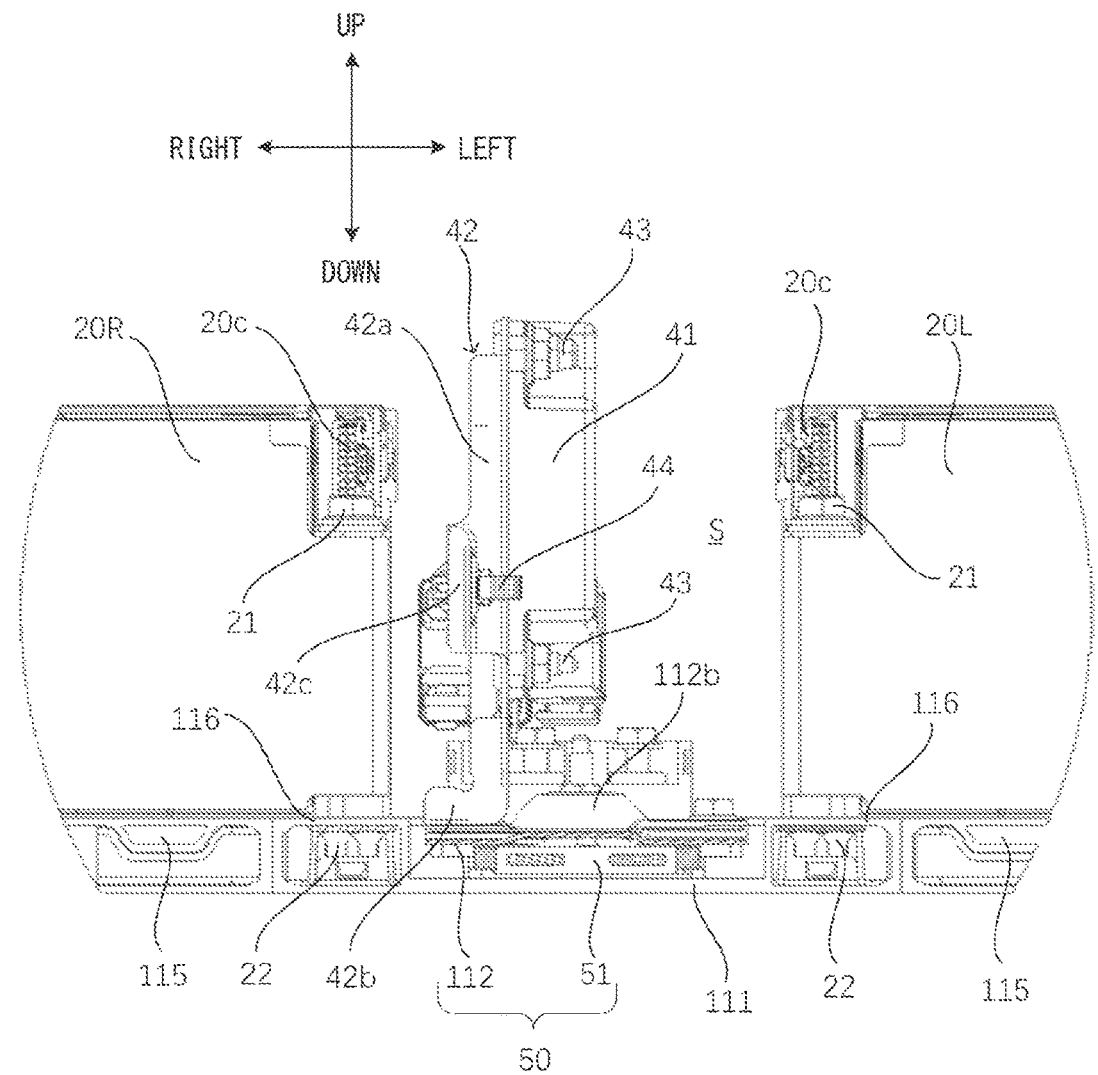
FIG. 15a is another partially enlarged view of the structure in FIG. 13.

Optionally, in an embodiment, as shown in FIG. 15a, the control device 41 is fixed to the bottom plate 11 through a control device bracket 42 including a main body portion 42a and a base portion 42b, the main body portion 42a being disposed vertically with respect to the bottom plate 11 and provided with the control device 41, and the base portion 42b being bent from the lower end of the main body portion 42a and mounted on the bottom plate 11.

With the above structure, the control device bracket 42 is formed as an L-shaped bracket, and the upper portion of the L-shaped bracket occupies little space, which improves the space utilization inside the battery pack 100, and the connection at the bottom is solid and reliable.

As other embodiments, control device brackets in other shapes may also be used, or the control device bracket 42 may be omitted to enable mounting of the control device 41.

Figure 28A:
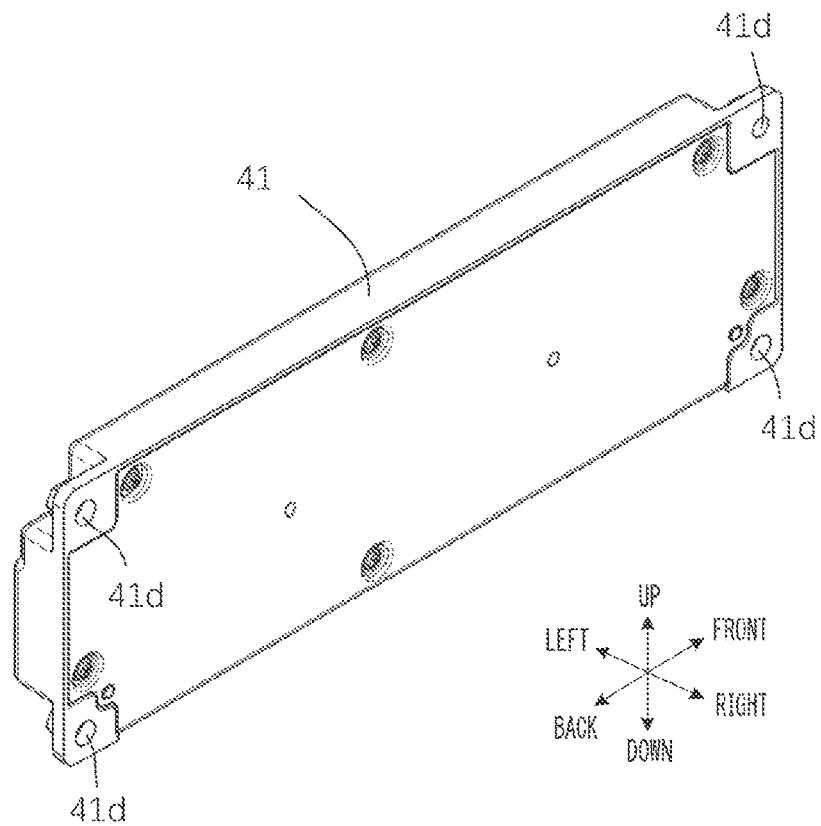
FIG. 28a is a three-dimensional structural schematic view of a control device according to the embodiment of the present disclosure.
Figure 28B:
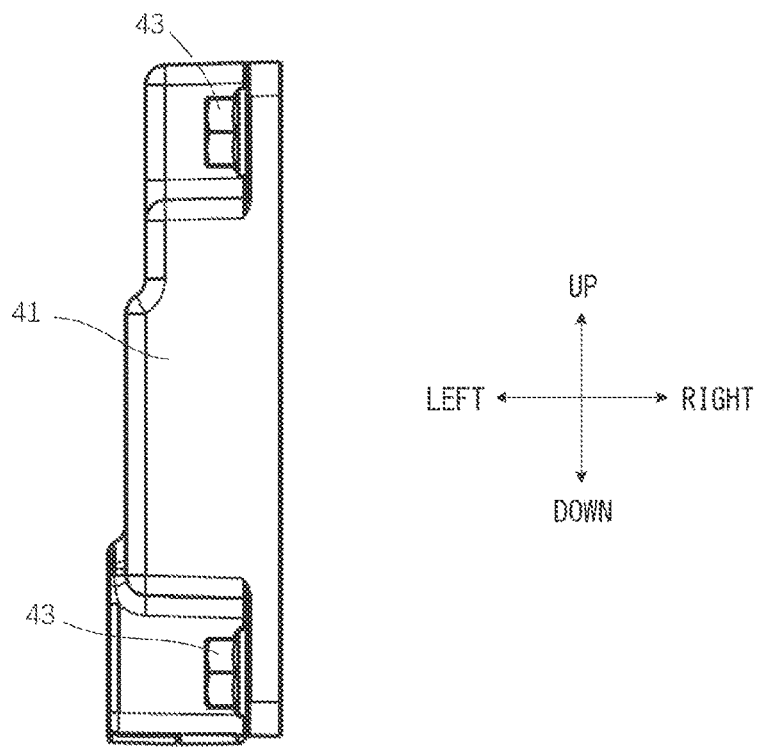
FIG. 28b is a side view of the control device.
Figure 28C:
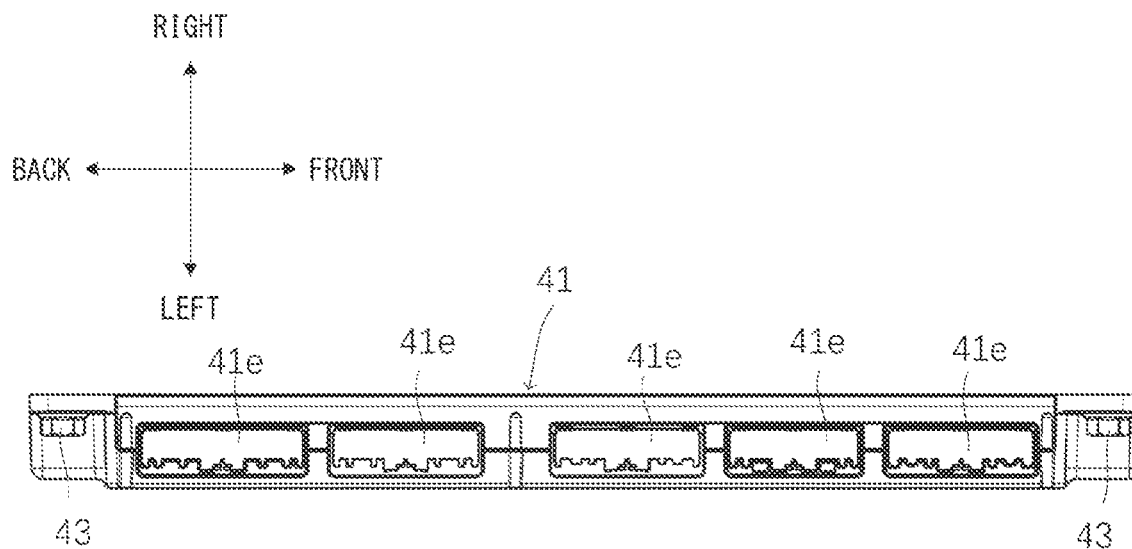
FIG. 28c is a bottom view of the control device.

Optionally, in an embodiment, as shown in FIG. 28c, the end of the control device 41 close to the bottom plate 11 is provided with a connector 41e (an example of a first connector) that is electrically connected to the battery module.

With the above structure, the first connector is disposed on the lower portion of the control device 41, thus easily satisfying a waterproofing requirement.

Figure 18:
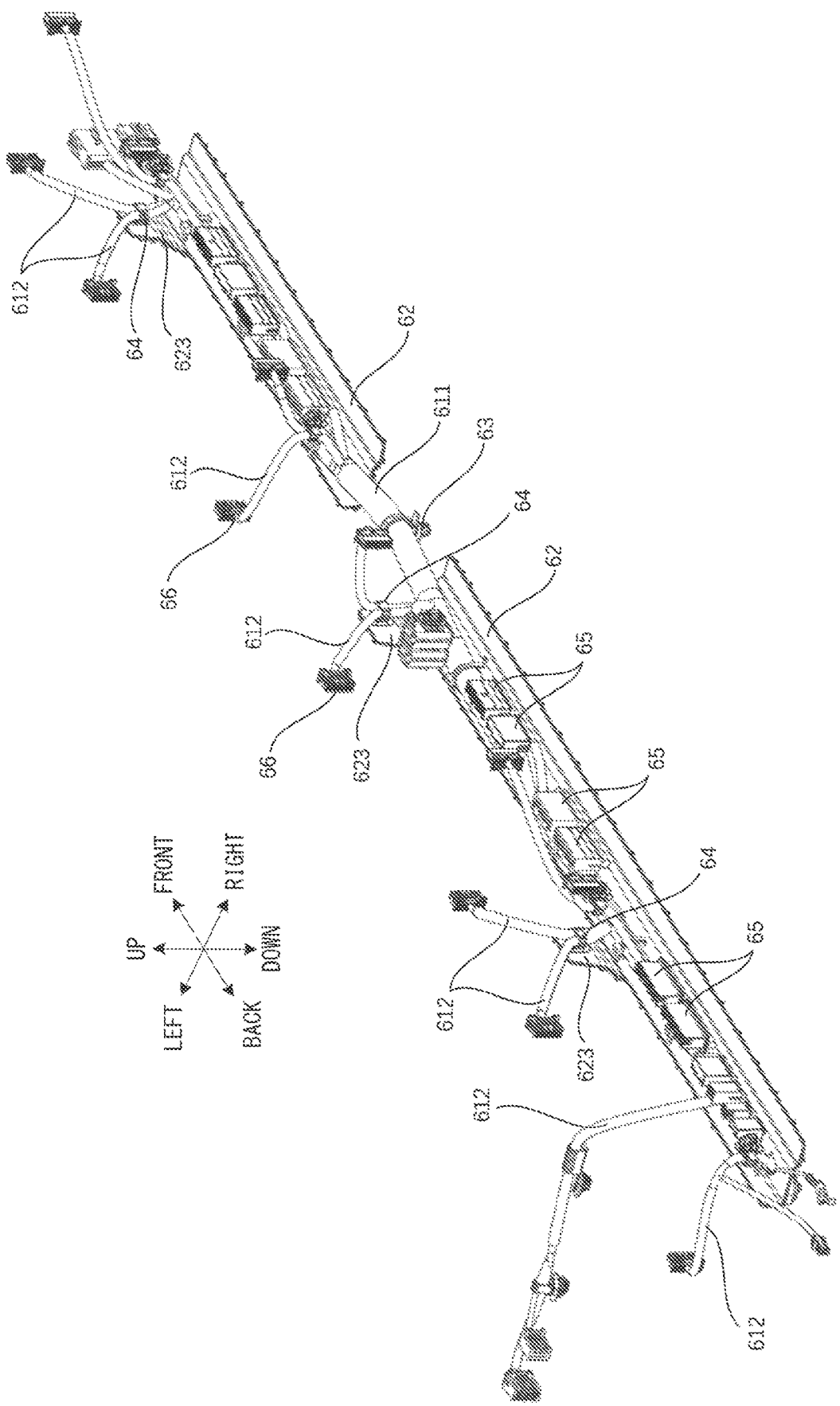
FIG. 18 is a schematic view showing a combination state of a low-voltage connection assembly according to the embodiment of the present disclosure.

Optionally, in an embodiment, as shown in FIG. 18, etc., the low-voltage connection assembly 60 is provided with a connector 65 (an example of a second connector), and the connector 41e is connected to the connector 65 by insertion. Specifically, the connector 65 may be disposed on the lower portion of the control device 41 when the opening of the connector 41e is disposed downward.

With the above structure, since the connector 41e is disposed at the end of the control device 41 close to the bottom plate 11, the connector 41e can be conveniently mounted on and dismounted from the connector 65, and the waterproofing requirement can also be easily satisfied.

Optionally, in an embodiment, as shown in FIG. 3, the bottom plate 11 includes a plate 116 and a plate 111, the plate 116 is located above the plate 111, the battery modules are arranged above the plate 116, and the above accommodating portion 113 is disposed within the height range between the plate 116 and the plate 111.

With the above structure, the high-voltage connection assembly 50 is accommodated in the accommodating portion 113 between the plate 116 and the plate 111 located below the battery modules, so that, for example, when the battery modules are moved due to a collision of the battery pack 100, the battery modules do not easily hit the high-voltage connection assembly 50 accommodated in the accommodating portion 113, and thereby it is possible to suppress problems such as damage to the high-voltage connection assembly 50 or damage to the electrical connection (including poor contact or electrical connection failure), which improves the safety of the battery pack 100. Here, the movement generated by the battery modules includes, for example, translation along the plate 116 or rotation with the bending of the plate 116.

Figure 11:
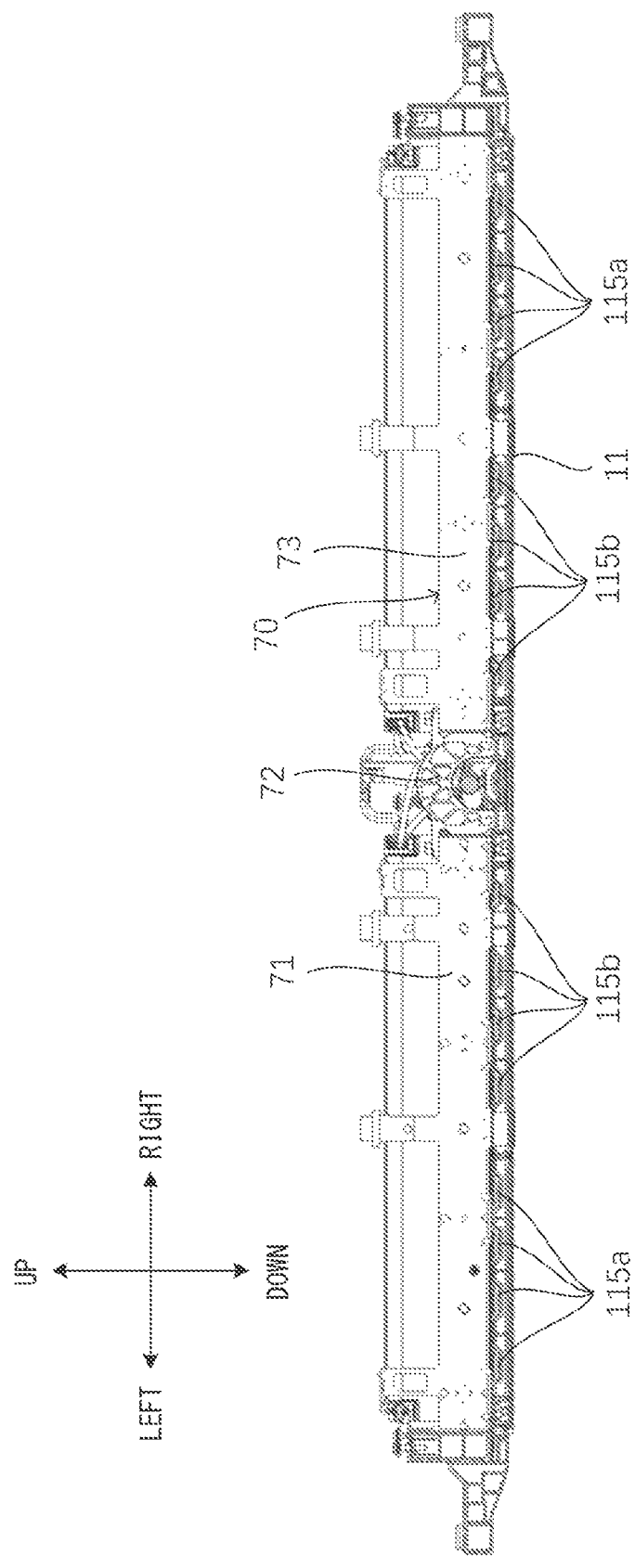
FIG. 11 is a cross-sectional view of the structure in FIG. 6.
Figure 13:
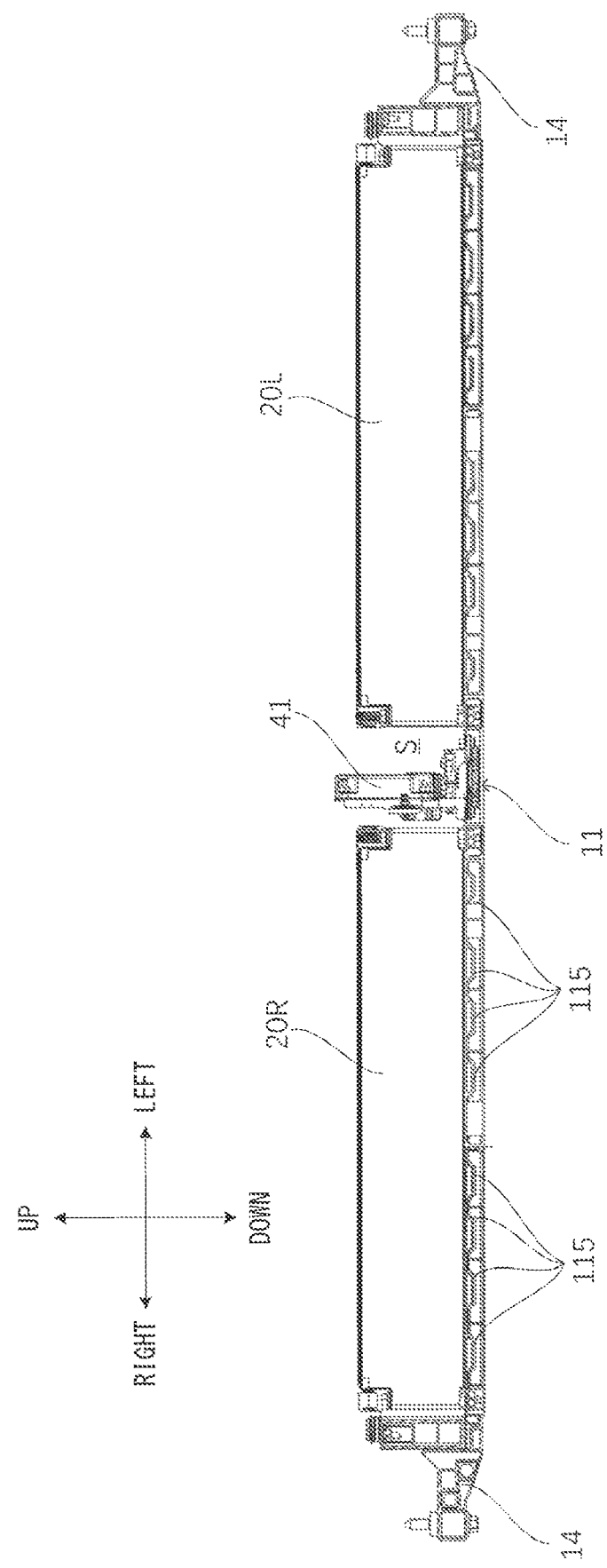
FIG. 13 is another cross-sectional view of the structure in FIG. 6.
Figure 14:
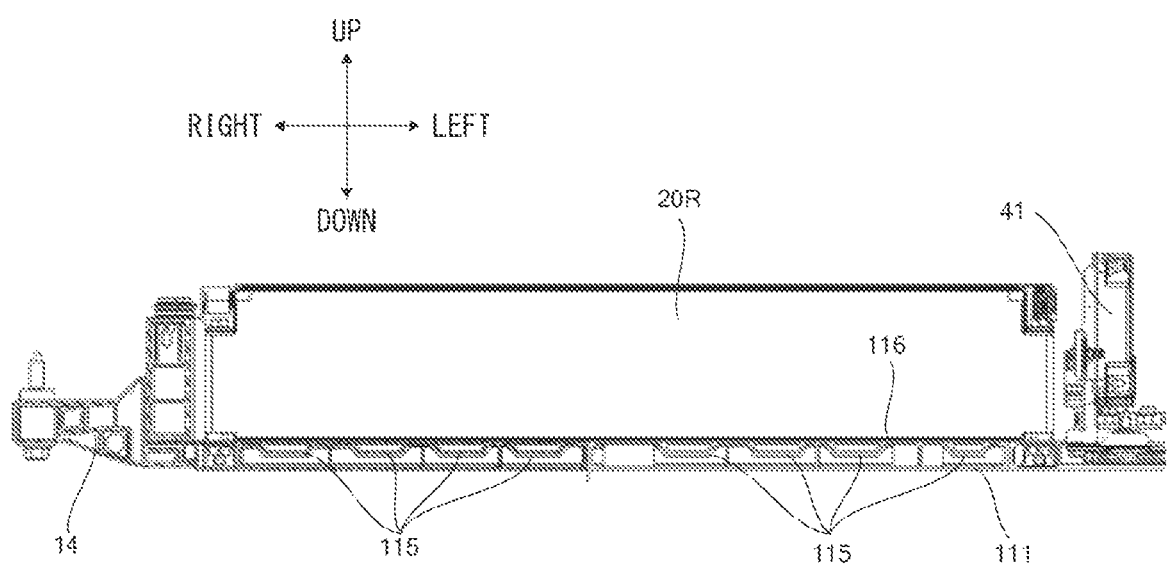
FIG. 14 is a partially enlarged view of the structure in FIG. 13.

Optionally, in an embodiment, as shown in FIG. 11, FIG. 13 and FIG. 14, cooling liquid channels 115 are disposed in the bottom plate 11.

With such a structure, the bottom plate 11 is internally provided with the cooling liquid channels 115, and therefore the bottom plate 11 needs to have a certain thickness to dispose the cooling liquid channels 115, and in the embodiment of the present disclosure, using such a bottom plate 11 to dispose the accommodating portion 113 to accommodate an electrical connection assembly does not increase the thickness of the bottom plate 11, which facilitates the miniaturization of the battery pack 100.

In addition, both the accommodating portion 113 and the cooling liquid channels 115 are disposed in the bottom plate 11, making full use of the space of the bottom plate 11 so that the structure of the battery pack 100 is more compact.

Further, by disposing both the accommodating portion 113 and the cooling liquid channels 115 in the bottom plate 11, the battery module 20 and the high-voltage connection assembly 50 can be easily cooled by the cooling liquid at the same time. The accommodating portion 113 and the cooling liquid channels 115 may be arranged in a direction perpendicular to the thickness direction of the bottom plate 11.

As other embodiments, the cooling liquid channels 115 may also be disposed at other positions, for example, above or outside the bottom plate 11.

Optionally, as shown in FIG. 11, FIG. 13, and FIG. 14, as an embodiment, in the bottom plate 11, the cooling liquid channels 115 are configured in the horizontal direction at a position facing the battery modules 20, and the accommodating portion 113 is configured at a position staggered from the battery modules 20. That is, the cooling liquid channels 115 are configured at a position overlapping with the battery modules 20 as viewed in the up-down direction, and the accommodating portion 113 is configured at a position staggered from the battery modules 20.

With the above structure, the accommodating portion 113 is configured at a position staggered from the battery modules 20 so that, on the one hand, it is possible to avoid affecting the cooling effect on the battery modules 20, and on the other hand, the accommodating portion 113 is as far from the battery modules 20L and 20R as possible, so that the electromagnetic waves of a high-voltage wire harness 51 in the high-voltage connection assembly 50 can be prevented from interfering with the battery modules 20.

As other embodiments, the accommodating portion 113 may also partially or fully face the battery module 20 in the horizontal direction, and the cooling liquid channels 115 and the accommodating portion 113 may also be configured to overlap each other up and down. Alternatively, as viewed in the up-down direction, the accommodating portion 113 is configured at a position to partially or fully overlap with the battery module 20.

Figure 6:
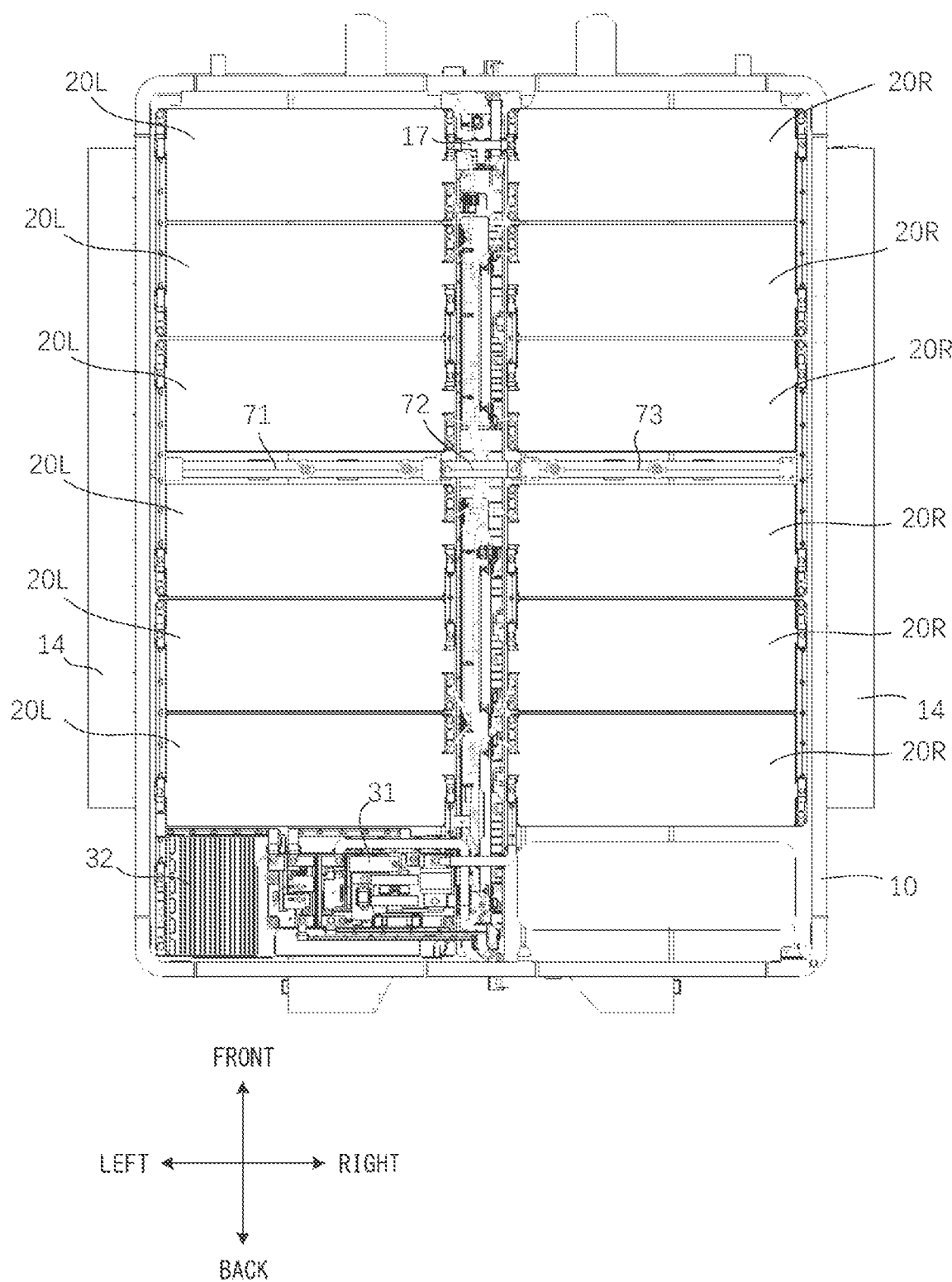
FIG. 6 is a structural top view in a state where the top cover is removed from the battery pack in FIG. 4.
Figure 7:
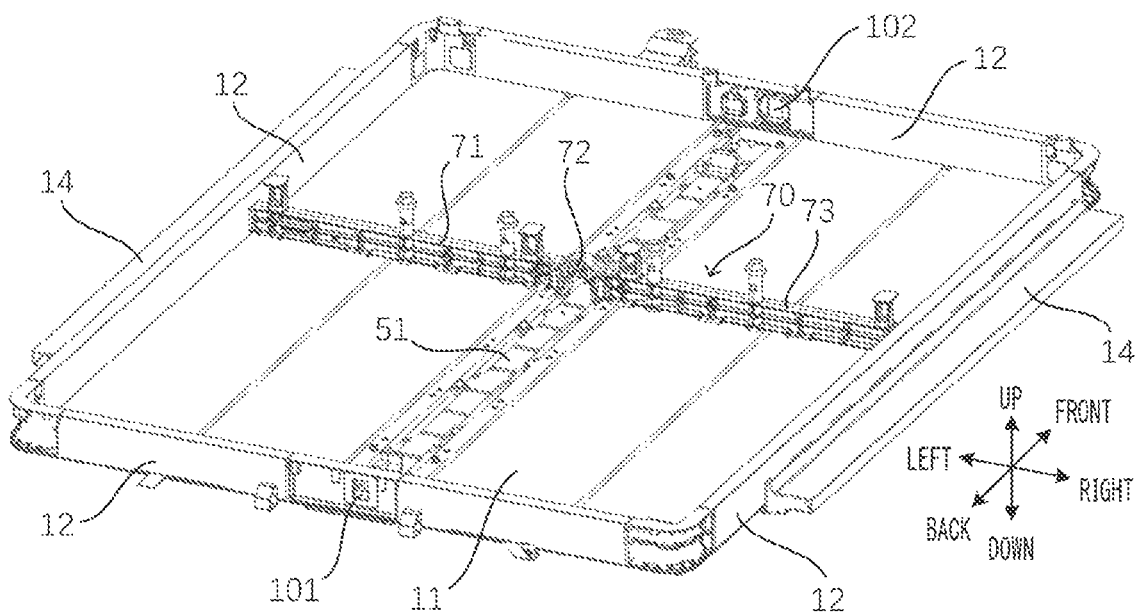
FIG. 7 is a schematic view of a part of the structure of a housing of the battery pack in FIG. 4.
Figure 8:
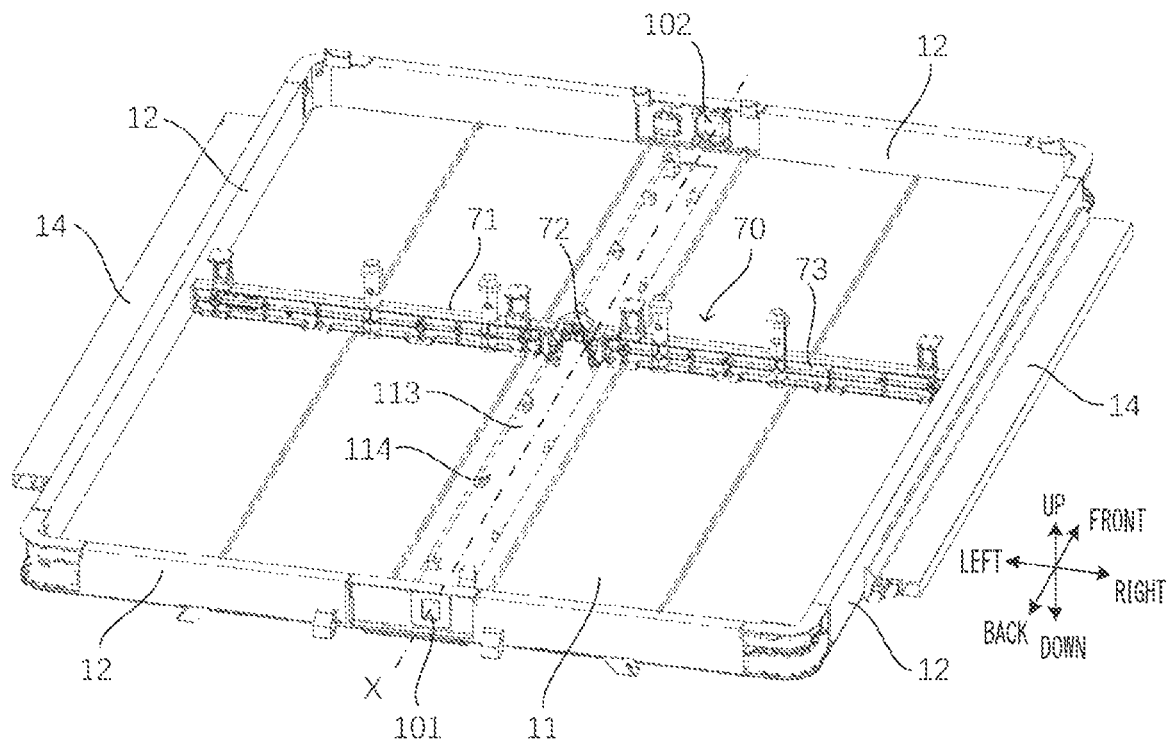
FIG. 8 is a structural schematic view in a state where a high-voltage wiring harness is removed in the structure in FIG. 7.

Optionally, in an embodiment, as shown in FIG. 6 to FIG. 8, a reinforcing component 72 is disposed above the bottom plate 11, specifically, the reinforcing component 72 is disposed above the plate 116.

With the above structure, the reinforcing member 72 is disposed above the plate 116, thus not only increasing the overall strength of the housing 10, but also not affecting disposition of the cooling liquid channels 115.

Optionally, in an embodiment, as shown in FIG. 8 and FIG. 11, the part of the cooling liquid channels 115 farther away from a center line X of the bottom plate 11 is upstream along the liquid flow and the part of the cooling liquid channels 115 closer to the center line X of the bottom plate 11 is downstream along the liquid flow, wherein the center line X extends in the direction of extension of the bottom plate 11.

With the above structure, since the part of the battery module close to the outer side portion is more susceptible to external influences, the battery module can be cooled well by cooling the part on the outer side portion first in this embodiment.

Optionally, in an embodiment, as shown in FIG. 3, FIG. 12, FIG. 15a, FIG. 16, and FIG. 17, the high-voltage connection assembly 50 includes the high-voltage wiring harness 51 and a high-voltage wiring harness bracket 112, the high-voltage wiring harness 51 is configured in the accommodating portion 113, and the high-voltage wiring harness bracket 112 covers the high-voltage wiring harness 51 from above, forming the top of the accommodating portion 113.

With the above structure, the high-voltage wiring harness 51 is accommodated by disposing a groove and the high-voltage wiring harness bracket 112 on the bottom plate 11 to form the accommodating portion 113, which not only makes reasonable use of the space of the housing 10, but also ensures the strength of the housing 10.

Optionally, in an embodiment, as shown in FIG. 3, etc., the low-voltage connection assembly 60 and the control device 41 are located above the high-voltage wiring harness bracket 112.

With the above structure, the space of the housing 10 is reasonably utilized so that the battery pack 100 can have a greater energy density and wiring of the high-voltage wiring harness 51 and the low-voltage wiring harness 61 is more reasonable.

Figure 12:
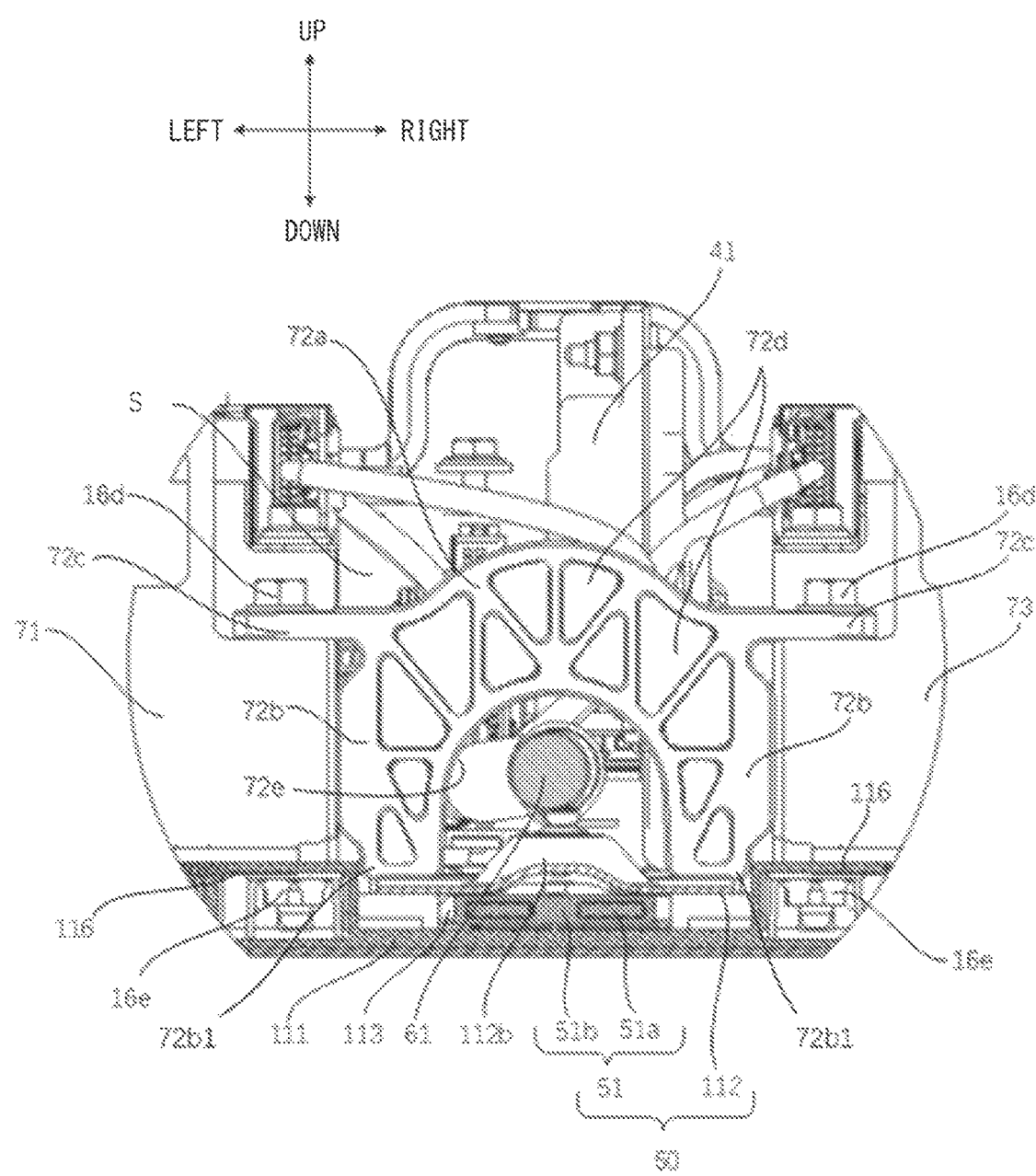
FIG. 12 is a partially enlarged view of the structure in FIG. 11.

Optionally, in an embodiment, as shown in FIG. 3, FIG. 12 and FIG. 15a, the low-voltage connection assembly 60 includes a low-voltage wiring harness 61 and a low-voltage wiring harness bracket 62, and the low-voltage wiring harness 61 is fixed to the high-voltage wiring harness bracket 112 by means of the low-voltage wiring harness bracket 62.

With the above structure, the low-voltage wiring harness 61 can be supported and protected by the low-voltage wiring harness bracket 62.

Optionally, in an embodiment, as shown in FIG. 3 and FIG. 12, the high-voltage wiring harness 51 includes a cladding layer 51b and conductive members 51a disposed within the cladding layer 51b, the cladding layer 51b being fixed to the high-voltage wiring harness bracket 112.

With the above structure, insulation of the conductive member 51a can be easily guaranteed by the cladding layer 51b, and the conductive members 51a can also be fixed to the high-voltage wiring harness bracket 112.

Optionally, in an embodiment, as shown in FIG. 12, the reinforcing component 72 is provided with an arched portion 72a disposed in the gap S.

With the above structure, the reinforcing component 72 can strengthen the housing 10 of the battery pack 100, and the arched portion 72a can effectively disperse the force and cushion deformation better when the battery pack 100 is crushed. In addition, the arched portion 72a allows the reinforcing component 72 to avoid interference with other components in the gap S, such as the low-voltage connection assembly 60. That is, the strength of the reinforcing component 72 is guaranteed while avoiding interference.

Optionally, in an embodiment, as shown in FIG. 6 to FIG. 8 and FIG. 10 to FIG. 12, the battery pack 100 further includes a first connection component 71 and a second connection component 73 disposed on the bottom plate 11, the first connection component 71 and the second connection component 73 extend in the direction of extension of the bottom plate 11, and both ends of the reinforcing component 72 are fixed to the first connection component 71 and the second connection component 73. The first connection component 71, the reinforcing component 72 and the second connection component 73 form a reinforcing assembly 70.

With the above structure, the first connection component 71, the reinforcing component 72 and the second connection component 73 can be formed separately, so that a generally long reinforcing assembly can be easily manufactured. In addition, the reinforcing assembly 70 can be easily mounted or dismounted.

Optionally, in an embodiment, as shown in FIG. 12, the reinforcing component 72 is provided with an arched portion 72a, and the low-voltage connection assembly 60 passes through the inner side of the arched portion 72a to be electrically connected to the battery module.

With the above structure, the reinforcing component 72 provided with the arched portion 72a is disposed independently of the first connection component 71 and the second connection component 73, and it is possible to easily form the reinforcing component 72 with a more complicated shape.

As shown in FIG. 1, an embodiment of the present disclosure provides a vehicle 200 including the above battery pack 100. With the vehicle 200, the same technical effects as those obtained by using the battery pack 100 can be obtained.

FIG. 1 to FIG. 29 illustrate an embodiment of the present disclosure, which will be described in detail below.

Vehicle

FIG. 1 is a schematic view of a vehicle according to an embodiment of the present disclosure. As shown in FIG. 1, the vehicle 200 is an electric vehicle and includes a battery pack 100, motors 210 and 220, and wheels 201 to 204. The battery pack 100 supplies power to the motors 210 and 220. The motor 210 is configured at the front of the vehicle 200, located in front of the battery pack 100, and used for driving the two wheels 201 and 203 at the front to rotate. The motor 220 is configured at the rear of the vehicle 200, located behind the battery pack 100, and used for driving the two wheels 202 and 204 located at the rear to rotate. When the driver performs manual driving or the vehicle 200 performs automatic driving, the battery pack 100 supplies power to the motor 210 and/or the motor 220, and the motor 210 and/or the motor 220 drive(s) the wheels 201 and 203 and/or the wheels 202 and 204 to rotate to move the vehicle 200 forward or backward.

There is no particular limitation on the type of the vehicle 200, which may be, for example, a saloon car, a truck, a passenger car, or a sport utility vehicle (SUV).

In addition, the vehicle 200 shown in FIG. 1 is a battery electric vehicle. However, the present disclosure is not limited to this and can also be applied to hybrid electric vehicles.

Further, in the vehicle 200 illustrated in FIG. 1, the two front and rear motors 210 and 220 are included, however, the number and configuration mode of motors in the present disclosure is not limited to this, for example, four wheel hub motors or wheel rim motors may also be included, or three motors are included, etc. When three motors are included, it is possible, for example, to configure one motor at the front of the vehicle 200 and configure two motors at the rear of the vehicle 200.

Whole Battery Pack

FIG. 2 is a schematic view of the principle of a battery pack according to this embodiment. As shown in FIG. 2, the battery pack 100 includes a housing 10, battery modules 20L and 20R, high-voltage connection assemblies 50 and 55, and a power distribution unit 31. The housing 10 accommodates the battery modules 20L and 20R. The battery modules 20L are configured in the left side region of the housing 10 and the battery modules 20R are configured in the right side region of the housing 10. Furthermore, the battery modules 20L and 20R are spaced apart in the left-right direction with a gap S disposed therebetween so that the housing 10 has an intermediate region between the left side region where the battery modules 20L are configured and the right side region where the battery modules 20R are configured. Herein, the letters L and R in the reference numerals "20L" and "20R" indicate left and right, respectively, and when no distinction is made between left and right, the battery modules 20L and 20R are referred to as the battery modules 20.

The power distribution unit 31 is responsible for transferring or transmitting electrical energy from the battery pack 100 to other high-voltage systems such as the motors 210 and 220 or an air conditioning compressor (not shown in the figures), etc.

In addition, as shown in FIG. 2, a connector 52 and a connector 53 are disposed on the front end portion and the rear end portion of the housing 10, respectively. All of the battery modules 20 are electrically connected to the power distribution unit 31 after being connected in series. The power distribution unit 31 is electrically connected to the front connector 52 via the high-voltage connection assembly 50, and the connector 52 is used for being electrically connected to the front motor 210. In addition, the power distribution unit 31 is electrically connected to the rear connector 53 via the high-voltage connection assembly 55, and the connector 53 is used for being electrically connected to the rear motor 220.

Here, the electrical connection between the connectors 52 and 53 and the motors 210 and 220 may be a direct electrical connection or an indirect electrical connection. For example, the electrical connection can be carried out through an on-board AC/DC power charger, an on-board DC/DC power converter, a vehicle high-voltage connection junction box, etc. In addition, the high-voltage connection assemblies 50 and 55 have a voltage of, for example, 400 V, 500 V, etc.

Further, as shown in FIG. 2, in this embodiment, the high-voltage connection assembly 50 extends, from the vicinity of the power distribution unit 31 through the intermediate region of the housing 10, forward to the vicinity of the connector 52. This will be described in more detail later.

FIG. 3 is another structural schematic view of the battery pack 100, representing a local structure near the central portion in the left-right direction. As shown in FIG. 3, the battery pack 100 further includes a plurality of control devices 41 of a battery management system (BMS) and a low-voltage connection assembly 60. The plurality of control devices 41 are used for intelligently managing and maintaining the various battery modules 20L and 20R to prevent overcharging and overdischarging so as to extend the service life and monitor the battery state, etc. The low-voltage connection assembly 60 is used for electrically connecting the control device 41 and the battery modules 20L and 20R. The-voltage of the low-voltage wiring harness 61 is, for example, 12 V.

In addition, both the high-voltage connection assembly 50 and the low-voltage connection assembly 60 are electrical connection assemblies in the present application. The structure of each component of the battery pack 100 will be described in detail below.

Housing

Figure 5:
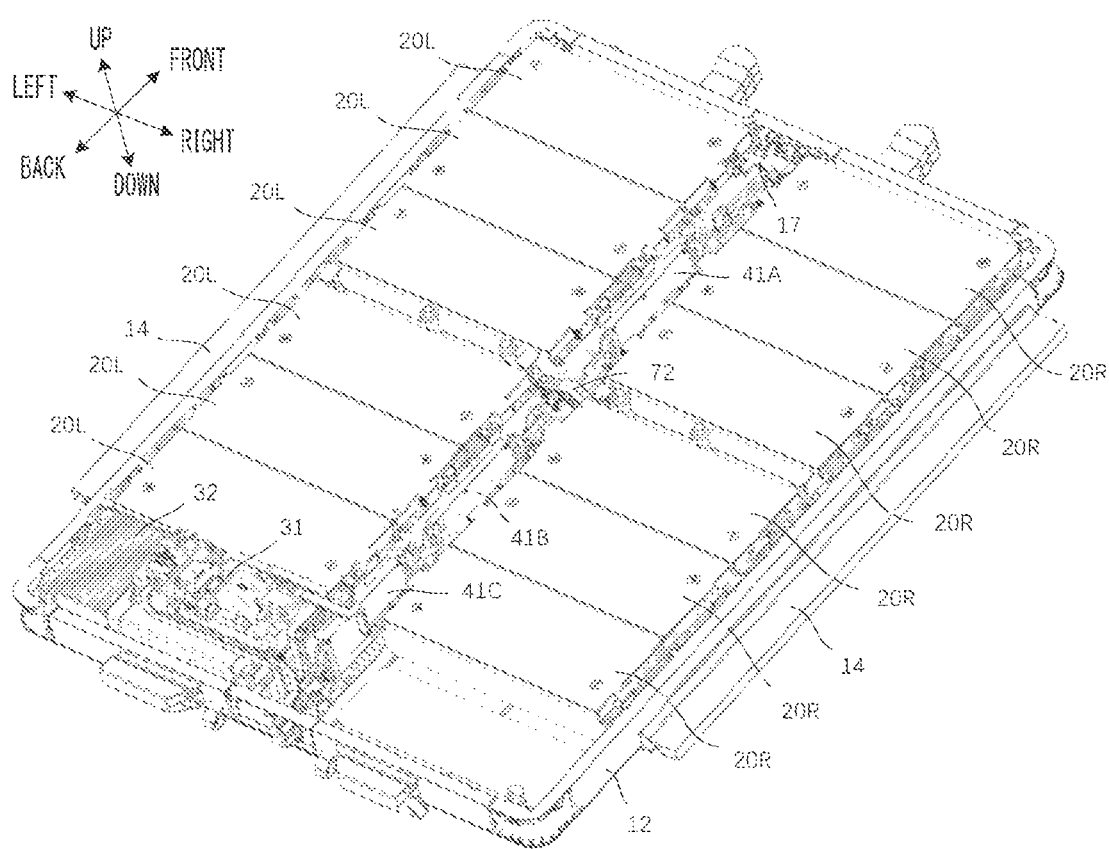
FIG. 5 is a three-dimensional structural schematic view in a state where a top cover is removed from the battery pack in FIG. 4.

FIG. 4 is a three-dimensional structural schematic view of the battery pack 100; FIG. 5 is a three-dimensional structural schematic view in a state where a top cover is removed from the battery pack in FIG. 4; FIG. 6 is a structural top view in a state where the top cover is removed from the battery pack in FIG. 4; FIG. 7 is a schematic view of a part of the structure of a housing of the battery pack in FIG. 4; and FIG. 8 is a structural schematic view in a state where a high-voltage wiring harness is removed from the structure in FIG. 7.

As shown in FIG. 4, FIG. 7, and FIG. 8, the housing 10 of the battery pack 100 is in a flat rectangular shape as a whole and includes a bottom plate 11, side plates 12, a top cover 13, and lifting lugs 14. The bottom plate 11 is substantially in a rectangular shape with the length direction consistent with the front-rear direction. Also, in this embodiment, the bottom plate 11 has a center line X extending in the front-rear direction and is substantially in a left-right symmetrical shape with respect to the center line X. In addition, in this embodiment, the center line X is also the center line of the housing 10, which means that the housing 10 is also substantially in a left-right symmetrical shape. The top cover 13 is substantially in the same rectangular shape as the bottom plate 11 and is configured opposite to the bottom plate 11 up and down. The side plates 12 extend upward from the peripheral edge portions of the bottom plate 11 to the top cover 13. The bottom plate 11, the top cover 13, and the side plates 12 together form a space that can accommodate a plurality of battery modules 20. In this embodiment, the side plates 12 are fixed to the bottom plate 11 and the top cover 13 is detachably mounted on the side plates 12. It will be understood that the shape of the battery pack 100 herein is only an illustration, and does not constitute a limitation on the present disclosure.

As shown in FIG. 4, FIG. 5, and FIG. 6, the lifting lug 14 is disposed on the outer wall faces of the side plates 12 in a protruding manner. Via the lifting lugs 14, the housing 10 and the battery pack 100 may be mounted on the vehicle body of the vehicle 200.

In addition, as shown in FIG. 4, at the front of the top cover 13, a window plate is mounted on the central portion in the left-right direction. The window portion (not shown in the figure) on the top cover 13 is opened by removing the window plate 15 so that the interior of the housing 10 can be seen. Before disassembling the battery pack 100 for maintenance, it is possible to open the window plate 15 and disconnect a high-voltage circuit first, and then the entire battery pack 100 is disassembled, thereby ensuring safe operation, etc.

Figure 15B:
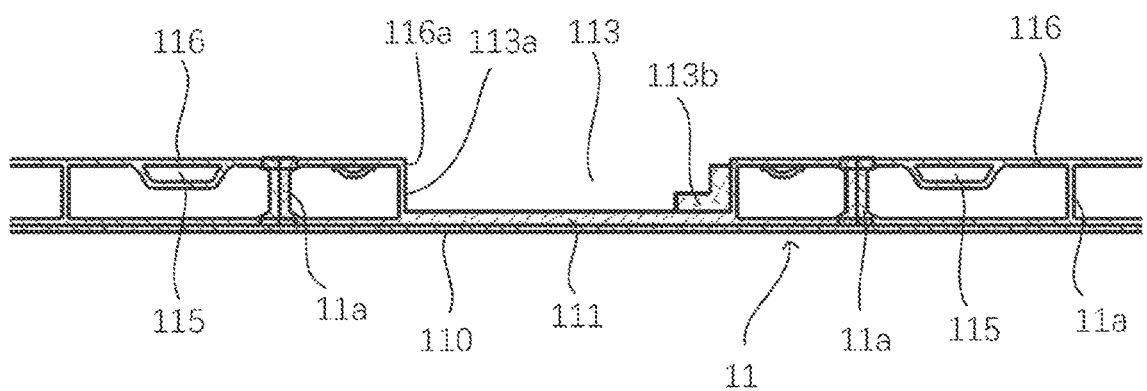

In addition, as shown in FIG. 8, a reinforcing assembly 70 is disposed in the housing 10, as shown in FIG. 15b, etc., the accommodating portion 113 and the cooling liquid channels 115 are disposed in the bottom plate 11, and these structures will be described later in detail.

In addition, as shown in FIG. 7 and FIG. 8, the front end portion and the rear end portion of the housing 10 are provided with a connection port 102 and a connection port 101, respectively, the connection port 102 being used for configuring the connector 52 (FIG. 2) to be able to connect the front motor 210. The connection port 101 is used for configuring the connector 53 (FIG. 2) to be able to connect the rear motor 220. In this embodiment, the connection port 101 and the connection port 102 are disposed on the side plates 12. As other embodiments, the connection ports can also be disposed on the top cover 13 or the bottom plate 11. Moreover, in this embodiment, the connection port 101 and the connection port 102 are configured in the central portion of the housing 10 in the left-right direction. As other embodiments, the connection port 101 and the connection port 102 can also be disposed at other positions.

Battery Modules and Related Structures

As shown in FIG. 2, FIG. 3, FIG. 5, and FIG. 6, there are a plurality of battery modules 20L and a plurality of battery modules 20R, which are arranged on the bottom plate 11 (specifically, the plate 11b) in the front-rear direction. Also, there is a gap S between the battery modules 20L and the battery modules 20R in the left-right direction. In addition, each of the battery modules 20L and 20R is substantially in a rectangular shape, with the height direction consistent with the up-down direction, the short side direction consistent with the front-rear direction, and the long side direction consistent with the left-right direction. That is to say, the plurality of battery modules 20L and the plurality of battery modules 20R are arranged in such a way that the long sides are adjacent to each other and the short sides are aligned.

In addition, as shown in FIG. 2 and FIG. 5, the positive electrode and the negative electrode of each battery module 20 are located at both ends in the left-right direction. Also, in the plurality of left battery modules 20L and the plurality of right battery modules 20R, the positive and negative electrodes of adjacent battery modules 20 are configured opposite to each other. That is, for example, if one left battery module 20L (or right battery module 20R) has the positive electrode at the left end and the negative electrode at the right end, then another left battery module 20L (or right battery module 20R) adjacent to it has the positive electrode at the right end and the negative electrode at the left end. In this way, the length of the wiring between the battery modules can be shortened by referring to the wiring between the adjacent left battery modules 20L (or right battery modules 20R) in FIG. 2.

In addition, the positive and negative electrodes of the adjacent or directly opposite battery modules 20 are configured opposite to each other between the plurality of battery modules 20L and the plurality of battery modules 20R. That is, for example, if one left battery module 20L has the positive electrode at the left end and the negative electrode at the right end, then one right battery module 20R adjacent to or directly opposite to it also has the positive electrode at the left end and the negative electrode at the right end. In this way, the length of the wiring between the battery modules can be shortened by referring to the wiring between two front-most battery modules 20L and in FIG. 2.

Figure 25:
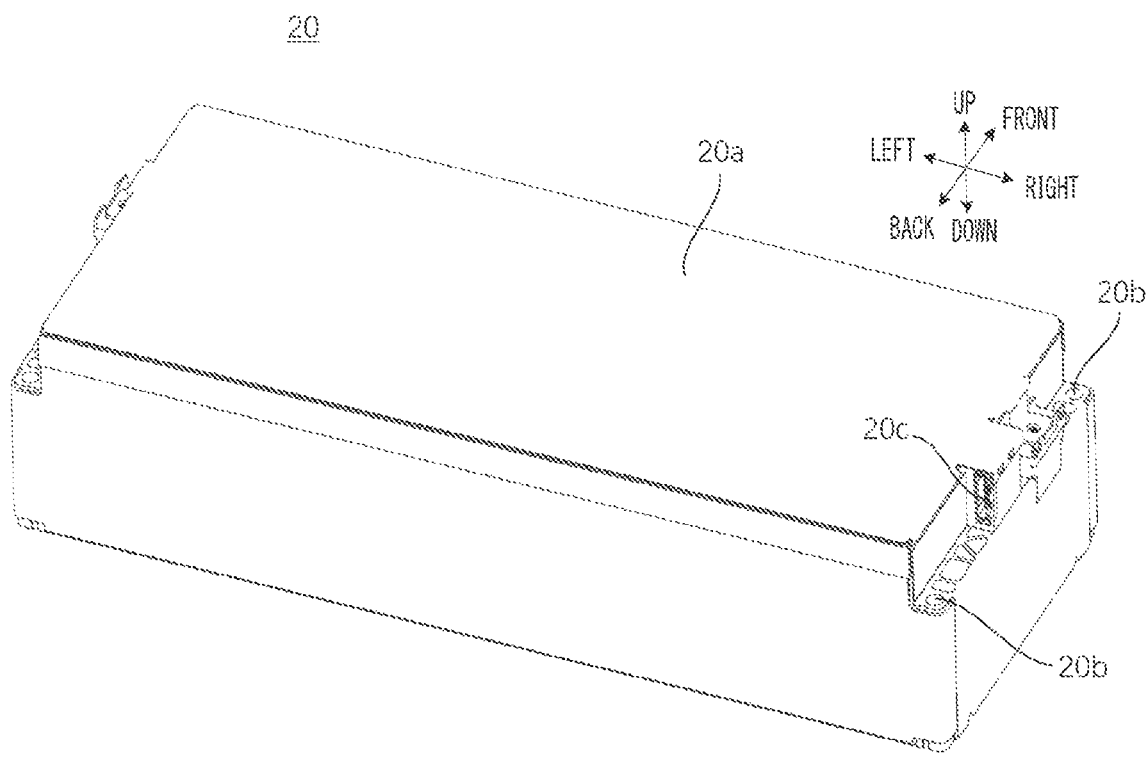
FIG. 25 is a three-dimensional structural schematic view of the battery module according to the embodiment of the present disclosure.

FIG. 25 is a three-dimensional structural schematic view of a battery module according to this embodiment. In addition, FIG. 25 illustrates one left battery module 20L, but the right battery modules 20R have the same structure as the left battery modules 20L except that they are configured in a different direction. As shown in FIG. 25, the battery module 20 is substantially in a rectangular shape, with the long side configured in the left-right direction, the short side configured in the front-rear direction, and the height direction consistent with the up-down direction. The battery module 20 has a main body portion 20a, and a plurality of mounting holes 20b are formed in the main body portion 20a. A plurality of bolts 21 (FIG. 22a, FIG. 15a) pass through the interiors of each of the mounting holes 20b to fix the battery module 20 to the bottom plate 11 of the housing 10.

In addition, as shown in FIG. 25 and FIG. 15a, a wiring port 20c is formed in one of the left and right end portions of the main body portion 20a, and the wiring port 20c is used for being electrically connected to a connector 66 of the low-voltage connection assembly 60 (FIG. 18 to FIG. 20) so as to be electrically connected to the control device 41 (FIG. 15, etc.). In this embodiment, as shown in FIG. 25, in the case where the battery module is the left battery module 20L, the wiring port 20c is located at the right end of the battery module 20L; in the case where the battery module is the right battery module 20R, the wiring port 20c is located at the left end of the battery module 20R. That is, the wiring port 20c is configured near the middle of the battery module 20, and near the end of the gap S between the left battery module 20L and the right battery module 20R. In this way, since the control device 41 is configured in the gap S, it is possible to configure the wiring port 20c close to the control device 41 and shorten the wiring length between the control device 41 and the battery module 20.

As shown in FIG. 5 and FIG. 6, a bridging bracket 17 is disposed between the two front-most battery modules 20L and 20R, and the bridging bracket 17 is in a bridge shaped and protrudes upward to be arched, with one end connected to the left battery module 20L and the other end connected to the right battery module 20R. The bridging bracket 17 shades near the position above terminal blocks 58 that will be described below, and the window plate 15 described above covers the position above the bridging bracket 17. The bridging bracket 17 is equivalent to a switch (manual service switch) for the high-voltage system circuit inside the battery pack 100, and before disassembling the battery pack 100 for maintenance, it is possible to first open the window plate 15 and then remove the bridging bracket 17 so that the high-voltage circuit cannot generate conduction and thus is disconnected, thereby allowing safe maintenance work to be performed on a high-voltage system.

The battery modules 20 may contain a plurality of battery cells (single cells), and the battery cells may be accommodated within the rectangular housing of the battery pack, and arranged in the direction of the long side of the housing of the battery pack. Obviously, the number of the battery cells does not constitute a limitation to the present disclosure, and even if the battery modules 20 have only one battery cell, it does not affect the implementation of the present disclosure.

High-Voltage Connection Assembly and Related Structures

Figure 9:
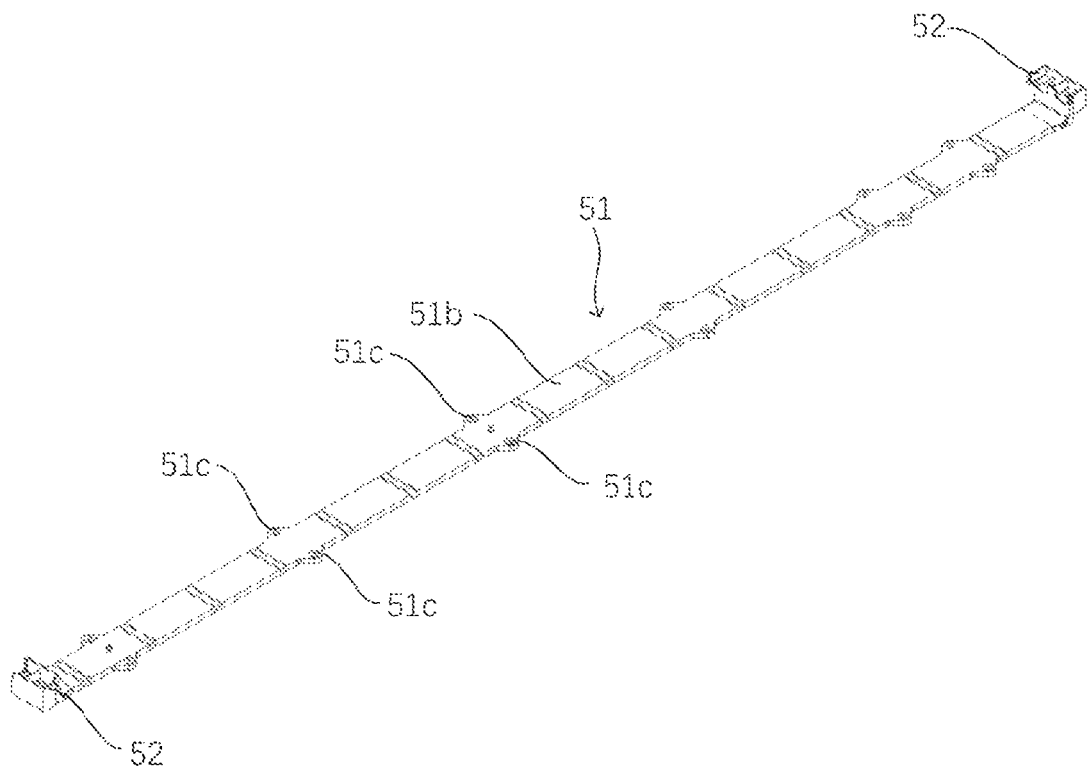
FIG. 9 is a structural schematic view of a high-voltage wiring harness according to the embodiment of the present disclosure.
Figure 17:
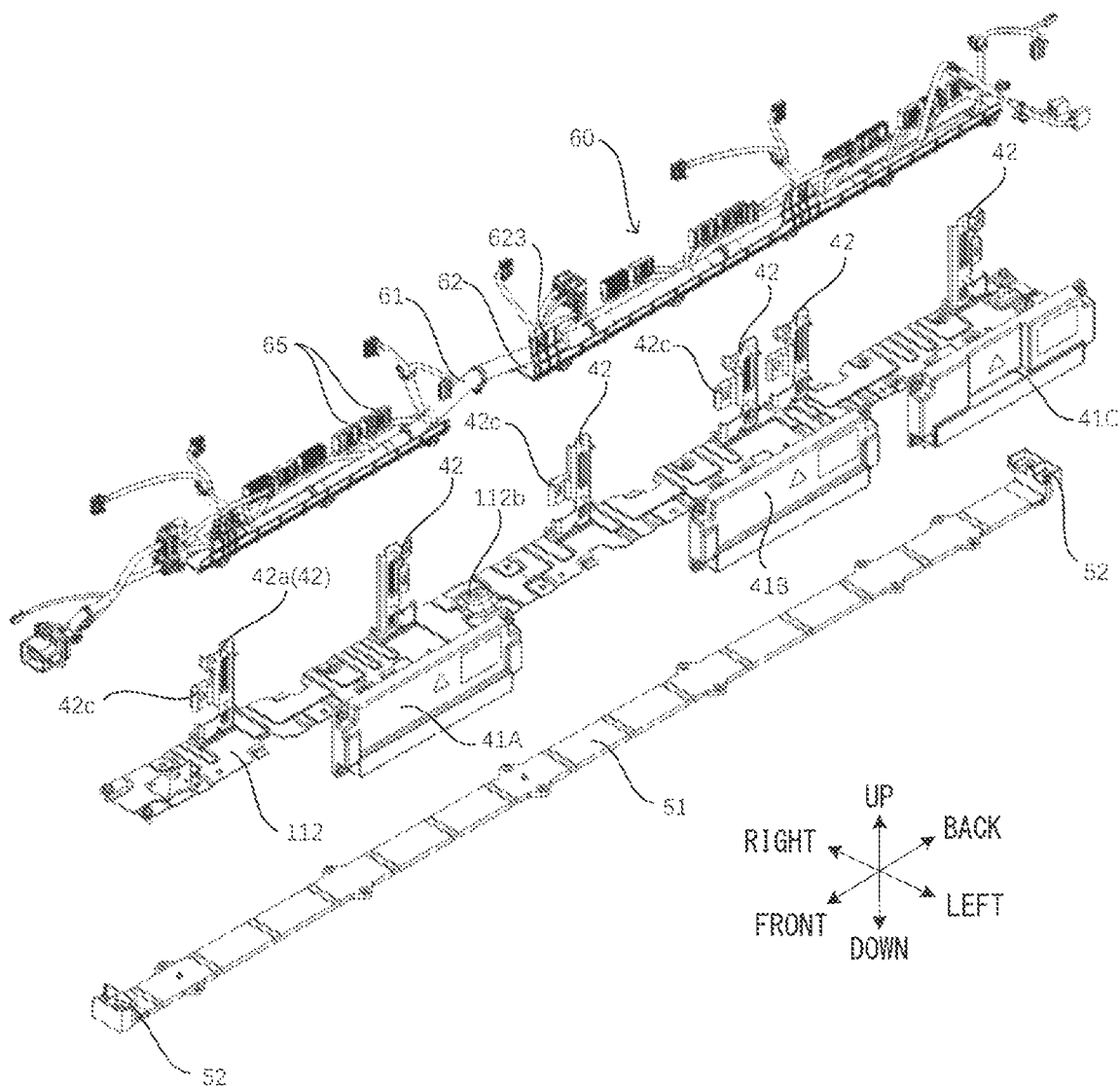
FIG. 17 is a schematic view showing a decomposition state of the structure in FIG. 16.
Figure 21A:
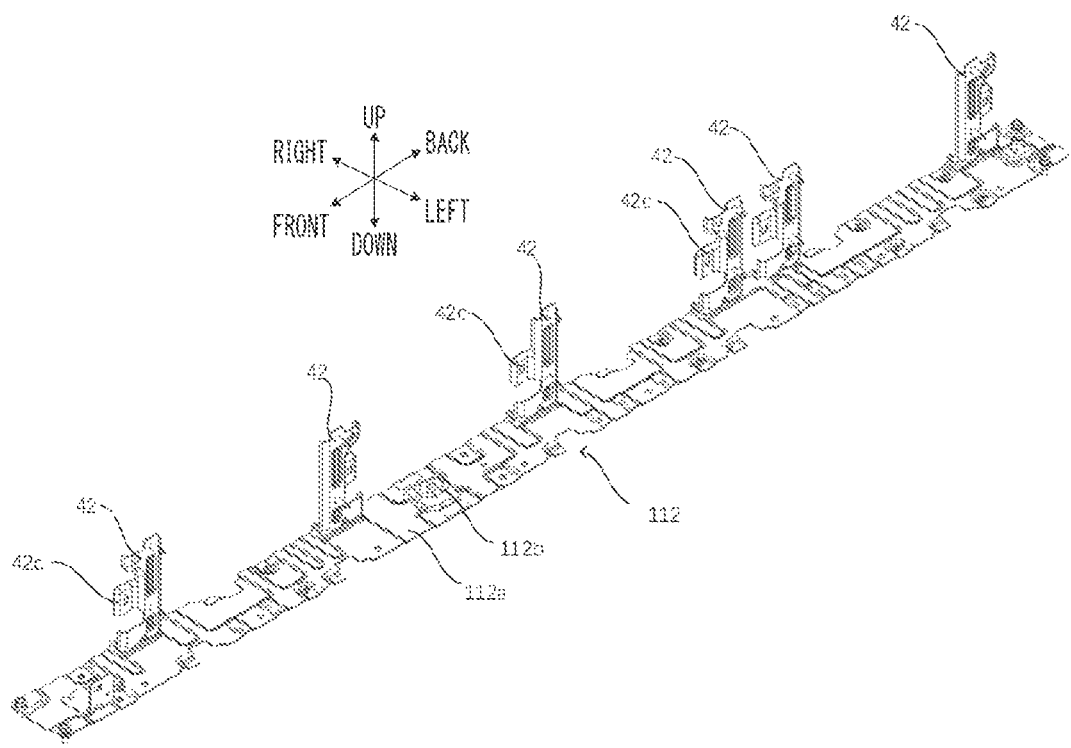
FIG. 21a is a structural schematic view showing a combination state of a high-voltage wiring harness bracket and a control device bracket according to the embodiment of the present disclosure.
Figure 21B:
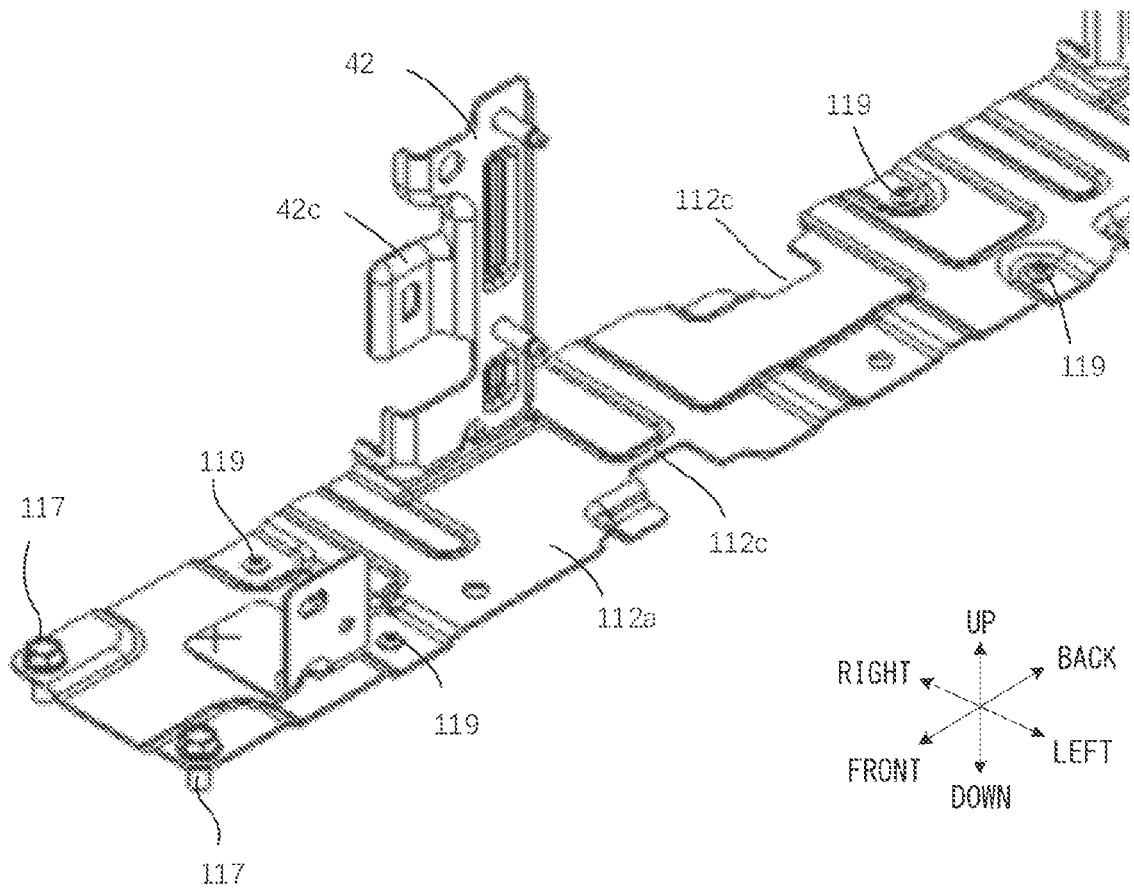
Figure 21C:
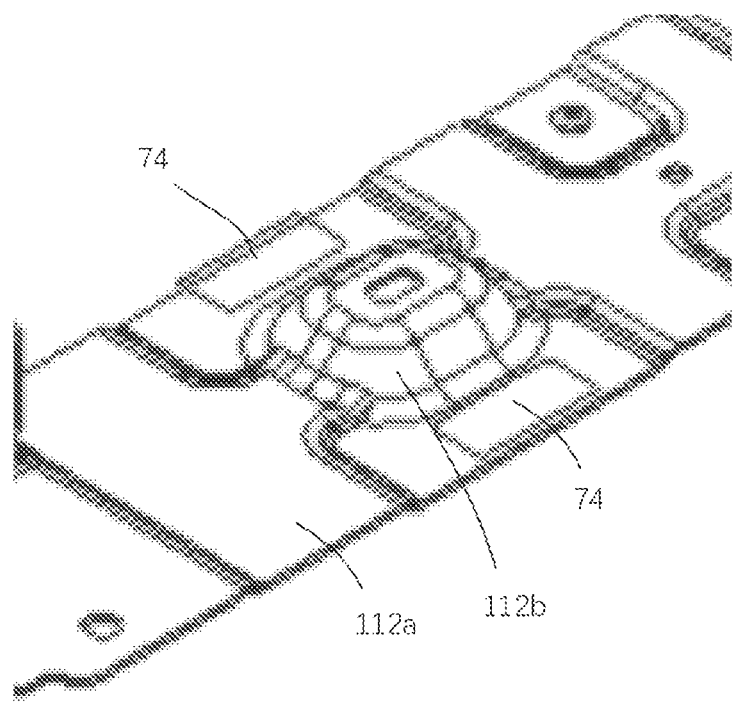
Figure 21D:
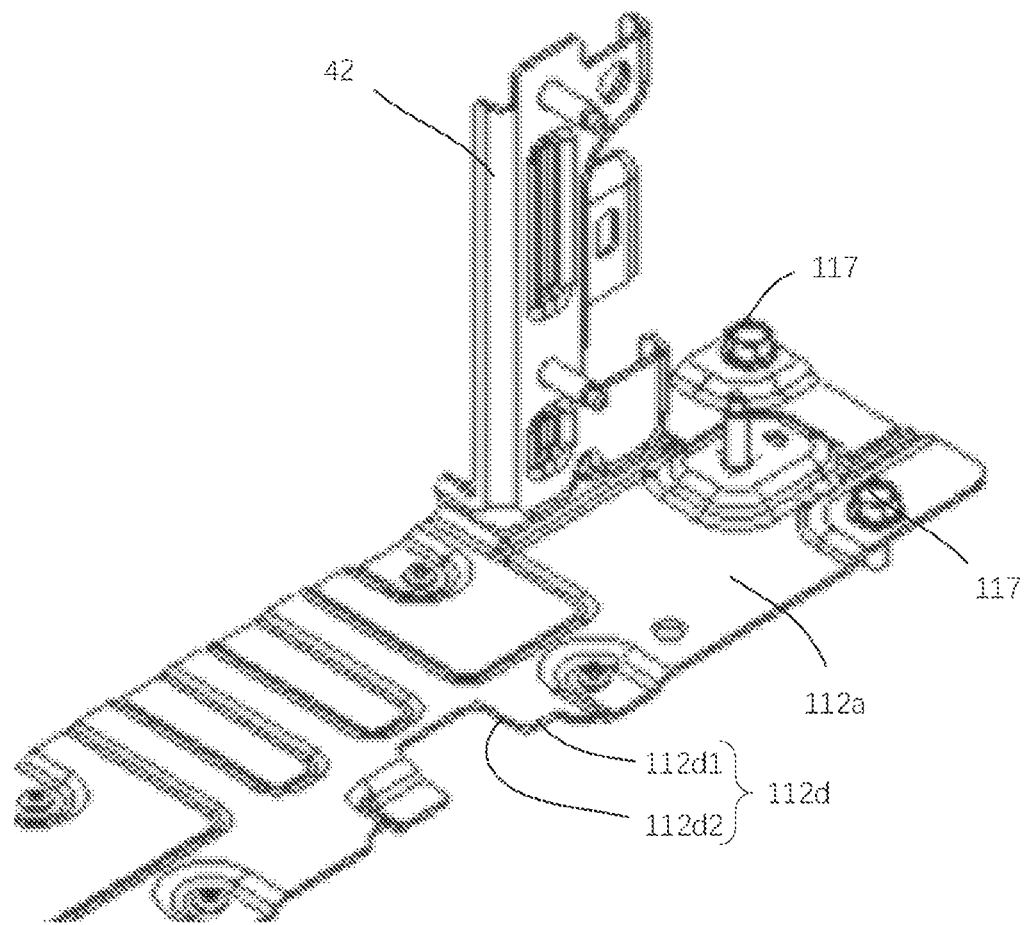

FIG. 9 is a structural schematic view of a high-voltage wiring harness according to this embodiment; FIG. 11 is a cross-sectional view of the structure in FIG. 6; FIG. 12 is a partially enlarged view of the structure in FIG. 11; FIG. 13 is another cross-sectional view of the structure in FIG. 6; FIG. 14 is a partially enlarged view of the structure in FIG. 13; FIG. 15a is another partially enlarged view of the structure in FIG. 13; FIG. 16 is a schematic view showing a combination state of a low-voltage connection assembly and a control device and a peripheral structure thereof according to this embodiment; FIG. 17 is a schematic view showing a decomposition state of the structure in FIG. 16; FIG. 21a is a structural schematic view showing a combination state of a high-voltage wiring harness bracket and a control device bracket according to this embodiment; FIG. 21b is a partially enlarged view of the structure shown in FIG. 21a; FIG. 21c is another partially enlarged view of the structure shown in FIG. 21a; and FIG. 21d is a still another partially enlarged view of the structure shown in FIG. 21a.

As shown in FIG. 3, FIG. 12, FIG. 15a, FIG. 16, and FIG. 17, the high-voltage connection assembly 50 includes a high-voltage wiring harness 51, terminal blocks 58 (an example of a connector), and a high-voltage wiring harness bracket 112. The high-voltage wiring harness 51 is an elongated component for transmitting electrical energy. The two terminal blocks 58 are disposed at both ends of the high-voltage wiring harness 51, one terminal block being for electrical connection to the power distribution unit 31 and the other terminal block being for electrical connection to the connector 52 (FIG. 2). The high-voltage wiring harness 51 is mounted on the high-voltage wiring harness bracket 112, and the high-voltage wiring harness bracket 112 is mounted on the bottom plate 11, i.e., the high-voltage wiring harness 51 is mounted on the bottom plate 11 by means of the high-voltage wiring harness bracket 112.

It will be understood that the "wiring harness" may be made of a plurality of wires or may be made of a single wire.

As shown in FIG. 2, FIG. 3, FIG. 9, FIG. 12, and FIG. 15a, the high-voltage wiring harness 51 is in a flat shape when viewed from the cross section, specifically in this embodiment, the cross section thereof is substantially in a flat rectangular shape. Here, the cross section is the cross section perpendicular to the wire length direction of the high-voltage wiring harness 51; the flat shape is a shape where the size in one dimension is smaller than the size in another dimension, for example, in the state in FIG. 12, the height of the high-voltage wiring harness 51 (the size in the up-down direction) is smaller than the width (the size in the left-right direction). Thus, the height direction of the high-voltage wiring harness 51 is also the thickness direction. It will be understood that the flat cable can be reduced in size in one direction compared to a round cable or a square cable, provided that the electrical conductivity is the same. For example, referring to the round low-voltage wiring harness 61 and the flat high-voltage wiring harness 51 illustrated in FIG. 12, it can be seen that the size of the high-voltage wiring harness 51 in the up-down direction is significantly smaller than that of the low-voltage wiring harness 61. Also, it may be noted that the comparison between the low-voltage wiring harness 61 and the high-voltage wiring harness 51 is intended to illustrate the characteristics of the flat high-voltage wiring harness 51, and there is no need for the electrical conductivity of the low-voltage wiring harness 61 and the high-voltage wiring harness 51 to be the same.

Referring to FIG. 3 and FIG. 12, the high-voltage wiring harness 51 includes conductive members 51a and a cladding layer 51b covering the conductive member 51a. The conductive members 51a are made of metal, and as an example of the material, copper may be used, i.e., the conductive members 51a are copper rows. Obviously, other conductive materials can be used for the conductive members 51a. As an example, the cladding layer 51b is an insulating layer, and as an example of its material, plastic may be used. Obviously, other materials, such as rubber, can be used for the cladding layer 51b.

Furthermore, in this embodiment, there are two conductive members 51a, each of which is covered by the cladding layer 51b, so that the cladding layer 51b reliably avoids a short circuit between the two conductive members 51a. Furthermore, in this embodiment, the conductive members 51a each have a substantially rectangular cross section and the cladding layer 51b also has a substantially flat rectangular cross section, and for both rectangles, the directions of the long sides are parallel to each other and the directions of the short sides are parallel to each other.

As shown in FIG. 3, FIG. 12, and FIG. 15a, the accommodating portion 113 is disposed on the bottom plate 11, and the high-voltage connection assembly 50 is configured in the accommodating portion 113.

As shown in FIG. 3, FIG. 12, FIG. 15a, and FIG. 15b, the bottom plate 11 of the housing 10 includes the plate 111 and the plate 116, the plate 111 and the plate 116 are configured opposite to each other up and down and spaced apart, the plate 116 is located above the plate 111, and the battery modules 20 are configured above the plate 116. The accommodating portion 113 is configured in the up-down direction within the height range between the plate 111 and the plate 116.

Thus, for example, when the vehicle is subjected to a lateral collision, the battery pack 100 deforms and the battery modules 20 moves in the horizontal direction, etc., however, since the high-voltage connection assembly 50 is configured in the bottom plate 11 below the battery modules 20, as a result, the battery modules 20 do not easily hit the high-voltage connection assembly 50, thereby inhibiting the occurrence of problems such as deformation, breakage, fracture, electric leakage, and damage to the electrical connection (including poor contact or electrical connection failure) of the high-voltage connection assembly 50, and improving the safety and reliability of the battery pack 100.

In this embodiment, the bottom plate 11 and the plates 111 and 116 are horizontally configured with the direction of extension thereof substantially consistent with the horizontal direction and the thickness direction substantially consistent with the up-down direction.

In addition, as shown in FIG. 11, FIG. 13, and FIG. 14, in this embodiment, the plurality of cooling liquid channels 115 are formed between the plate 111 and the plate 116. That is, the accommodating portion 113 is located between the plate 111 and the plate 116 along with the cooling liquid channels 115, so that the cooling liquid channels 115 can be easily used for cooling the high-voltage connection assembly 50 (high-voltage wiring harness 51).

In addition, the cooling liquid channels 115 are configured directly below the battery modules 20L and 20R, and when viewed in the up-down direction, the cooling liquid channels 115 overlap with the battery modules 20L or battery modules 20R. That is, the cooling liquid channels 115 are configured in the horizontal direction at a position opposite to the battery modules 20L and 20R, and are configured close to the battery modules 20L and 20R, thereby effectively cooling the battery modules 20L and 20R.

As shown in FIG. 13, FIG. 15a, etc., the accommodating portion 113 (and the high-voltage connection assembly 50 therein) is configured in the horizontal direction at a position staggered from the battery modules 20L and 20R, as viewed in the up-down direction. In this way, it is possible to use the part of the bottom plate 11 where the cooling liquid channels 115 are not configured to configure the accommodating portion 113, effectively utilizing the space of the bottom plate 11, making the battery pack 100 more compact in structure, and easily achieving miniaturization. On the one hand, the cooling effect on the battery modules 20 is not affected. On the other hand, by keeping the accommodating portion 113 as far as possible from the battery modules 20L and 20R, electromagnetic waves from the high-voltage wiring harness 51 can be prevented from interfering with the battery modules 20L and 20R.

In addition, in this embodiment, the battery modules 20L are configured on the left side portion of the bottom plate 11, the battery modules 20R are configured on the right side portion of the bottom plate 11, the accommodating portion 113 is disposed on the middle portion between the left side portion and the right side portion, and the high-voltage connection assembly 50 is configured in the accommodating portion 113. That is, in the bottom plate 11, the accommodating portion 113 is configured in the horizontal direction between the left battery modules 20L and the right battery modules 20R, opposite to the gap S, and coinciding with the gap S when viewed in the up-down direction. In this way, it is possible, for example, to reduce the impact force on the high-voltage wiring harness 51 during a collision and to suppress damage to the high-voltage wiring harness 51, compared to the case where the accommodating portion 113 is configured at a position near the outer side portion of the bottom plate 11 close to the left-right direction.

In addition, as shown in FIG. 3, FIG. 12, FIG. 15a, etc., in this embodiment, the high-voltage wiring harness 51, like the high-voltage connection assembly 50, is also in a flat shape as viewed from the cross section and is accommodated in the accommodating portion 113 in such a way that the thickness direction thereof is substantially consistent with the thickness direction of the bottom plate 11, that is, the high-voltage connection assembly 50 and the high-voltage wiring harness 51 are placed flat in the accommodating portion 113 In this way, the height position of the high-voltage wiring harness 51 can be reduced as much as possible on the basis of ensuring that the high-voltage wiring harness 51 can effectively transmit electrical energy, thereby effectively suppressing the impact on the high-voltage wiring harness 51 applied by the battery modules 20, and improving the safety of the battery pack 100. As mentioned above, the flat shape is a shape where the size in one dimension is smaller than the size in another dimension, and on this basis, it will be understood that the thickness direction of the flat high-voltage wiring harness 51 is the direction of the relatively smaller dimension of the two aforementioned dimensions, which in this embodiment is substantially consistent with the up-down direction.

As shown in FIG. 15b, the upper side of the accommodating portion 113 has an opening 116a, and the opening 116a may also be described as an opening formed in the plate 116. During assembly, the high-voltage connection assembly 50 can be placed into the accommodating portion 113 through the opening 116a. In addition, carrying portions 113b are disposed within the accommodating portion 113, and the carrying portions 113b are used for carrying and fixing the high-voltage wiring harness bracket 112. In this embodiment, the carrying portions 113b are in the shape of a step, and the high-voltage wiring harness bracket 112 is supported by the upper surface of the step. In addition, both the left side portion and the right side portion of the accommodating portion 113 can be provided with the carrying portions 113b. In addition, as shown in FIG. 15b, the housing 10 further includes a plate 110, and the plate 110 covers the position below the plate 111, for example to protect the plate 111. Further, in this embodiment, the accommodating portion 113 is formed in the shape of a long slot extending in the front-rear direction, with the opening 116a facing upward.

In addition, as shown in FIG. 12, FIG. 15a, and FIG. 17, in this embodiment, the high-voltage wiring harness 51 is mounted on the high-voltage wiring harness bracket 112 from below, and the high-voltage wiring harness bracket 112 covers the opening 116a to form the top of the accommodating portion 113. During assembling, the high-voltage wiring harness 51 can be mounted on the high-voltage wiring harness bracket 112 first, and then the high-voltage wiring harness bracket 112 with the high-voltage wiring harness 51 is mounted on the bottom plate 11. In this way, the high-voltage wiring harness 51 can be easily mounted and positioned.

Further, in this embodiment, the bottom of the accommodating portion 113 is formed by the plate 111.

Further, in this embodiment, the accommodating portion 113 extends from the front end portion of the bottom plate 11 to the rear end portion, and the high-voltage wiring harness bracket 112 is elongated and extends from the front end portion of the bottom plate 11 (or the plate 116) to the rear end portion, covering substantially the entire accommodating portion in the front-rear direction. Thus, the strength of the bottom plate 11 in the front-rear direction can be increased by the high-voltage wiring harness bracket 112. In addition, the high-voltage wiring harness bracket 112 is elongated, the high-voltage wiring harness 51 is elongated, and the high-voltage wiring harness bracket and the high-voltage wiring harness are configured in a consistent length direction, such that the high-voltage connection assembly 50 is also elongated and extends from the front end portion of the bottom plate 11 (or the plate 116) to the rear end portion.

Further, in this embodiment, the high-voltage wiring harness 51 is fixed to the high-voltage wiring harness bracket 112 by fixing the cladding layer 51b to the high-voltage wiring harness bracket 112. In this way, the cladding layer 51b ensures insulation of the conductive members 51a and also fixes the conductive members 51a to the high-voltage wiring harness bracket 112.

As a more specific structure, as shown in FIG. 9, the cladding layer 51b of the high-voltage wiring harness 51 is provided with protrusions 51c protruding outward on both side surfaces in the width direction, and the high-voltage wiring harness 51 is fixed to the high-voltage wiring harness bracket 112 by means of the protrusions 51c. Specifically, for example, through holes can be formed in the protrusions 51c so that rivets or screws 119 (FIG. 21b) can pass through the through holes to fix the high-voltage wiring harness 51 to the high-voltage wiring harness bracket 112. In addition, the present disclosure is not limited to this, for example, bayonets can be formed in the high-voltage wiring harness bracket 112 so that the protrusions 51c are clamped into the bayonets, thereby fixing the high-voltage wiring harness 51 to the high-voltage wiring harness bracket 112. In addition, in this embodiment, the plurality of protrusions 51c are disposed on each of both sides of the cladding layer 51b in the width direction, and the plurality of protrusions 51c are arranged in the length direction of the high-voltage wiring harness 51. In this way, the high-voltage wiring harness 51 is fixed to the high-voltage wiring harness bracket 112 at multiple positions in the length direction, thereby improving the bonding strength of the high-voltage wiring harness 51 and the high-voltage wiring harness bracket 112 and improving the strength of the high-voltage connection assembly 50, for example, the impact force from the front-rear direction can be effectively resisted.

Further, in this embodiment, the protrusions 51c are integrally formed with the cladding layer 51b.

In addition, the accommodating portion 113 may pass through the plate 116 in the front-rear direction, may not pass through the plate 116, or may pass through the plate at one end and not pass through the plate at the other end.

As shown in FIG. 12, FIG. 15a, etc., in this embodiment, the height of the high-voltage wiring harness bracket 112 is less than that of the plate 116, i.e., the high-voltage wiring harness bracket 112 is lower than the plate 116 in the up-down direction. Alternatively, as other embodiments, the height of the high-voltage wiring harness bracket 112 may be approximately the same as that of the plate 116, or may be greater than that of the plate 116.

In this embodiment, the high-voltage wiring harness bracket 112 is a metal part, so that electromagnetic waves of the high-voltage wiring harness 51 can be shielded, and the electromagnetic waves of the high-voltage wiring harness 51 can be prevented from interfering with the battery modules 20, etc. The high-voltage wiring harness bracket 112 is, for example, a sheet metal part. As other embodiments, the high-voltage wiring harness bracket 112 may be made of other materials, such as plastic.

By making the height of the high-voltage wiring harness bracket 112 less than that of the plate 116 or approximately equal to that of the plate 116, the case where, during horizontal movement of the battery modules 20, the battery modules hit against or crush the high-voltage connection assembly 50 and the high-voltage wiring harness 51 therein can be reliably prevented.

As shown in FIG. 3, FIG. 12, FIG. 15a, FIG. 16, etc., the low-voltage connection assembly 60 is disposed in the gap S above the high-voltage wiring harness bracket 112. The low-voltage connection assembly 60 is used for electrically connecting the control device 41 and the battery module 20. In this way, the low-voltage connection assembly 60 can be configured close to the high-voltage connection assembly 50, enabling a compact structure and efficient use of space, so that the space utilization within the battery pack 100 is improved.

In addition, in this embodiment, a reinforcing assembly 70 is disposed above the plate 116 in the transverse direction. In this way, the overall strength of the housing 10 can be increased, and in addition, disposing the cooling liquid channels 115 is not affected (the cooling liquid channels 115 can be disposed without considering avoiding the protrusion portion).

In this embodiment, as shown in FIG. 11, there are the plurality of cooling liquid channels 115, and the plurality of cooling liquid channels 115 are arranged from the middle of the left-right direction toward the outer side portion, as viewed in the front-rear direction. Cooling liquid channels 115a near the outer side portion are upstream along the liquid flow, and cooling liquid channels 115b near the middle are downstream along the liquid flow. That is, in the cooling liquid channels 115, the part that is farther from the center line X of the bottom plate 11, i.e., the cooling liquid channels 115a, is upstream along the liquid flow, and the part that is closer to the center line of the bottom plate 11, i.e., the cooling liquid channels 115b, is downstream along the liquid flow, and cooling liquid flows in from the cooling liquid channels 115a and flows out from the cooling liquid channels 115b. Thus, the cooling liquid cools the part of the battery modules 20 close to the outer side portion first, and in this way, the battery modules 20 can be cooled well. Specifically, the part of the battery modules 20 close to the outer side portion is more susceptible to external influences. Thus, in this embodiment, the part of the outer side portion is cooled first so that the battery modules 20 can be cooled well.

In addition, in this embodiment, one cooling liquid channel 115 is disposed near the periphery of the accommodating portion 113 so that the high-voltage connection assembly 50 (high-voltage wiring harness 51) can be effectively cooled.

In addition, the high-voltage connection assembly 50 may be completely accommodated in the accommodating portion 113, or partially accommodated in the accommodating portion 113. In this embodiment, the high-voltage wiring harness 51 is accommodated in the accommodating portion 113 as a whole, with the terminal blocks 58 at both ends partially protruding above the high-voltage wiring harness bracket 112, thereby enabling easy wiring operations.

As shown in FIG. 15b, in order to maintain stable spacing between the plate 111 and the plate 116, a plurality of protrusions 11a may be disposed on either or both of the plate 111 and the plate 116 to protrude toward the other plate. In this embodiment, the plate 111 and the plate 116 are formed separately and assembled together by bolts or welding, etc. As other embodiments, the plate 111 and the plate 116 may also be formed integrally. In this embodiment, the protrusions 11a are formed as a long-strip-shaped convex ribs extending in the front-rear direction.

As shown in FIG. 12, FIG. 15a, FIG. 16, FIG. 17, and FIG. 21a, the high-voltage wiring harness bracket 112 includes a main body portion 112a and a raised portion 112b. The main body portion 112a is substantially in a rectangular plate shape and has a plate face substantially configured horizontally so that the opening 116a of the accommodating portion 113 is covered well. The raised portion 112b rises upward from the main body portion 112a and is used for fixing a main wire portion 611 of the low-voltage wiring harness 61 (FIG. 16). This will be described in more detail later.

Figure 29:
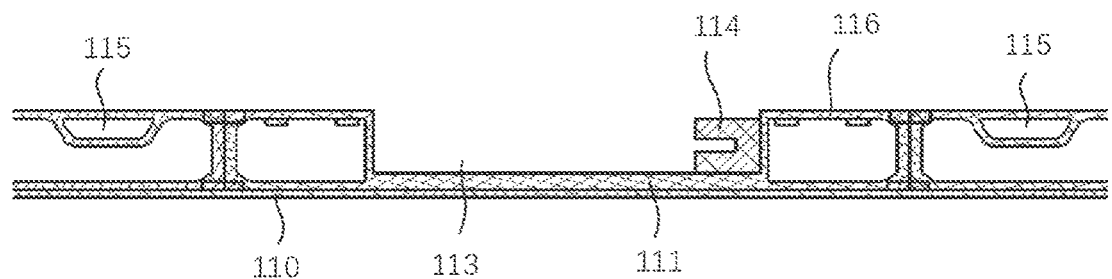
FIG. 29 is a schematic view of the structure of a bayonet portion according to the embodiment of the present disclosure.

As shown in FIG. 8 and FIG. 29, bayonet portions 114 are disposed on the left and right side wall faces 113a (FIG. 15b) of the accommodating portion 113, the bayonet portions 114 protrude from the left and right side wall faces 113a of the accommodating portion 113 and have grooves recessed toward the root side (the openings of the grooves face the middle of the accommodating portion 113 in the left-right direction), and the high-voltage wiring harness bracket 112 is embedded in the grooves, thereby limiting the movement thereof in the up-down direction and left-right direction. In addition, a plurality of the bayonet portions 114 are disposed on each of the left and right side wall faces of the accommodating portion 113 and arranged in the front-rear direction. In this way, the position of the high-voltage wiring harness bracket 112 can be reliably kept stable.

As shown in FIG. 21b, notch portions 112c are disposed on both side edges of the main body portion 112a in the width direction, the number of the notch portions 112c corresponds to the number of the bayonet portions 114 (FIG. 8) on the bottom plate 11, and the notch portions 112c can accommodate the bayonet portions 114. When assembling the high-voltage wiring harness bracket 112 on the bottom plate 11, each notch portion 112c is first aligned with the bayonet portion 114 so that the bayonet portion 114 enters the notch portion 112c, and in this state, the high-voltage wiring harness bracket 112 is moved in the front-rear direction so that the edge of the main body portion 112a is inserted into the bayonet portions 114, and the up-down movement of the high-voltage wiring harness bracket 112 is restricted by the bayonet portions 114.

In addition, in this embodiment, in order to easily insert the edge of the main body portion 112a into the bayonet portions 114, the opening width of the bayonet portions 114 (i.e., the opening size in the up-down direction) is larger than the thickness of the main body portion 112a, for example, it can be set at 1.5 times or more than 2 times the thickness of the main body portion 112a.

In addition, as a variation example, the bayonet portions 114 can be disposed on only one of the left and right side wall faces.

As shown in FIG. 21d, a positioning portion 112d is disposed at the edge of the main body portion 112a in the width direction, and the positioning portion 112d has a side portion 112d1 and a side portion 112d2, with the side portion 112d1 extending in a straight line shape in the length direction of the main body portion 112a and the side portion 112d2 extending in a straight line shape in the width direction of the main body portion 112a. The bottom plate 11 of the housing 10 is provided with a positioning portion (not shown in the figure) that matches with the positioning portion 112d, and the positioning portion on the bottom plate 11 matches the shape of the positioning portion 112d so that the high-voltage wiring harness bracket 112 can be positioned in the front-rear direction and the left-right direction.

As shown in FIG. 21b and FIG. 21d, a plurality of mounting holes (not shown in the figure) are formed in the main body portion 112a, and bolts 117 are mounted in the mounting holes to fix the high-voltage wiring harness bracket 112 to the bottom plate 11. In addition, in this embodiment, the mounting holes are formed in both the front and rear end portions of the main body portion 112a.

When mounting the high-voltage wiring harness bracket 112, each notch portion 112c is aligned with the bayonet portion 114 first, and then the high-voltage wiring harness bracket 112 is moved slightly downward so that the bayonet portions 114 enter the notch portions 112c. In this state, the high-voltage wiring harness bracket 112 is moved in the front-rear direction so that the positioning portion 112d on the main body portion 112a and the positioning portion on the bottom plate 11 abut against each other in the front-rear direction, and then the high-voltage wiring harness bracket 112 is adjusted so that the positioning portion 112d and the positioning portion on the bottom plate 11 abut against each other in the left-right direction, thereby positioning the high-voltage wiring harness bracket 112 in the front-rear direction and the left-right direction. At the same time, the left and right edges of the main body portion 112a are inserted into the bayonet portions 114 of the bottom plate 11, so that the movement of the high-voltage wiring harness bracket 112 in the up-down direction is limited by the bayonet portions 114. In this state, the bolts 117 pass through the mounting holes in the main body portion 112a to fix the high-voltage wiring harness bracket 112 to the bottom plate 11.

As shown in FIG. 21c, a cushioning component 74 may be placed on each of the left and right side portions of the main body portion 112a at the raised portion 112b, and the cushioning components 74 are clamped by the main body portion 112a and a reinforcing component 72 of the reinforcing assembly 70 that will be described later (FIG. 12), to cushion the pressure of the reinforcing assembly 70 or the reinforcing component 72 on the high-voltage wiring harness bracket 112. For example, the cushioning components 74 may be metal parts, rubber parts, plastic parts or felt parts, with no special limitation on the material thereof.

In this embodiment, the high-voltage wiring harness bracket 112 is fixed to the high-voltage wiring harness 51, thereby enhancing the strength of the bottom plate 11 in the front-rear direction. In addition, the flat high-voltage wiring harness 51 is fixed to overlap with the plate-shaped high-voltage wiring harness bracket 112, which can further enhance the strength.

Power Distribution Unit and Related Structures

As shown in FIG. 2, FIG. 5, and FIG. 6, the power distribution unit 31 is mounted within the housing 10.

As described above, the power distribution unit 31 is used for transferring or transmitting electrical energy from the battery pack 100 to other high-voltage systems such as the motors 210 and 220 or an air conditioning compressor (not shown in the figure), etc. In this embodiment, as shown in FIG. 2, FIG. 5, FIG. 6, etc., the power distribution unit 31 is configured on the rearmost battery module 20L of the plurality of battery modules 20L. The power distribution unit 31 may include a relay, a current sensor, a fuse, a pre-charged resistor, etc., where the relay may be considered as a high-current switch that cuts off the current flowing through a busbar and electrically isolates a high-voltage battery from the rest of the high-voltage system. The current sensor is used for detecting the current flowing through the circuit. The pre-charged resistor is used for protecting the system against damage caused by a surging power supply.

In this embodiment, the power distribution unit 31 is mounted at the rear inside the housing 10. In this way, compared with the case where the power distribution unit 31 is mounted in the middle, it is easy to overhaul and replace the power distribution unit 31.

In addition, as shown in FIG. 2, the connector 53 is disposed at the rear of the housing 10, and the power distribution unit 31 is configured at the rear of the housing 10, and configured near the connector 53, so that the wiring length between the power distribution unit 31 and the connector 53 is shorter and wiring can be easy. Specifically, since the power distribution unit 31 is close to the connector 53, the high-voltage connection assembly 50 connecting the power distribution unit 31 and the connector 53 is shorter, and the high-voltage connection assembly is less susceptible to impact or crushing caused by the battery module 20 when not disposed in the bottom plate 11. In this way, only one of the high-voltage connection assembly 50 and the high-voltage connection assembly 55 needs a complex mounting operation of being configured in the bottom plate 11, and the other does not need a complex mounting operation of being configured in the bottom plate 11, thereby enabling easy wiring and shortening mounting time.

As shown in FIG. 4, a protrusion 13a is disposed on the rear upper surface of the top cover 13 of the housing 10, and the inner side of the protrusion 13a is a concave portion for accommodating the power distribution unit 31. In this embodiment, the power distribution unit 31 is configured near the connector 53, so that the protrusion 13a accommodating the power distribution unit 31 can be disposed at the rear of the housing and the front of the housing 10 of the battery pack 100 does not have a larger protruding part, thereby allowing more space in the cabin of the vehicle corresponding to the position of the battery pack 100 to accommodate the feet of passengers.

In addition, the power distribution unit 31 is mounted on the battery modules 20 from above. In this way, the size of the gap S can be reduced, the size of the battery pack 100 in the left-right direction can be reduced, and the energy density of the battery pack 100 can be increased compared with the case where the power distribution unit 31 is configured in the gap S.

In addition, the power distribution unit 31 is mounted on a single battery module 20. In this way, compared with the case where the power distribution unit 31 is connected to two or more battery modules 20 in a bridging mode, the convenience of mounting the power distribution unit 31 can be improved, the stability of the power distribution unit 31 is also improved, and the overall space occupied by the power distribution unit 31 can be reduced.

In this embodiment, the power distribution unit 31 is mounted on a single battery module 20L, and the battery module 20L on which the power distribution unit 31 is mounted is the rearmost one of the plurality of battery modules 20L. Alternatively, as other embodiments, the power distribution unit 31 is not limited to being mounted on the rearmost battery module 20L, but may also be configured on the other battery modules at the rear. Further, as other embodiments, the power distribution unit 31 may also be mounted on the battery modules 20R.

Figure 22A:
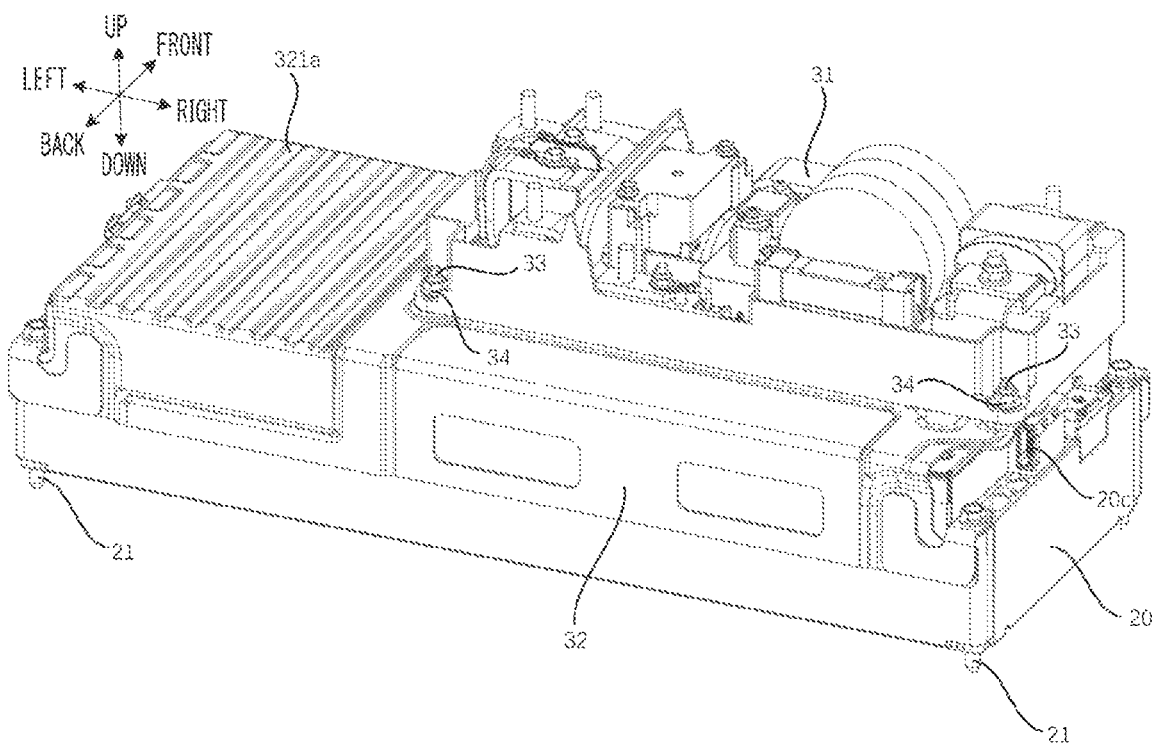
FIG. 22a is a three-dimensional structural schematic view showing a combination state of a battery module, a power distribution unit bracket and a power distribution unit according to the embodiment of the present disclosure.
Figure 22B:
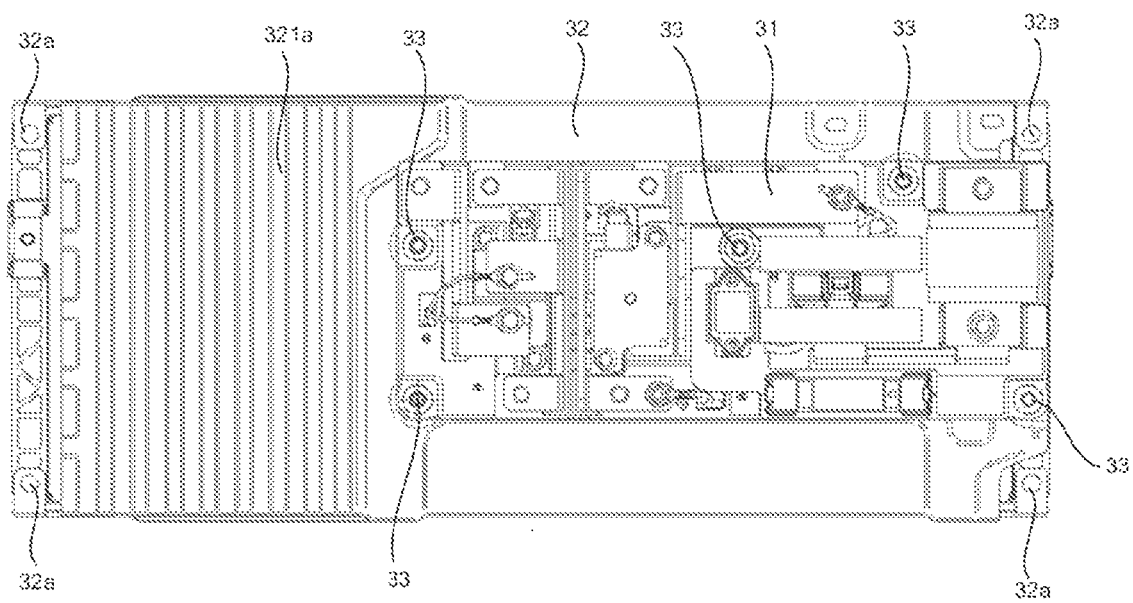
Figure 23:
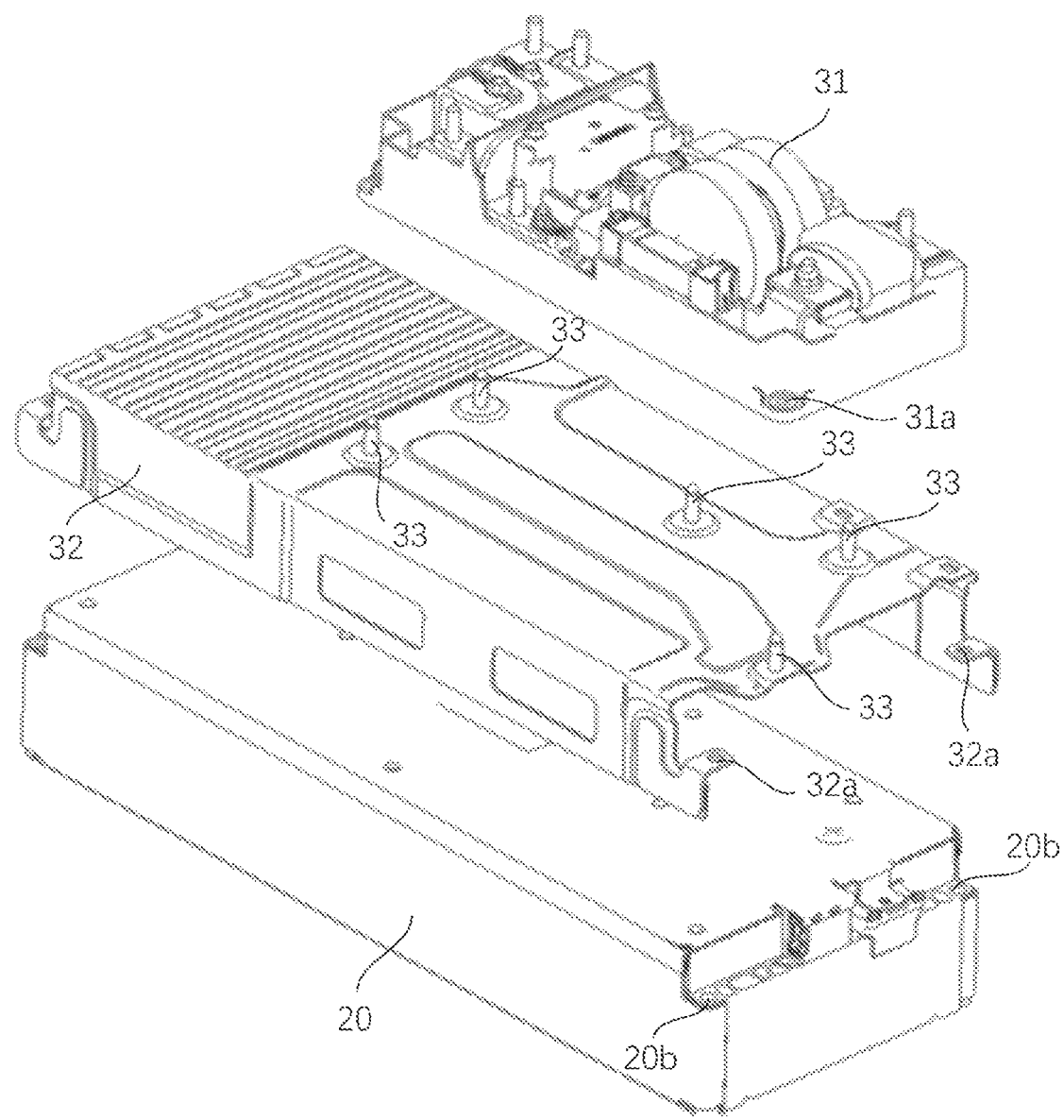

FIG. 22a is a three-dimensional structural schematic view showing a combination state of the battery modules, a power distribution unit bracket and the power distribution unit according to this embodiment; FIG. 22b is a top view of the structure in FIG. 22a; FIG. 23 is a structural schematic view showing a decomposition state of the structure in FIG. 22a; and FIG. 24 is a three-dimensional structural schematic view of the power distribution unit bracket according to this embodiment.

As shown in FIG. 22a and FIG. 22b, the power distribution unit 31 is mounted on the battery modules 20L by means of the power distribution unit bracket 32. In this way, a special bracket is disposed to mount the power distribution unit 31, which can improve the stability of the power distribution unit.

Figure 24:
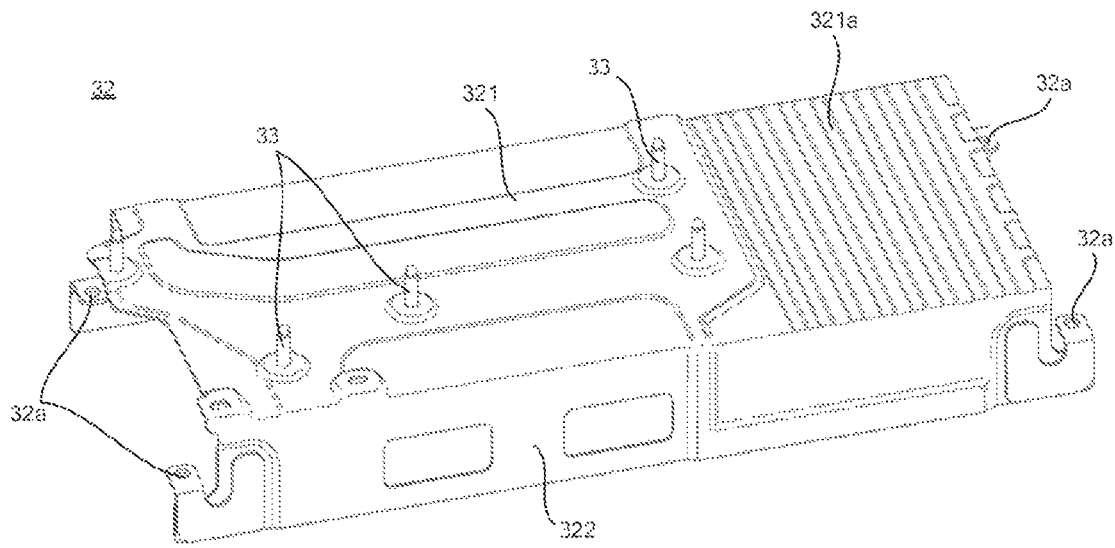
FIG. 24 is a three-dimensional structural schematic view of the power distribution unit bracket according to the embodiment of the present disclosure.

As shown in FIG. 22a and FIG. 24, the power distribution unit bracket 32 includes a top portion 321 and side portions 322. The top portion 321 is roughly in a plate shape and is used for covering the upper surface of the battery module 20. There are two side portions 322, which extend downward from each of the front and rear ends of the top portion 321, to cover the side surfaces of the battery modules 20. By forming such a shape, the top portion 321 of the power distribution unit bracket 32 fits the upper surface of the battery modules 20 and the side portions 322 fit the side surfaces of the battery modules 20, so that on the one hand, the connection strength can be improved and the power distribution unit 31 is kept at a stable position; and on the other hand, the power distribution unit bracket 32 and the battery modules 20 can be compact in structure, avoiding the case where the size of the power distribution unit bracket 32 is too large, reducing the occupied space, and facilitating the miniaturization of the battery pack 100.

As other embodiments, there may be only one side portion 322. In addition, a plurality of mounting holes 32a are formed in the side portion 322, and the mounting holes 32a are used for mounting the power distribution bracket 32 on the battery pack 20.

More specifically, a plurality of mounting holes 20b are formed in the battery module 20 as shown in FIG. 23 and FIG. 25. As shown in FIG. 15a and FIG. 22a, bolts 21 pass through the mounting holes 32a and the mounting holes 20b in sequence and are screwed into nuts 22 disposed in the bottom plate 11, so that the structure (the bolts 21 and nuts 22) for mounting the battery module 20 on the bottom plate 11 can be used for mounting the power distribution unit bracket 32 on the battery modules 20, without the need for additionally disposing a mounting structure on the battery modules 20, thereby simplifying the structure and reducing the manufacturing cost.

In this embodiment, the mounting holes 32a is configured above the mounting holes 20b, but as other embodiments, the mounting holes 32a can also be configured below the mounting holes 20b, i.e., the part of the power distribution unit bracket 32 where the mounting holes 32a are formed is inserted between the battery modules 20 and the bottom plate 11. It can be seen that "bolts 21 pass through the mounting holes 32a and the mounting holes 20b in sequence" herein is not limited to the bolts 21 passing through the mounting holes 32a first and then passing through the mounting holes 20b, but rather the bolts 21 may pass through one of the mounting holes 32a and the mounting holes 20b and then the other.

In addition, as shown in FIG. 22a, FIG. 22b, FIG. 23, and FIG. 24, a plurality of bolts 33 are disposed on the upper surface of the top portion 321 of the power distribution unit bracket 32, and the bolts 33 are used for mounting the power distribution unit 31 on the power distribution unit bracket 32. Specifically, by making the bolts 33 pass through the mounting holes 31a in the power distribution unit 31 and screwing the nuts 34 on the parts protruding from the mounting holes, it is possible to mount the power distribution unit on the power distribution unit bracket 32.

Figure 26:
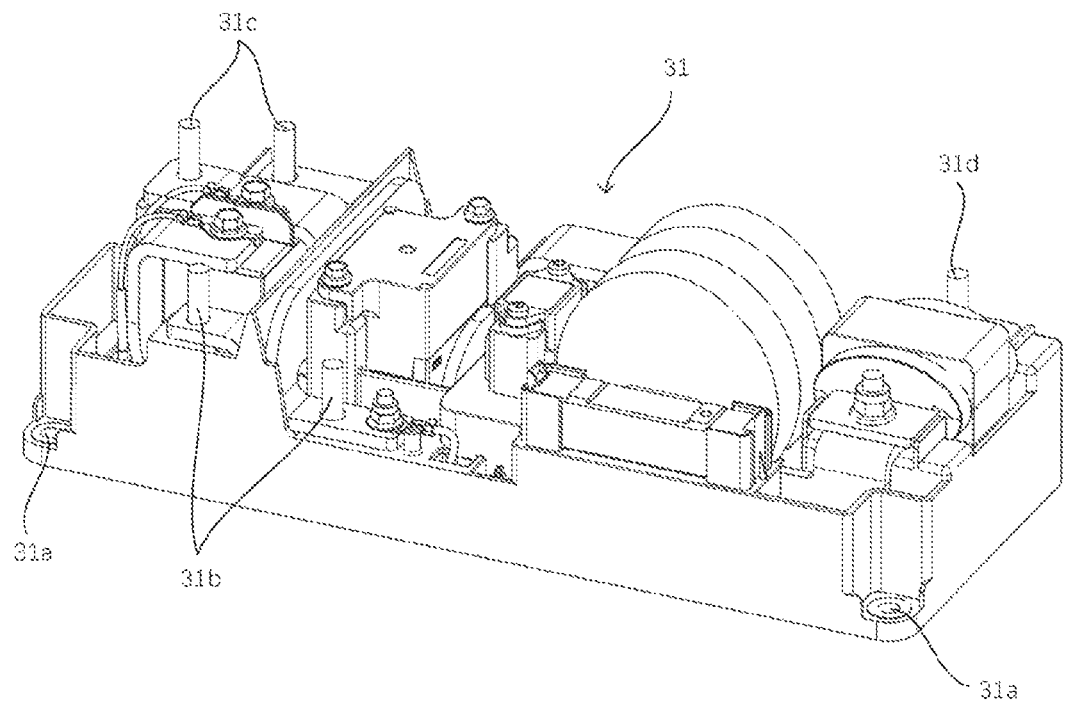
FIG. 26 is a three-dimensional structural schematic view of the power distribution unit according to the embodiment of the present disclosure.
Figure 27:
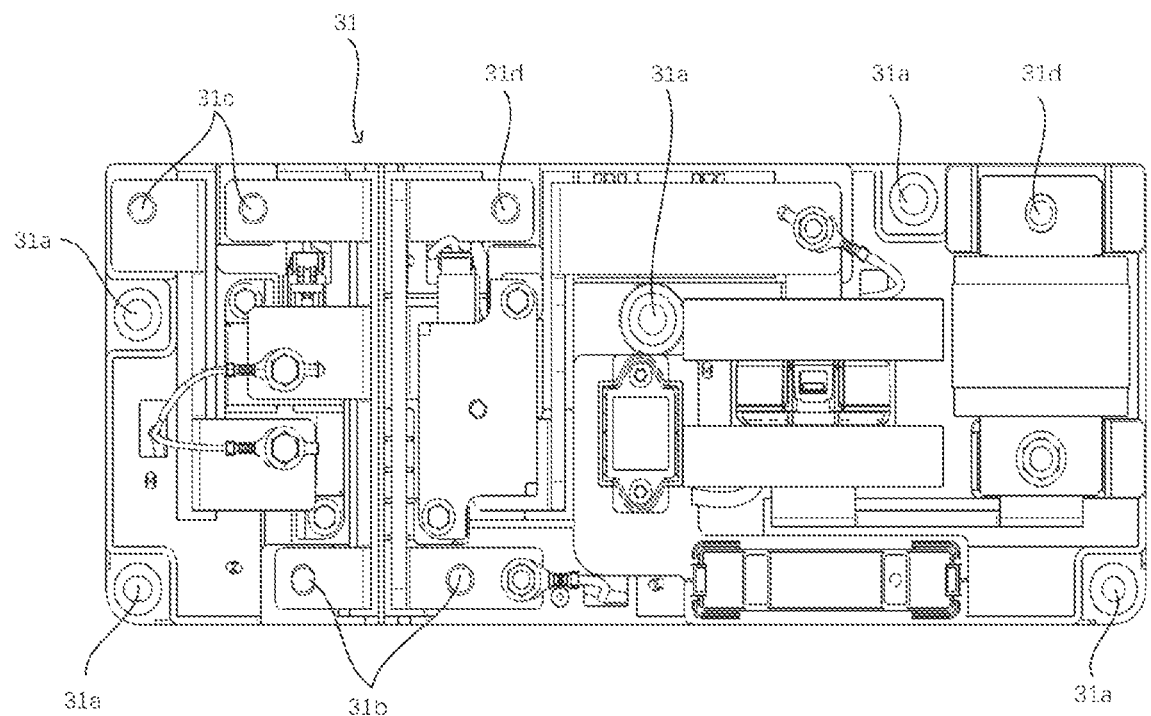
FIG. 27 is a top view of the power distribution unit according to the embodiment of the present disclosure.

As shown in FIG. 22a and FIG. 26, wiring terminals 31b, wiring terminals 31c and wiring terminals 31d are disposed on the power distribution unit 31, the wiring terminals 31b, the wiring terminals 31c and the wiring terminals 31d each being two in number. The wiring terminals 31b are used for being electrically connected to the rear connector 53 via the high-voltage connection assembly 55 so as to be electrically connected to the rear motor 220; the wiring terminals 31c are used for being electrically connected to the battery modules 20 after being connected in series; and the wiring terminals 31d are used for being electrically connected to the front connector 52 via the high-voltage connection assembly 50 so as to be electrically connected to the front motor 210.

As shown in FIG. 22b, the sizes of the power distribution unit bracket 32 in the front-rear direction and the left-right direction are approximately the same as those of the battery modules 20, and the sizes of the power distribution unit 31 in the front-rear direction and the left-right direction are smaller than those of the power distribution unit bracket 32 and the battery modules 20. In this way, mounting points of the power distribution unit bracket 32 can be better disposed, and the power distribution unit bracket can be more stably fixed above the battery modules.

As shown in FIG. 22a and FIG. 22b, the power distribution unit 31 is configured in the left-right direction near the right end portion of the power distribution unit bracket 32, i.e., configured near the housing 10 or the center of the bottom plate 11 in the left-right direction. In this way, it is possible to shorten the wiring length between the power distribution unit 31 and the connector 53 or the high-voltage wiring harness 51, saving the cost and facilitating wiring.

More specifically, one or more bolts 33 for mounting the power distribution unit 31 are disposed on the right end portion of the power distribution unit bracket 32. The power distribution unit 31 can thus be configured on the right end portion of the power distribution unit bracket 32 in the left-right direction.

In addition, in this embodiment, the bolt 33 is fixed to the upper surface of the power distribution unit bracket 32 by welding or integral forming, etc., so that the power distribution unit 31 is mounted by screwing the nut 34 from one side of the power distribution unit 31. In this way, the top portion 321 of the power distribution unit bracket 32 does not need to reserve space for disposing the nut 34, etc. on the lower surface side, thus enabling the top portion 321 to fit the battery module 20 well, which helps to improve the stability of the power distribution unit bracket 32 and reduce the space occupied by the power distribution unit bracket 32.

In addition, as shown in FIG. 22a, FIG. 22b, FIG. 24, etc., reinforcing ribs 321a are disposed on the power distribution unit bracket 32. In this way, the strength of the power distribution unit bracket 32 can be increased and the stability of the power distribution unit 31 can be improved. In addition, the reinforcing ribs 321a are disposed on the top portion 321 at a position that avoids the region where the power distribution unit 31 is configured, so that, for example, the power distribution unit 31 can be firmly fixed to the power distribution unit bracket 32. In this embodiment, there are a plurality of reinforcing ribs 321a, each reinforcing rib extending in a straight line shape in the front-rear direction. It will be understood that other forms of reinforcing ribs can also be disposed, for example reinforcing ribs extending in the left-right direction, or curved reinforcing ribs.

Control Device and Related Structures

As shown in FIG. 3, FIG. 12, and FIG. 15a, the control device 41 of the battery management system (BMS) and the low-voltage wiring harness 61 are configured in the gap S between the battery modules 20L and the battery modules 20R in the housing 10.

As shown in FIG. 5, a plurality of control devices 41A, 41B, and 41C (in the description herein, the plurality of control devices are collectively referred to as the control device 41 when no distinction is made between the plurality of control devices) of the BMS are configured between the battery modules 20L and the battery modules 20R in the housing 10. The control devices 41A, 41B and 41C are arranged in sequence from front to rear. The control devices 41A, 41B and 41C may be composed of electronic control units (ECU). In this embodiment, the control devices 41A and 41B are battery information collectors (BIC) and the control device 41C is a battery management unit (BMU). The BMS formed by the control devices 41A, 41B and 41C is used for intelligent management and maintenance of the various battery modules, preventing overcharging and overdischarging, extending the service life, and monitoring the battery state, etc.

It will be understood that the number and form of the control devices described above are merely illustrative and do not constitute a limitation of the present disclosure.

Figure 28D:
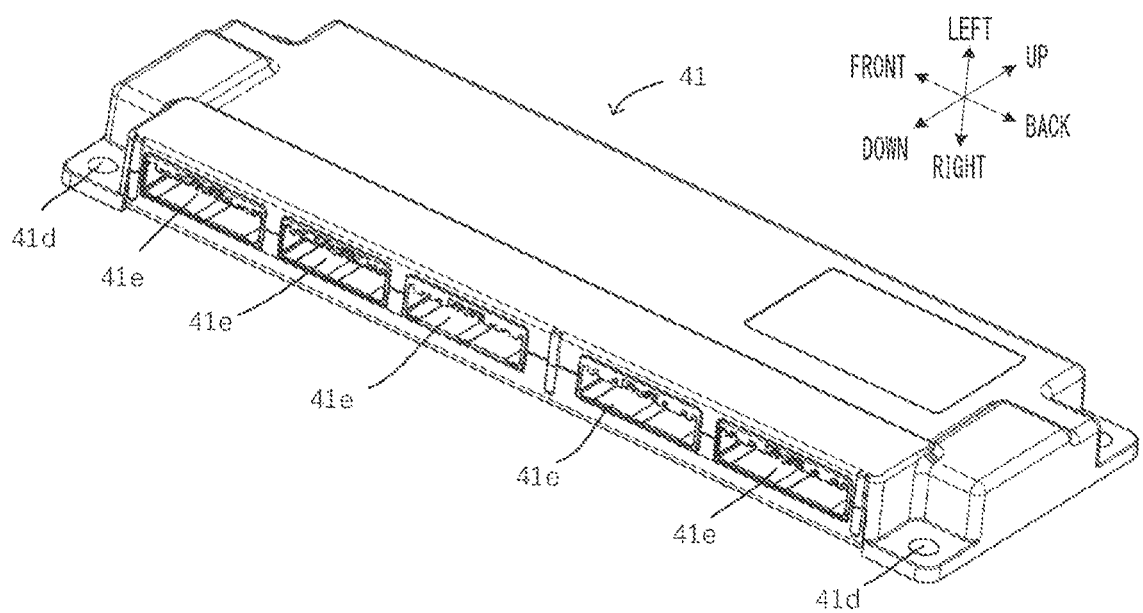
FIG. 28d is another three-dimensional structural schematic view of the control device.

FIG. 28a is a three-dimensional structural schematic view of a control device in this embodiment; FIG. 28b is a side view of the control device; FIG. 28c is a bottom view of the control device; and FIG. 28d is another three-dimensional structural schematic view of the control device. As shown in FIG. 15a, FIG. 16, FIG. 17, FIG. 28a, FIG. 28b, FIG. 28c and FIG. 28d, the control device 41 is substantially in a rectangular shape, with the thickness direction thereof approximately consistent with the left-right direction, the long side configured in the front-rear direction and the short side configured in the up-down direction.

Since the size in the thickness direction is smallest, followed by the size in the short side direction, and the size in the long side direction is largest, by making the thickness direction consistent with the left-right direction, the size of the gap S in the left-right direction can be reduced and the battery pack 100 can be miniaturized.

Furthermore, configuring the short side in the up-down direction reduces the height of the control device 41 compared to configuring the long side in the up-down direction, thereby suppressing the size of the battery pack 100 in the up-down direction and facilitating miniaturization.

Further, since the gap S is longer in size in the front-rear direction (the direction in which the plurality of battery modules 20L or 20R are arranged), even if the long side of the control device 41 is configured in the front-rear direction, it does not cause the battery pack 100 to increase in size in the front-rear direction, which facilitates miniaturization.

As shown in FIG. 15a, and FIG. 17, the control device 41 is mounted on the high-voltage wiring harness bracket 112 by means of the control device bracket 42. In this way, the high-voltage wiring harness bracket 112 of the high-voltage wiring harness 51 is used for mounting the control device 41, thus enabling a simple and compact structure that facilitates the miniaturization of the battery pack 100. As an example of the mounting method, in this embodiment, as shown in FIG. 15a, the control device 41 is fixed to the control device bracket 42 by means of bolts 43.

As shown in FIG. 15a, the control device bracket 42 includes a main body portion 42a and a base portion 42b.

The main body portion 42a is disposed erectly for mounting the control device 41. The base portion 42b is bent from the lower end of the main body portion 42a so as to extend in the left-right direction to be mounted on the high-voltage wiring harness bracket 112. For example, the base portion 42b is fixed to the high-voltage wiring harness bracket 112 by means of bolts not shown in the figure. It will be understood that the base portion 42b may also be fixed to the high-voltage wiring harness bracket by other means, such as by welding.

In this way, the control device bracket 42 is, as a whole, substantially in an L shape (in this embodiment, an L shape when viewed from the rear), thus having the technical effects of taking up less space and increasing the space utilization inside the battery pack 100. In addition, due to the base portion 42b extending from the lower end of the main body portion 42a in the left-right direction, the control device bracket 42 can be firmly mounted on the high-voltage wiring harness bracket 112.

As shown in FIG. 28c and FIG. 28d, the control device 41 has a connector 41e, and the connector 41e is located on the lower portion of the control device 41 with the (interface) facing downwards. Alternatively, the control device 41 is configured with the connector 41e facing downwards. The connector 65, which will be described later, on the low-voltage wiring harness 61 is connected to the connector 41e by insertion from below in order to collect information such as-voltage, temperature, etc. of the battery modules 20. By disposing the connector 41e on the lower portion of the control device 41, it is possible to have a good waterproofing effect. Specifically, due to the heating and cooling of the battery modules 20, dew is likely to form inside the housing 10, and dewdrops will form on and around the control device 41, and it will be understood that the dewdrops will flow downwards, thus, by disposing the connector 41e on the lower portion of the control device 41, facing downwards, the connector 41e can be protected against problems such as corrosion caused when water generated by the dewdrops flows into the connector 41e.

Here, the meaning of the connector 41e facing downwards is not limited to facing downwards vertically, but can be facing downwards obliquely, with the connector 41e facing downwards and at an angle of greater than or equal to 0 degrees but less than or equal to 90 degrees to the horizontal direction. As other embodiments, the angle may also be greater than or equal to 0 degrees but less than or equal to 10 degrees, or greater than or equal to 0 degrees but less than or equal to 30 degrees, 45 degrees or 60 degrees. It will be understood that the closer the angle is to the horizontal direction, the better the waterproofing effect. Alternatively, the connector 41e can be at an angle of 0 degrees to the horizontal direction. In addition, in the example of FIG. 28c, the control device 41 has a plurality of connectors 41e, and it will be understood that the number of the connectors 41e thereof may vary depending on the different function of the control device 41.

In addition, as shown in FIG. 15a, FIG. 17 and FIG. 21a, a wiring harness fixing portion 42c is disposed in the middle of the main body portion 42a of the control device bracket 42 in the up-down direction. The wiring harness fixing portion 42c is used for fixing a branch wire portion 612 of the low-voltage wiring harness 61 as will be described later. Specifically, the wiring harness fixing portion 42c extends in the front-rear direction from the middle of the main body portion 42a in the up-down direction and is provided with a through hole, and an embedding portion of an annular bracket 44 sleeving the branch wire portion 612 is embedded in the through hole, thereby fixing the branch wire portion 612 to the wiring harness fixing portion 42c.

In this way, on the one hand, by fixing the branch wire portion 612 of the low-voltage wiring harness 61 to the middle of the main body portion 42a in the up-down direction, it is possible to keep the position thereof stable, keep the connection thereof to the battery module 20 stable and make the performance of the battery pack 100 stable; on the other hand, since the control device bracket 42 is used for fixing the low-voltage wiring harness 61, it is possible to simplify the structure and make the structure compact, which facilitates disposing the control device 41 and the low-voltage connection assembly 60 in a limited space and facilitates the miniaturization of the battery pack 100.

In this embodiment, the branch wire portion 612 electrically connected to the right battery modules 20R among a plurality of branch wire portions 612 is fixed by the wiring harness fixing portion 42c.

As shown in FIG. 15a, etc., the control device bracket 42 (base portion 42b) is fixed to the right side portion of the high-voltage wiring harness bracket 112, and the control device 41 is configured substantially close to the right from the middle in the gap S.

Low-Voltage Connection Assembly and Related Structures

Referring to FIG. 3, FIG. 12 and FIG. 15a, as described above, the low-voltage connection assembly 60 is configured in the gap S between the battery modules 20L and the battery modules 20R within the housing 10.

The low-voltage connection assembly 60 includes a low-voltage wiring harness 61 and a low-voltage wiring harness bracket 62, etc. The low-voltage wiring harness 61 is mounted on the high-voltage wiring harness bracket 112 via the low-voltage wiring harness bracket 62 so as to be mounted on the bottom plate 11, and located above the high-voltage wiring harness bracket 112. The low-voltage wiring harness 61 is mounted on the high-voltage wiring harness bracket 112 by means of the low-voltage wiring harness bracket 62, i.e., the high-voltage wiring harness bracket 112 of the high-voltage wiring harness 51 is used for mounting the low-voltage wiring harness 61, thus enabling a simple and compact structure that facilitates the miniaturization of the battery pack 100. Furthermore, during assembling, the low-voltage wiring harness 61 and the high-voltage wiring harness 51, etc., can be mounted together and treated as a whole, thus enabling easy assembly.

As other embodiments, the low-voltage wiring harness bracket 62 can also be mounted directly on the bottom plate 11.

As shown in FIG. 16, etc., the low-voltage connection assembly 60 is configured in the left-right direction closer to the left than the control device 41. That is, the control device 41 is configured substantially closer to the right from the middle in the gap S and the low-voltage connection assembly 60 is configured substantially closer to the left from the middle in the gap S. In the left-right direction, the control device 41 is configured between the right battery module 20R and the low-voltage connection assembly 60 (the low-voltage wiring harness 61) and the low-voltage connection assembly 60 is configured between the control device 41 and the left battery modules 20L. It will be understood that, as other embodiments, the left and right positions of the low-voltage connection assembly 60 and the control device 41 may be interchanged.

In addition, as shown in FIG. 12, FIG. 16, etc., the low-voltage connection assembly 60 is configured at a lower position than the control device 41 in the up-down direction. That is, in this embodiment, the low-voltage connection assembly 60 is configured at the lower left portion of the control device 41. In addition, referring to FIG. 12, FIG. 16, etc., the low-voltage wiring harness 61 has a bent portion near the reinforcing component 72 of the reinforcing assembly 70, and the bent portion is bent to the right (or convex to the right) so that the part of the low-voltage wiring harness 61 is biased to the right with respect to the part adjacent to it so as to avoid interference with the reinforcing component 72. Thus, it is possible, for example, to achieve the technical effects of avoiding interference between the reinforcing component 72 and the low-voltage wiring harness 61 and to avoid abrasion to the low-voltage wiring harness 61 caused by the reinforcing component 72.

In addition, in this embodiment, the high-voltage connection assembly 50 is configured in the accommodating portion 113 and the low-voltage connection assembly is configured outside the accommodating portion 113, and thus it is possible, for example, to use the limited space in the bottom plate 11 to improve the safety of the battery pack 100 as efficiently as possible.

As shown in FIG. 18, etc., the low-voltage wiring harness 61 includes a main wire portion 611 and a plurality of branch wire portions 612. The main wire portion 61 is arranged to extend in the front-rear direction. The plurality of branch wire portions 612 are electrically connected to the main wire portion 611. The end portions of the plurality of branch wire portions 612 are provided with a connector 65 and a connector 66. Specifically, the main wire portion 611 and the plurality of branch wire portions 612 are disposed between the control device 41 and the battery modules 20, and the connector 65 is disposed below the control device 41. In this way, there is more space to dispose the branch wire portion 612 for connection with the connector 65, making the branch wire portion 612 less prone to breakage and extending the service life of the branch wire portion 612. In addition, because only the space for the connector is required under the control device 41 and the branch wire portion 612 does not occupy the space under the control device 41, the height of the control device 41 can be lowered so that the height dimension of the part of the housing of the battery pack where the control device 41 is accommodated is smaller, which contributes to the miniaturization of the battery pack.

The connector 65 is used for connecting the control device 41 and the connector 66 is used for connecting the battery modules 20. Since the wiring port 20c of the battery modules 20 is disposed at a higher position on the upper portion of the battery modules 20, the branch wire portion 612 with the connector 66 extends upwards to enable the connector 66 to be connected to the wiring port 20c of the battery module 20 by insertion.

The connector 65 is supported on the low-voltage wiring harness bracket 62 and thus can be kept at a stable position.

Figure 19:
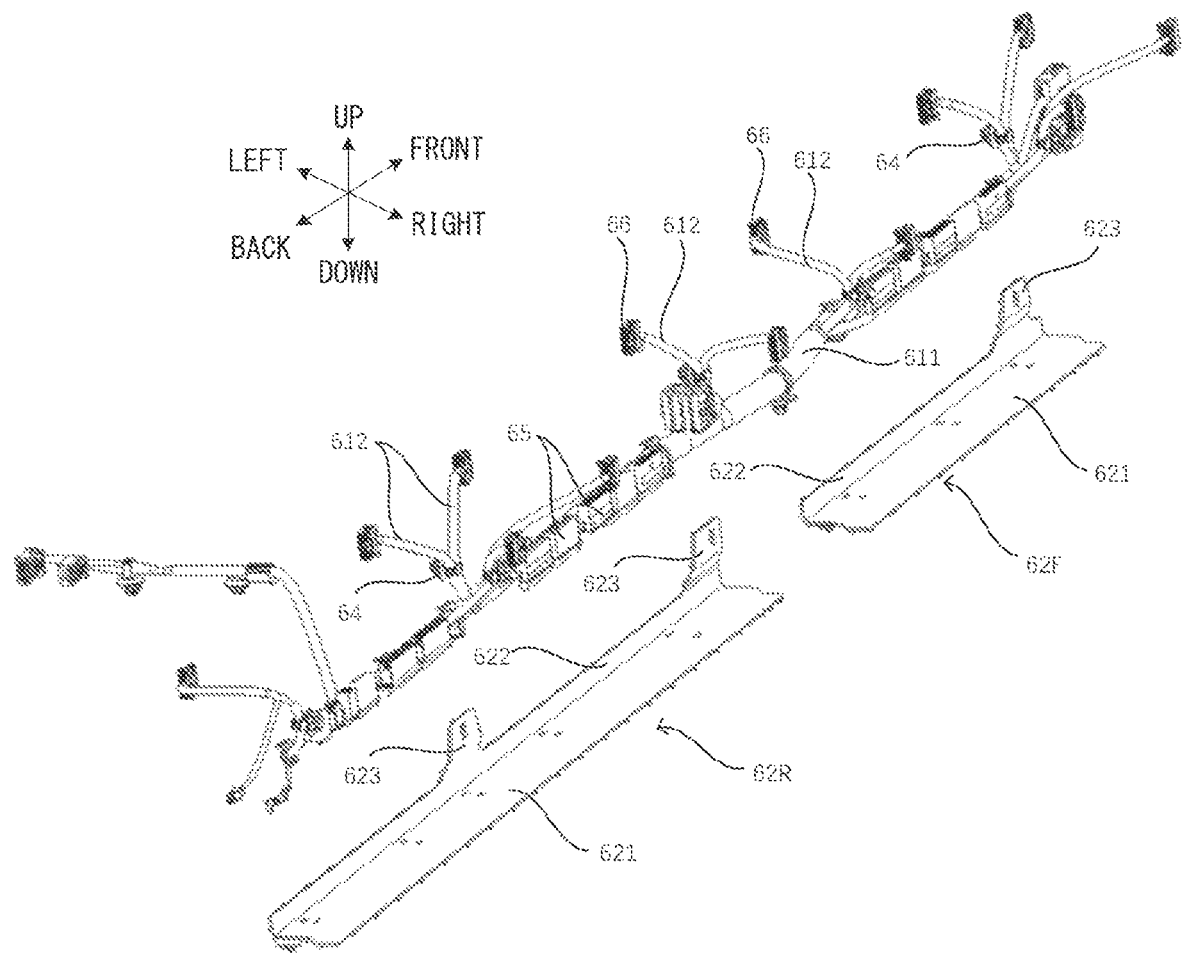
FIG. 19 is a schematic view showing a decomposition state of the structure in FIG. 18.
Figure 20:
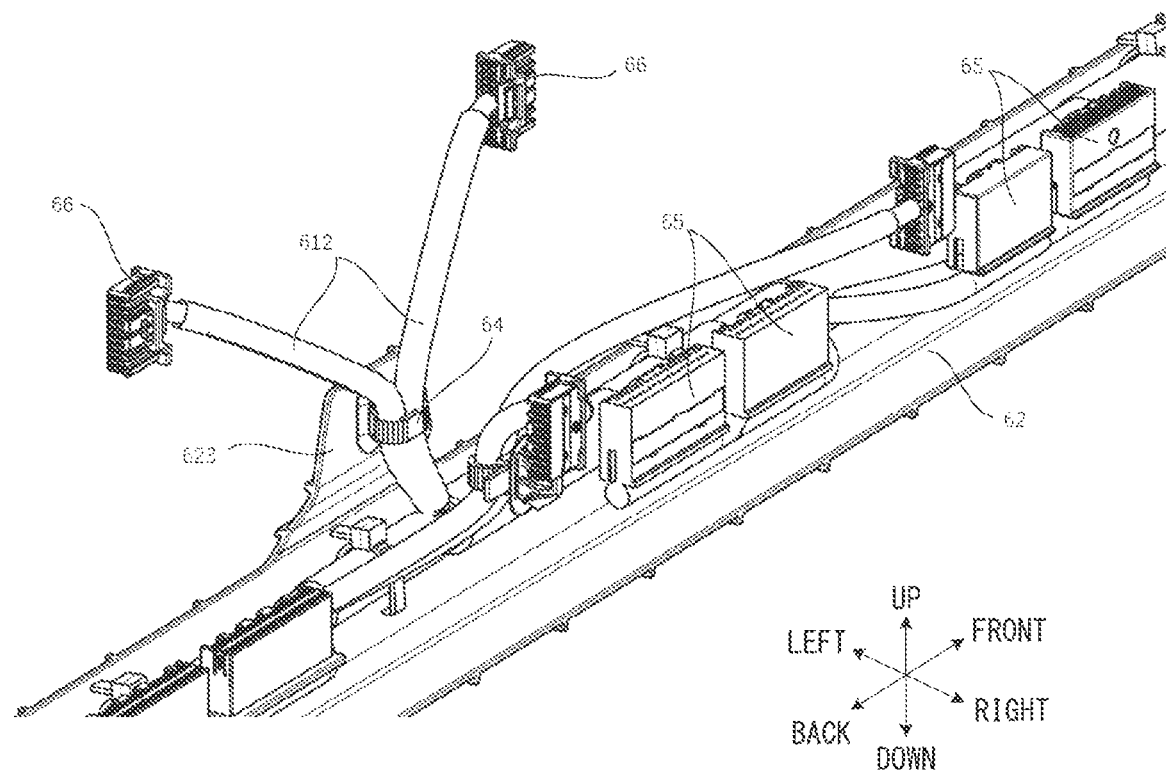
FIG. 20 is a partially enlarged view of the structure in FIG. 18.

As shown in FIG. 18, FIG. 19, etc., there are two low-voltage wiring harness brackets 62, namely, a low-voltage wiring harness bracket 62F and a low-voltage wiring harness bracket 62R, which are arranged in the front-rear direction. The low-voltage wiring harness bracket 62F is configured at the front of the reinforcing assembly 70 and the low-voltage wiring harness bracket 62R is configured at the rear of the reinforcing assembly 70, with the low-voltage wiring harness bracket 62F and the low-voltage wiring harness bracket 62R spaced apart to avoid the reinforcing assembly 70 and to avoid the case where the reinforcing assembly 70 has a larger opening 72e (FIG. 12) to avoid the low-voltage wiring harness bracket 62, thereby causing a reduction in strength. The low-voltage wiring harness bracket 62R close to the rear is relatively long and corresponds to the low-voltage wiring harness 61 of two control devices 41, and the low-voltage wiring harness bracket 62F close to the front is relatively short and corresponds to the low-voltage wiring harness 61 of one control device 41. Here, "F" and "R" in the reference numerals "62F" and "62R" are used to indicate "front" and "rear," respectively, and the low-voltage wiring harness bracket 62F and the low-voltage wiring harness bracket 62R are collectively referred to as the low-voltage wiring harness bracket 62 when no distinction about front and rear is made.

The low-voltage wiring harness bracket 62 includes a main body portion 621 and a wiring harness fixing portion 623. The main body portion 621 is in a plate shape and disposed substantially horizontally to support the main wire portion 611 of the low-voltage wiring harness 61 and the connector 65. The wiring harness fixing portion 623 is bent from the end portion (the left end portion in this embodiment) of the main body portion 621 in the left-right direction to extend upwards so as to fix a part of the plurality of branch wire portions 612 of the low-voltage wiring harness 61. Specifically, the branch wire portion 612 electrically connected to the left battery modules 20L among the plurality of branch wire portions 612 is fixed. With regard to the specific fixing method, it is possible, for example, to dispose a through hole in the wiring harness fixing portion 623, so that an embedding portion of an annular bracket 64 sleeving the branch wire portion 612 is embedded in the through hole, thereby fixing the branch wire portion 612 to the wiring harness fixing portion 623.

In this way, the branch wire portion 612 of the low-voltage wiring harness 61 is fixed at the position of the wiring harness fixing portion 623 extending upwards, and thus it is possible to keep the position thereof stable, keep the connection thereof to the battery module 20 stable, and make the performance of the battery pack 100 stable.

Referring to FIG. 16, the high-voltage wiring harness bracket 112 is provided with the raised portion 112b raised upwards, and the raised portion 112b is located at the position, in the up-down direction opposite to a gap between the low-voltage wiring harness bracket 62 close to the front and the low-voltage wiring harness bracket 62 close to the rear. The part of the main wire portion 611 of the low-voltage wiring harness 61 between the low-voltage wiring harness bracket 62 close to the front and the low-voltage wiring harness bracket 62 close to the rear is supported by the raised portion 112b, and is also fixed to the raised portion 112b. Specifically, the raised portion 112b is provided with a through hole, and an embedding portion of an annular bracket 63 sleeving the middle (specifically the bent portion described above) of the main wire portion 611 is embedded in the through hole, so as to fix the main wire portion 611 to the high-voltage wiring harness bracket 112.

In this way, the main wire portion 611 is supported by the raised portion 112b of the high-voltage wiring harness bracket 112 at a position where the low-voltage wiring harness bracket 62 cannot support it, thus effectively keeping the low-voltage wiring harness 61 (main wire portion 611) at a stable position and improving the safety and performance stability of the battery pack 100.

The annular brackets 44, 63, 64 can be made of a metal or plastic.

In addition, as other embodiments, the low-voltage wiring harness 61 may also be fixed to the high-voltage wiring harness bracket 112

Reinforcing Component and Related Structures

As shown in FIG. 6 to FIG. 8, the reinforcing assembly 70 is disposed within the housing 10, and the reinforcing assembly 70 is configured in the middle in the housing in the front-rear direction and extends in the left-right direction, mainly for strengthening the housing 10 in the left-right direction. For example, when the vehicle 200 is subjected to a lateral collision, the reinforcing assembly 70 can resist a lateral impact force, inhibit the deformation of the housing 10 and inhibit damage to the battery modules 20 in the housing 10 caused by the impact. In this embodiment, one reinforcing assembly 70 is disposed, however, as other embodiments, a plurality of reinforcing assemblies may also be disposed and spaced apart and arranged in the front-rear direction. In this embodiment, the reinforcing assembly 70 may also be referred to as a beam.

In this embodiment, the reinforcing assembly 70 is carried on the upper surface of the bottom plate 11, i.e., located above the bottom plate 11. Interference of the reinforcing assembly 70 with the accommodating portion 113 or the cooling liquid channels 115 in the bottom plate 11 is thus avoided. Compared with the structure where a reinforcing component is disposed below the plate 116 or at a position substantially at the same height, there is no need to dispose an avoiding portion on the reinforcing assembly 70 or on the accommodating portion 113 or the cooling liquid channels 115 to avoid interference, thus simplifying the structure and reducing the manufacturing cost. In addition, as described above, in this embodiment, the accommodating portion 113 is formed as a long slot extending in the front-rear direction, and the reinforcing assembly extends in the left-right direction and thus extends to intersect with the accommodating portion 113. In addition, the reinforcing assembly 70 may also be said to extend in the direction of the extension of the plate 116 or along the upper surface of the plate 116.

Figure 10:
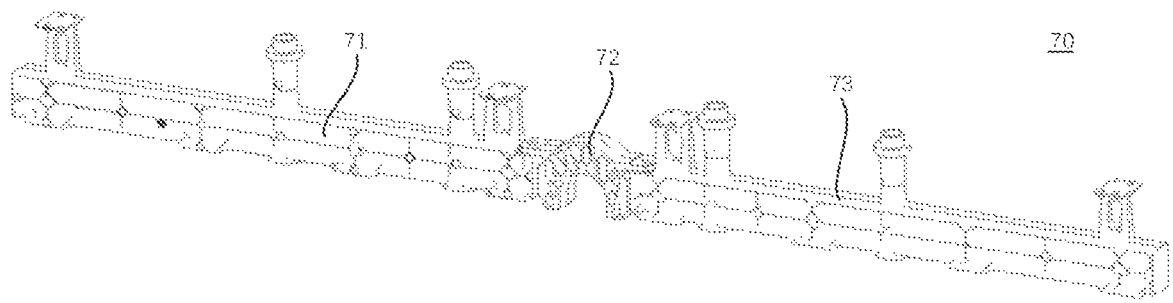
FIG. 10 is a three-dimensional structural schematic view of a reinforcing component according to the embodiment of the present disclosure.

FIG. 10 is a three-dimensional structural schematic view of the reinforcing component according to this embodiment. As shown in FIG. 6 to FIG. 8 and FIG. 10 to FIG. 12, the reinforcing assembly 70 includes a first connection component 71, a second connection component 73 and a reinforcing component 72. The first connection component 71 is supported on the bottom plate 11 of the housing 10 and extends from the left side plate 12 towards the middle in the left-right direction. The second connection component 73 is supported on the bottom plate 11 and extends from the right side plate 12 towards the middle in the left-right direction. An interval is disposed between the first connection component 71 and the second connection component 73. The reinforcing component 72 extends in the left-right direction, is connected between the first connection component 71 and the second connection component 73, and has an upwardly convex arched structure to avoid the low-voltage wiring harness 61, etc. configured in the gap S. The first connection component 71 and the second connection component 73 are connected to the reinforcing component 72 at one end and can be connected to the side plate 12 of the housing 10 at the other end.

By disposing the arched reinforcing component 72, the strength of the reinforcing assembly 70 can be ensured while avoiding the low-voltage wiring harness 61, etc., for example, compared to disposing a notch in the reinforcing component 72 to avoid the low-voltage wiring harness.

As shown in FIG. 12, the reinforcing component 72 is, as a whole, substantially in an inverted U shape and includes an arched portion 72a, vertical portions 72b and a fixed portion 72c. The arched portion 72a is equivalent to the middle of the U shape and is arched upwards with its upper and lower surfaces curved upwards. There are two vertical portions 72b which extend downwards from the left and right ends of the arched portion 72a opposite to the first connection component 71 and the second connection component 73 in the left-right direction. That is, the vertical portions 72b coincide with the first connection component 71 and the second connection component 73 when viewed in the left-right direction. In this way, for example, when the vehicle is subjected to a lateral collision, the vertical portions 72b abut against the first connection component 71 and the second connection component 73 in the left-right direction, reliably transmitting the force from one of the first connection component 71 or the second connection component 73 to the upper arched portion 72a, and from the arched portion 72a to the other of the first connection component 71 or the second connection component 73, thereby effectively improving the overall strength of the reinforcing assembly 70, i.e., improving the ability of the reinforcing assembly 70 to resist an external force.

The opening 72e is formed by the inner surfaces of the arched portion 72a and the two vertical portions 72b, and the low-voltage wiring harness 61 and the raised portion 112b of the high-voltage wiring harness bracket 112 are accommodated in the opening 72e.

The two fixed portions 72c protrude from the connected position of the arched portion 72a and the vertical portions 72b towards the outer side portion in the left-right direction respectively and are fixed to the first connection component 71 and the second connection component 73 by means of bolts 16d. In this way, for example, when the vehicle is subjected to a lateral collision, the force can be effectively transmitted from the first connection component 71 or the second connection component 73 to the arched portion 72a, which can effectively improve the overall strength of the reinforcing assembly 70, i.e., improve the ability of the reinforcing assembly 70 to resist an external force.

The bolt 16d is disposed vertically and passes through the fixed portion 72c, the first connection component 71, the second connection component 73, and the plate 116, with a nut 16e screwed to the lower protruding end, so that not only is the fixed portion 72c fixed to the first connection component 71 and the second connection component 73, but also the first connection component 71 and the second connection component 73 are fixed to the bottom plate 11. In this way, by means of the structure fixing the first connection component 71 and the second connection component 73 to the bottom plate 11, the reinforcing component 72 is fixed to the first connection component 71 and the second connection component 73, thereby simplifying the structure and reducing the cost, and further enabling a compact structure, which facilitates the miniaturization of the battery pack 100.

In addition, the arched portion 72a and the vertical portion 72b are provided with a plurality of grooves 72d, and specifically, the grooves 72d are triangular grooves. Thus, the weight of the reinforcing component 72 is lowered while the strength of the reinforcing component 72 is ensured.

In this embodiment, as shown in FIG. 12, lower end portions 72b1 of the vertical portions 72b extend downwards into the accommodating portion 113 so that, for example, when the vehicle is subjected to a lateral impact, the accommodating portion 113 shrinks and deforms in the left-right direction, at the same time, the left and right side walls of the accommodating portion 113 (i.e., left and right side walls of the grooves) come into contact with the lower end portions 72b1 of the vertical portions 72b, so that the reinforcing component 72 can withstand the external force in the left-right direction, increasing the strength of the bottom plate 11 in the left-right direction.

Furthermore, in this embodiment, the side portion of the lower end portion 72b1 comes into contact with the left and right edges of the accommodating portion 113 (the edge of the opening 116a of the plate 116, referring to FIG. 15b), thereby reliably increasing the strength of the bottom plate 11 in the left-right direction. Here, the edge of the opening 116a is a part of the side wall of the accommodating portion 113, and it will be understood that the lower end portions 72b1 of the vertical portions 72b can be further extended downwards, thereby increasing the contact area or contactable area with the side wall of the accommodating portion 113 so as to further increase the strength of the bottom plate 11.

Furthermore, as described above, the reinforcing component 72 is pressed against the high-voltage wiring harness bracket 112, specifically the lower end portions 72b1 of the vertical portions 72b of the reinforcing component 72 are pressed against the middle of the main body portion 112a of the high-voltage wiring harness bracket 112 in the length direction, thereby inhibiting movement or deformation of the high-voltage wiring harness bracket 112 in the up-down direction. Furthermore, as described above, the reinforcing component 72 is pressed against the main body portion 112a of the high-voltage wiring harness bracket 112 by the cushioning components 74 (FIG. 21c), specifically, the lower end portions 72b1 of the vertical portions 72b are pressed against the main body portion 112a of the high-voltage wiring harness bracket 112 by the cushioning components 74, thereby preventing damage to the high-voltage wiring harness bracket 112.

In this embodiment, the reinforcing component 72 is formed separately from the first connection component 71 and the second connection component 73. However, the present disclosure is not limited to this, for example, the reinforcing component 72 can also be formed integrally with the first connection component 71 and/or the second connection component 73.

Figure 30:
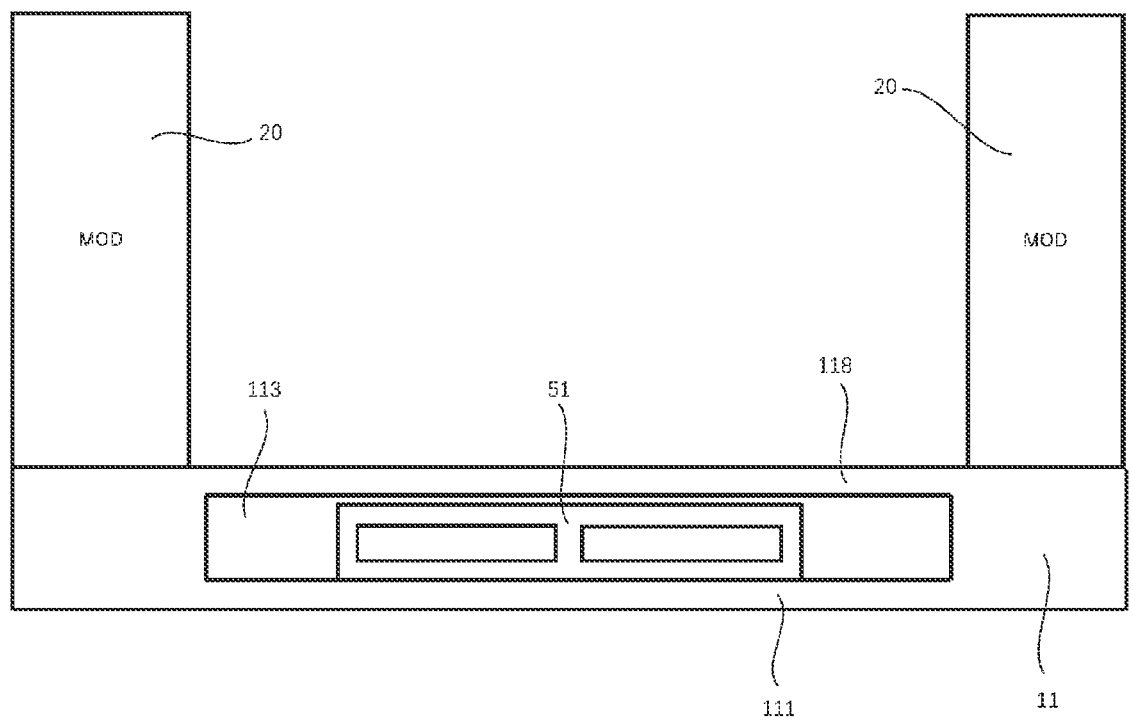
FIG. 30 is a structural schematic view of a battery pack according to an embodiment of the present disclosure with a different structure of the battery pack from the embodiment shown in FIG. 4.

FIG. 30 is a structural schematic view of a battery pack according to another embodiment of the present disclosure. The embodiment shown in FIG. 30 differs from the above embodiment in that, in the above embodiment, the opening 116a is formed in the plate 116, whereas in FIG. 30, in place of the structure of the plate 116, a plate 118 (an example of the first plate) is disposed, the size of the plate 118 in the left-right direction is approximately equal to that of the plate 111, the plate 118 is not provided with an opening at a position opposite to the accommodating portion 113, and the plate 118 forms the top of the accommodating portion 113. In addition, the accommodating portion 113 penetrates through the front and/or rear of the bottom plate 11, i.e., in this embodiment, the accommodating portion 113 is formed into the shape of a long hole extending in the front-rear direction. During assembly, the high-voltage wiring harness 51 can be inserted into the accommodating portion 113 from the front or rear through the opening of the accommodating portion 113 (long hole). In addition, in this embodiment, the high-voltage wiring harness bracket 112 in the above embodiment is omitted. In addition, in this embodiment, the high-voltage wiring harness 51 has a part exposed out of the accommodating portion 113 in the horizontal direction in a state where the high-voltage wiring harness 51 is inserted into the accommodating portion 113, and the part can be fixed to the bottom plate 11 in order to fix the high-voltage wiring harness 51 to the bottom plate 11.

Figure 31A:
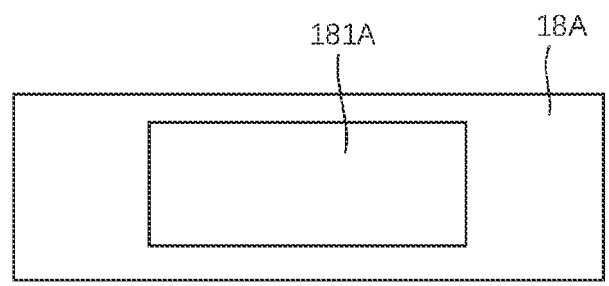
FIG. 31a to FIG. 31f show some examples of a bottom plate and an accommodating portion in the bottom plate.

FIG. 31a to FIG. 31f illustrate some examples of a bottom plate and an accommodating portion in the bottom plate by way of a partial cross-sectional view. In FIG. 31a, the housing 10 of the battery pack 100 has a bottom plate 18A, and an accommodating portion 181A consisting of a cavity is disposed in the bottom plate 18A. In addition, in the structure, the bottom plate 18A has a greater thickness (greater than the size of the accommodating portion 181A in the up-down direction), or a thickened portion can be disposed on the bottom plate 18A, the thickness of the thickened portion is greater than the thickness of the adjacent part thereof, and the accommodating portion 181A is disposed at the thickened portion.

Figure 31B:
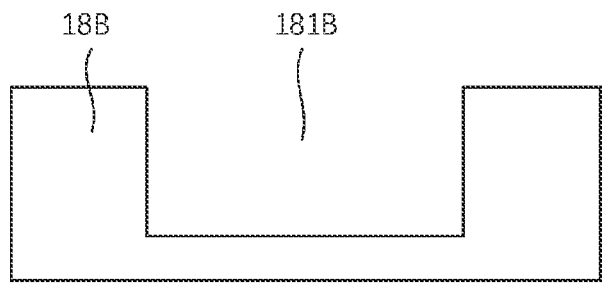

In FIG. 31b, the housing 10 has a bottom plate 18B, a groove is formed in the upper surface of the bottom plate 18B, and the groove forms an accommodating portion 181B. In this structure, the bottom plate 18B has a greater thickness (greater than the size of the accommodating portion 181B in the up-down direction), or a thickened portion can be disposed on the bottom plate 18B, the thickness of the thickened portion is greater than the thickness of the adjacent part thereof, and the accommodating portion 181B is disposed at the thickened portion. Similarly, a groove (not shown in the figure) may be formed in the lower surface of the bottom plate 18B, and the groove may form an accommodating portion.

Figure 31C:
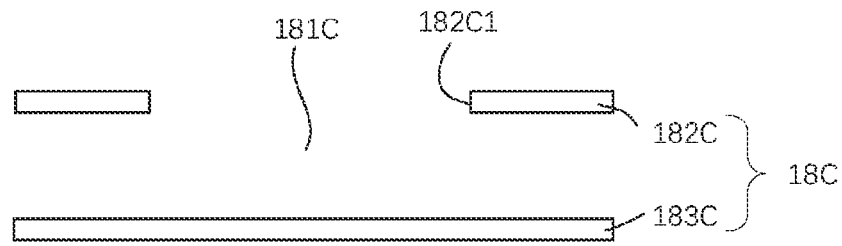

In FIG. 31c, the housing 10 has a bottom plate 18C, the bottom plate 18C has a plate 182C and a plate 183C, the plate 182C and the plate 183C are configured opposite to each other up and down and spaced apart, a through opening 182C1 is formed in the upper plate 182C, an accommodating portion 181C is formed between the plate 182C and the plate 183C, and the high-voltage connection assembly 50 can be configured in the accommodating portion 181C through the opening 182C1. With such a structure, the size of the accommodating portion 181C in the left-right direction can be greater so as to accommodate the high-voltage connection assembly with a greater size in the left-right direction. In addition, the size of the opening 182C1 in the left-right direction may be smaller than the size of the high-voltage connection assembly 50 in the left-right direction. Similarly, a through opening (not shown in the figure) may be formed in the lower plate 183C and an accommodating portion may be formed between the plate 182C and the plate 183C.

Figure 31D:
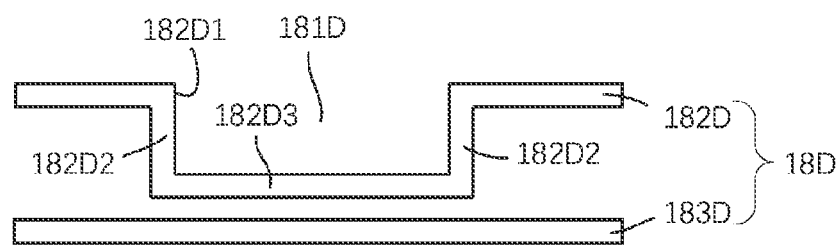

In FIG. 31d, the housing 10 has a bottom plate 18D, the bottom plate 18D has a plate 182D and a plate 183D, and the plate 182D and the plate 183D are configured opposite to each other up and down and spaced apart. A groove is formed in the upper surface of the upper plate 182D, the groove is a protrusion when viewed from one side of the lower surface of the plate 182D, and the groove forms an accommodating portion 181D. With such a structure, the groove (protrusion) can be considered as a reinforcing rib (similar to a pressed rib) on the plate 182D, thereby increasing the strength of the plate 182D and the bottom plate 18D.

In addition, as shown in FIG. 31d, the accommodating portion 181D (groove) has an opening 182D1, dividing walls 182D2 and a bottom wall 182D3, the opening 182D1 is formed in the plate 182D, the dividing walls 182D2 extend from the left and right side edges of the opening 182D1 towards the plate 183D, i.e., extend downwards, and the bottom wall 182D3 is connected between the dividing walls 182D2 on the left and right sides.

In FIG. 32e, the housing 10 has a bottom plate 18E, the bottom plate 18E has a plate 182E and a plate 183E, and the plate 182E and the plate 183E are configured opposite to each other up and down and spaced apart. The lower surface of the lower plate 183E is provided with a groove, the groove is a protrusion when viewed from one side of the upper surface of the plate 183E, and the groove forms an accommodating portion 181E. In addition, the protrusion may be spaced apart from the plate 182E or may come into contact with the plate 182E.

Figure 31E:
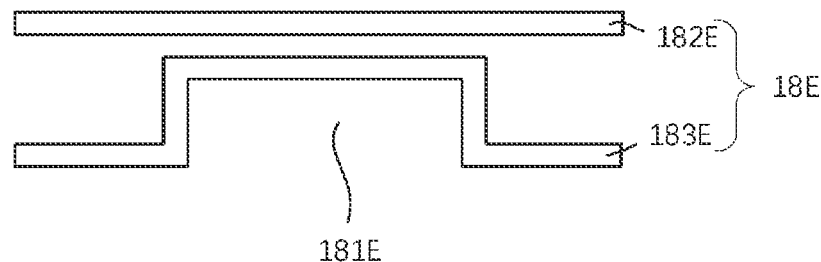
Figure 31F:
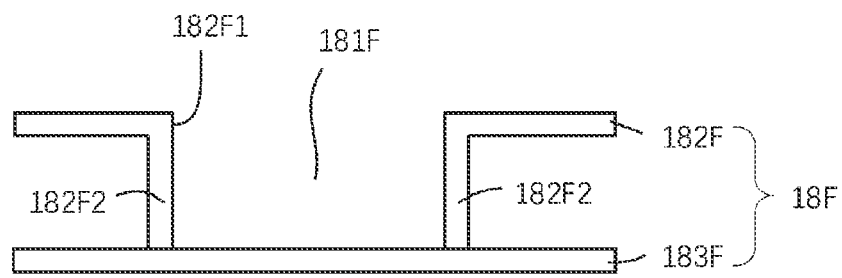

In FIG. 31f, the housing 10 has a bottom plate 18F, the bottom plate 18F has a plate 182F and a plate 183F, and the plate 182F and the plate 183F are configured opposite to each other up and down and spaced apart. The upper plate 182F is provided with a through opening 182F1 and dividing walls 182F2 extending downwards are disposed on the left and right side edges of the opening 182F1, so that the opening 182F1 and the dividing walls 182F2 form an accommodating portion 181F. That is, the accommodating portion 181F has the opening 182F1 and the dividing walls 182F2, the opening 182F1 is formed in the plate 182F and the dividing walls 182F2 define the left and right boundaries of the accommodating portion 181F. In the structure, the lower ends of the dividing walls 182F2 can be set in contact with the plate 183F to form a reliable support between the plate 182F and the plate 183F and increase the strength of the bottom plate 18F in the up-down direction. Similarly, the lower plate 183F may be provided with a through opening (not shown in the figure) and dividing walls extending upwards may be disposed on the left and right side edges of the opening, so that the opening and the dividing walls form an accommodating portion.

In addition, the lower ends of the dividing walls 182F2 may not be in contact with the plate 183F, so that when the bottom plate 18F is subjected to an acting force in the up-down direction, the dividing walls 182F2 abut against the plate 183F, thereby also increasing the strength of the bottom plate 18F by the dividing walls 182F2.

In addition, the structure of FIG. 31f can be seen as a result of omitting the bottom wall of the accommodating portion 181E in FIG. 31e.

The structures shown in FIG. 31d to FIG. 31f can achieve the technical effects of reducing the weight of the bottom plate while taking the strength of the bottom plate into consideration in comparison with FIG. 31a and FIG. 31b.

A method for assembling the battery pack in the embodiment shown in FIG. 2 to FIG. 29 will be described below.

The assembly method includes the following:
S1, fixing battery modules 20 to a bottom plate 11;
S2, fixing a high-voltage wiring harness 51, a low-voltage wiring harness 61 and a control device 41 to a high-voltage wiring harness bracket 112, thereby forming a whole (referred to as a first assembly);
S3, fixing the first assembly to the bottom plate 11; and
S4, fixing a top cover 13 relative to the bottom plate 11 so as to form a battery pack 100.

Using the above method to fix the high-voltage wiring harness 51, the low-voltage wiring harness 61 and the control device 41 to the high-voltage wiring harness bracket 112 to be treated together as the first assembly, the battery pack 100 can be assembled easily and conveniently.

The order of S1 and S2 above is not limited and S1 can be executed first and S2 executed later. It is also possible to execute them in reverse order.

Optionally, the S2 includes: fixing the control device 41 to the high-voltage wiring harness bracket 112 by means of a control device bracket 42; and fixing the low-voltage wiring harness 61 to the high-voltage wiring harness bracket 112 by means of a low-voltage wiring harness bracket 62.

The control device 41 can be mounted first on the control device bracket 42 and then mounted on the high-voltage wiring harness bracket 112, or the control device bracket 42 can be mounted first on the high-voltage wiring harness bracket 112, and then the control device 41 can be mounted. The same applies to the low-voltage wiring harness 61 and the low-voltage wiring harness bracket 62.

An embodiment of the present disclosure provides a battery pack 100 and a vehicle 200 having the battery pack 100. The battery pack 100 includes a housing 10 including a bottom plate 11, an accommodating portion 113 disposed in the bottom plate 11; battery modules 20 arranged above the bottom plate 11; and a high-voltage connection assembly 50 electrically connected to the battery modules 20 and accommodated in the accommodating portion 113.

In addition, a connector 52 and a connector 53 are disposed at the front and rear ends of the housing 10, respectively. A power distribution unit 31 is electrically connected to the connector 52 and a plurality of the battery modules 20 and electrically connected to the connector 53 and a plurality of the battery modules 20. The power distribution unit 31 is disposed above a single battery module 20 and closer to the rear connector 53 than the front connector 52.

In addition, the battery modules 20 include left battery modules 20L and right battery modules 20R, with a gap S between the left battery modules 20L and the right battery modules 20R. The control device 41 is disposed in the gap S. The low-voltage connection assembly 60 electrically connecting the battery modules 20L and 20R and the control device 41 is also disposed in the gap S. The low-voltage connection assembly 60 is located between the control device 41 and the battery modules 20R and located below (i.e., obliquely below) the control device 41.

In addition, a reinforcing assembly 70 is configured above the bottom plate 11 and the reinforcing assembly 70 extends as a whole in the left-right direction. Moreover, the reinforcing assembly 70 includes a reinforcing component 72, a first connection assembly 71 and a second connection assembly 73. The reinforcing component 72 includes an arched portion 72a, the arched portion 72a is disposed in the gap S and arched upwards, and the low-voltage connection assembly 60 passes through the inner side of the arched portion 72a. The first connection assembly 71 and the second connection assembly 73 are each connected to the reinforcing component 72 at one end and can be connected to side plates 12 of the housing 10 at the other end.

With the structure of this embodiment, for example, when the vehicle is subjected to a lateral collision, the battery pack 100 is deformed, and the battery modules 20 move in the direction of the extension of the bottom plate 11, however, due to the fact that the high-voltage connection assembly 50 is configured in the bottom plate 11 below the battery modules 20, the battery modules 20 are less likely to hit the high-voltage connection assembly 50, thereby inhibiting deformation or breakage, etc. of the high-voltage connection assembly 50, and improving the safety and reliability of the battery pack 100.

In addition, by disposing the power distribution unit 31 above the single-sided battery module 20, it is more convenient to mount the power distribution unit 31, the stability of the power distribution unit 31 can also be improved, and the overall space occupied by the power distribution unit 31 can be reduced, which increases the energy density of the battery pack 100 (by not occupying the middle gap, the width of the battery pack is minimized).

Furthermore, the power distribution unit 31 is disposed closer to the connector 53, which can reduce the wire length of the high-voltage connection assembly 50 and reduce the cost. In addition, the power distribution unit 31 is disposed closer to the rear connector 53 so that there is no need to dispose a raised portion at the front of the housing 10 of the battery pack to accommodate the power distribution unit 31, thereby allowing more space in the cabin of the vehicle corresponding to the position of the battery pack to accommodate the feet of passengers.

Also, by disposing the control device 41 vertically in the gap S, the space of the housing 10 is used rationally, reducing the overall space occupied by the control device 41 in the battery pack 100, increasing the energy density of the battery pack 100 and also facilitating assembly.

In addition, the reinforcing assembly 70 can increase the strength of the housing of the battery pack 100, and the arched portion 72a can inhibit the reduction of the strength of the reinforcing assembly 70, and disperses the force effectively, and when the battery pack 100 is subjected to a collision, deformation can be better cushioned.

The terms "first, second, third, etc." or similar terms such as module A, module B, module C, etc., are used herein only to distinguish similar objects and do not imply a particular ordering of objects, and it will be understood that particular orders or sequences may be interchanged where permitted, so that the embodiments of the present application described herein can be implemented in an order other than that illustrated or described herein.

The term "include" as used herein should not be construed as limiting to what is listed thereafter, and it does not exclude other elements or steps. Accordingly, it should be interpreted as designating the presence of the mentioned feature, whole, step or component, but does not exclude the presence or addition of one or more other features, whole, steps or components and groups thereof. The expression "an apparatus including devices A and B" should therefore not be limited to an apparatus including only components A and B.

"An embodiment" or "embodiments" mentioned in the description means that the particular feature, structure or characteristic described in conjunction with the embodiment is included in at least one embodiment of the present disclosure. Thus, the terms "in an embodiment" or "in embodiments" appearing throughout the description do not necessarily refer to the same embodiment, but may refer to the same embodiment. In addition, in one or more embodiments, the particular features, structures or characteristics can be combined in any suitable manner, as would be apparent from the present disclosure to those of ordinary skill in the art.

Further, the foregoing are only preferred embodiments of the present application and the technical principles employed. It will be understood by those of skill in the art that the present disclosure is not limited to the particular embodiments described herein and that various variations, readjustments and substitutions are apparent to those of skill in the art without departing from the scope of protection of the present disclosure. Thus, although the present application has been described in some detail by means of the above embodiments, the present disclosure is not limited to the above embodiments only, but may include many more other equivalent embodiments without departing from the conception of the present disclosure, all of which fall within the scope of protection of the present disclosure.

What is claimed is:

1. A battery pack, comprising:
    a housing, the housing comprising a bottom plate provided with an accommodating portion;
    battery modules arranged above the bottom plate and comprising first battery modules and second battery modules, with a gap between the first battery modules and the second battery modules that overlaps with the accommodating portion when viewed in the up-down direction;
    a control device configured in the gap;
    a low-voltage connection assembly electrically connecting the battery modules and the control device and configured in the gap; and
    a high-voltage connection assembly electrically connecting the battery modules and accommodated in the accommodating portion.

2. The battery pack according to claim 1, wherein the low-voltage connection assembly is located between the control device and the battery modules, and located below the control device.

3. The battery pack according to claim 1, wherein
    the control device is fixed to the bottom plate by means of a control device bracket,
    the control device bracket comprises a main body portion and a base portion,
    the main body portion is disposed vertically with respect to the bottom plate and provided with the control device, and
    the base portion is bent from the lower end of the main body portion and mounted on the bottom plate.

4. The battery pack according to claim 1, wherein the end of the control device close to the bottom plate is provided with a first connector electrically connected to the battery module.

5. The battery pack according to claim 4, wherein the low-voltage connection assembly is provided with a second connector, and the first connector is connected to the second connector by insertion.

6. The battery pack according to claim 1, wherein the bottom plate comprises a first plate and a second plate, the first plate is located above the second plate, the battery module is arranged above the first plate, and the accommodating portion is disposed within the height range between the first plate and the second plate.

7. The battery pack according to claim 1, wherein cooling liquid channels are disposed in the bottom plate.

8. The battery pack according to claim 1, wherein a reinforcing component is disposed above the bottom plate.

9. The battery pack according to claim 7, wherein a part of the cooling liquid channels farther away from the center line of the bottom plate is upstream along the liquid flow and a part of the cooling liquid channels closer to the center line of the bottom plate is downstream along the liquid flow, wherein the center line extends in the direction of extension of the bottom plate.

10. The battery pack according to claim 6, wherein
    the high-voltage connection assembly comprises a high-voltage wiring harness and a high-voltage wiring harness bracket,
    the high-voltage wiring harness is configured in the accommodating portion, and the high-voltage wiring harness bracket covers the high-voltage wiring harness from above, forming the top of the accommodating portion.

11. The battery pack according to claim 10, wherein the low-voltage connection assembly and the control device are located above the high-voltage wiring harness bracket.

12. The battery pack according to claim 10, wherein the low-voltage connection assembly comprises a low-voltage wiring harness and a low-voltage wiring harness bracket, and the low-voltage wiring harness is fixed to the high-voltage wiring harness bracket by means of the low-voltage wiring harness bracket.

13. The battery pack according to claim 10, wherein the high-voltage wiring harness comprises a cladding layer and conductive members disposed within the cladding layer, and the cladding layer is fixed to the high-voltage wiring harness bracket.

14. The battery pack according to claim 8, wherein the reinforcing component is provided with an arched portion disposed in the gap.

15. The battery pack according to claim 14, wherein the battery pack further comprises a first connection component and a second connection component disposed on the bottom plate, the first connection component and the second connection component extend in the direction of extension of the bottom plate, and both ends of the reinforcing component are fixed to the first connection component and the second connection component.

16. A vehicle, comprising the battery pack according to claim 1.

* * * * *